(12) United States Patent
Storm et al.

(10) Patent No.: US 9,043,499 B2
(45) Date of Patent: May 26, 2015

(54) MODIFYING A DISPERSED STORAGE NETWORK MEMORY DATA ACCESS RESPONSE PLAN

(71) Applicant: CLEVERSAFE, INC., Chicago, IL (US)

(72) Inventors: Michael Colin Storm, Chicago, IL (US); Jason K. Resch, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 14/103,141

(22) Filed: Dec. 11, 2013

(65) Prior Publication Data

US 2014/0223095 A1 Aug. 7, 2014

Related U.S. Application Data

(60) Provisional application No. 61/761,005, filed on Feb. 5, 2013.

(51) Int. Cl.
*G06F 3/06* (2006.01)
*G06F 5/00* (2006.01)
*G06F 13/00* (2006.01)

(52) U.S. Cl.
CPC .............. *G06F 3/067* (2013.01); *G06F 3/0619* (2013.01); *G06F 3/0665* (2013.01)

(58) Field of Classification Search
None
See application file for complete search history.

(56) References Cited

U.S. PATENT DOCUMENTS

| 4,092,732 A | 5/1978 | Ouchi |
|---|---|---|
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Scott Sun
(74) *Attorney, Agent, or Firm* — Garlick & Markison; Timothy W. Markison

(57) ABSTRACT

A dispersed storage network memory includes a pool of storage nodes, where the pool of storage nodes stores a multitude of encoded data files. A storage node obtains and analyzes data access response performance data for each of the storage nodes to produce a modified data access response plan that includes identity of an undesired performing storage node and an alternative data access response for the undesired performing storage node. The storage nodes receive corresponding portions of a data access request for at least a portion of one of the multitude of encoded data files. The undesired performing storage node or another storage node processes one of the corresponding portions of the data access request in accordance with the alternative data access response.

20 Claims, 52 Drawing Sheets

(56) References Cited

U.S. PATENT DOCUMENTS

| | | |
|---|---|---|
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

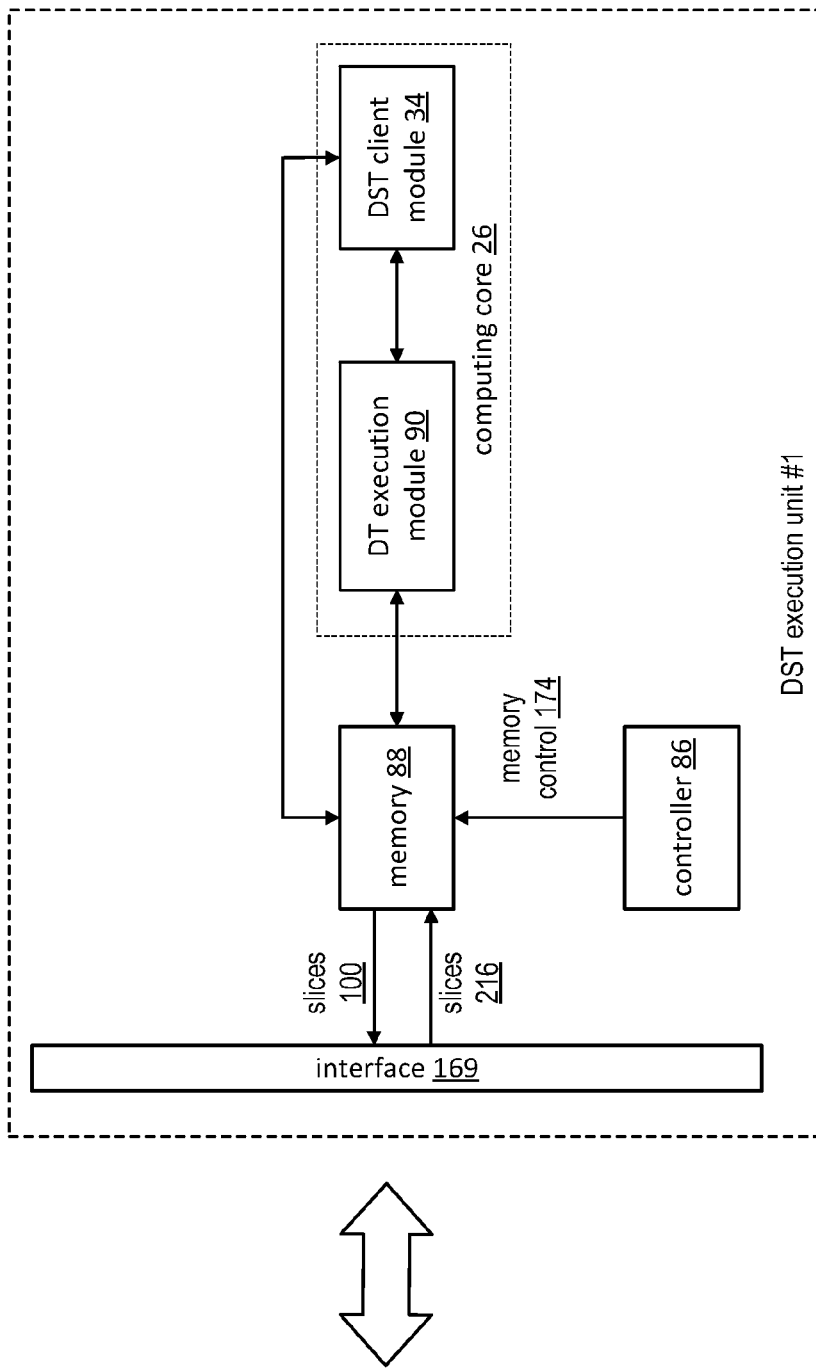
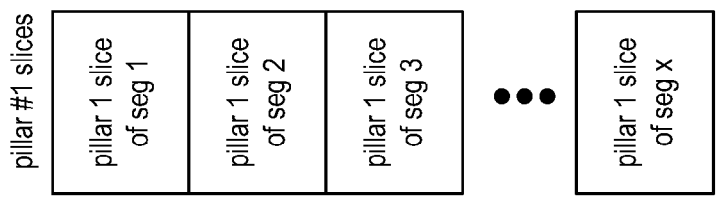
FIG. 24

DST allocation info 242: data partition info 320: data ID; No. of partitions; Addr. info for each partition; format conversion indication intermediate result info 324

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 2_3, 2_4, 2_4, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

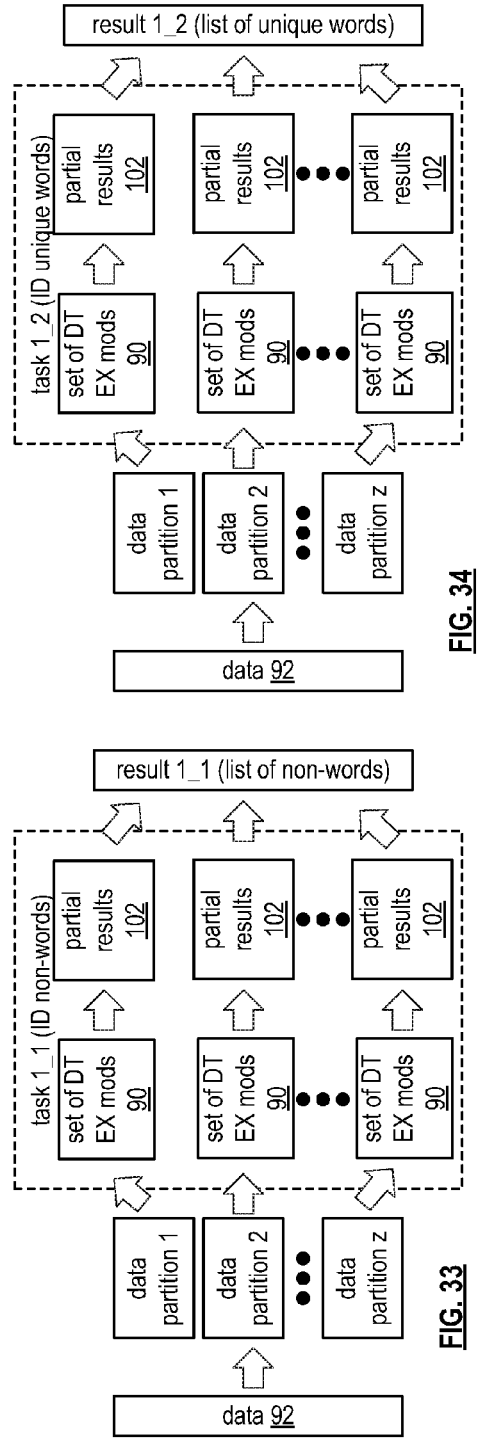
FIG. 33
FIG. 34
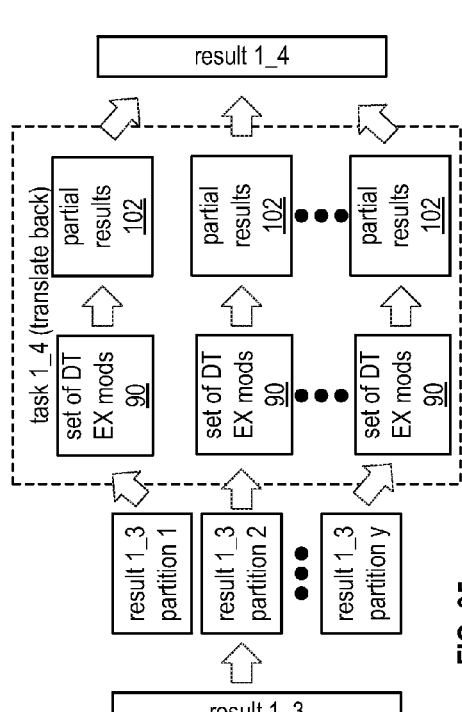
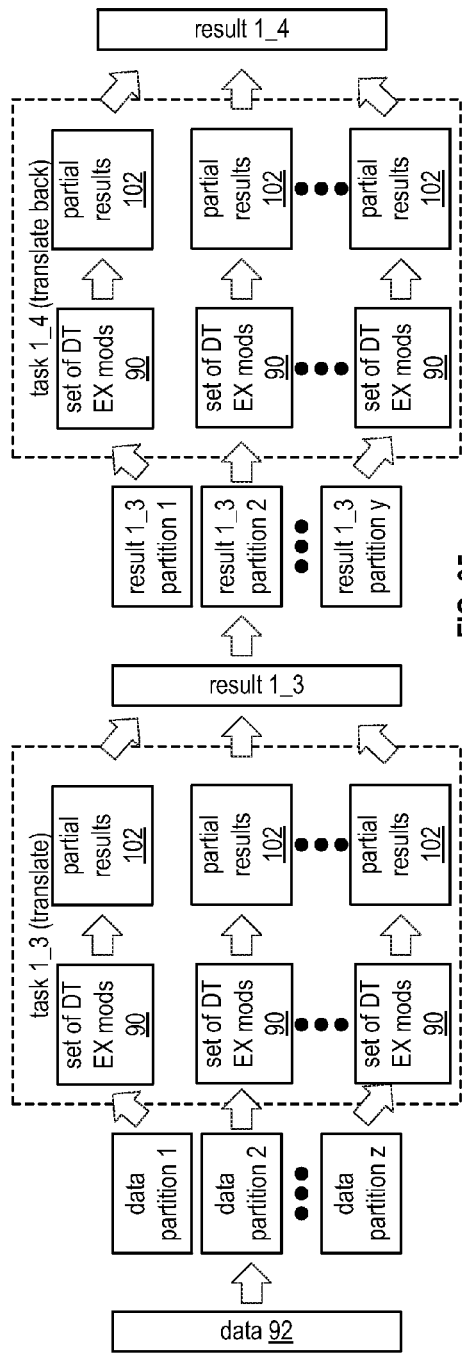
FIG. 35

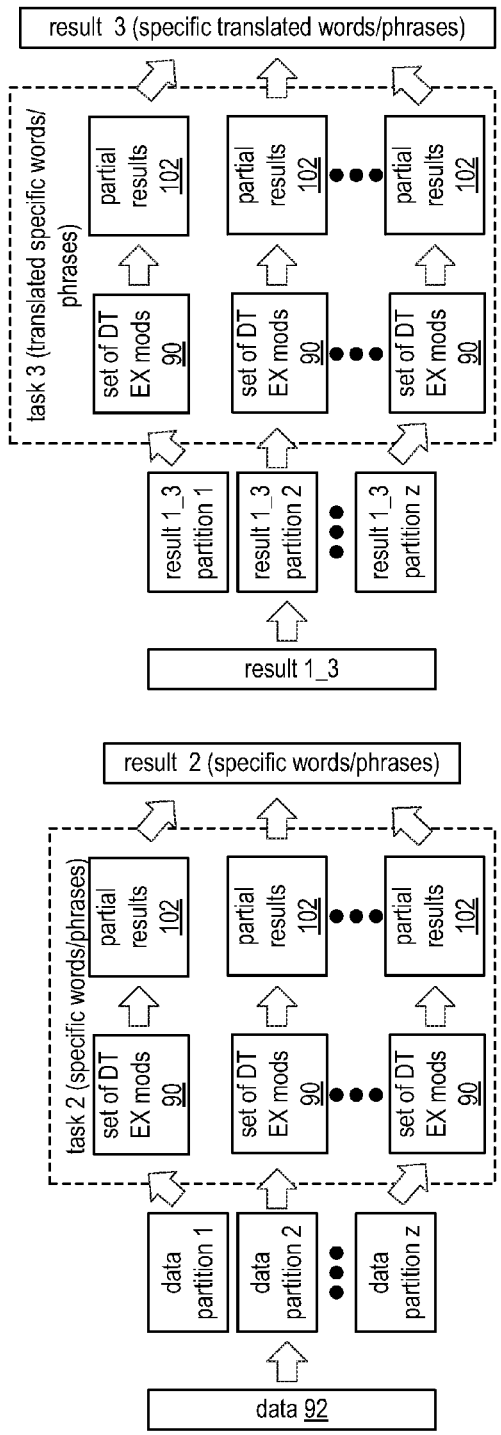
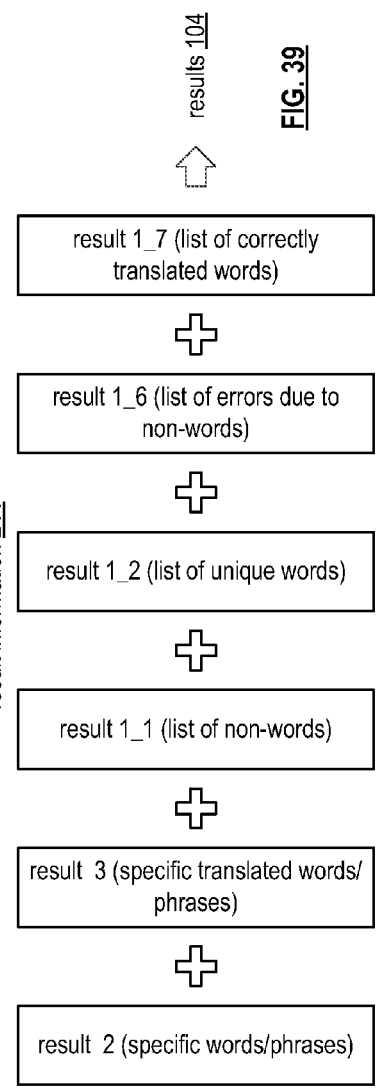

| DST EX unit ID 498 | storage node pool assignment table 506 |||||
|---|---|---|---|---|---|
| | data access response plan 508 || data access response performance data 504 | modified data access response plan 510 ||
| | respond 512 | don't respond 514 | | respond 512 | don't respond 514 |
| unit 1 | A-1-x, B-1-x | | undesired level | B-1-x | A-1-x |
| unit 2 | A-2-x, B-2-x | | undesired level | | A-2-x, B-2-x |
| unit 3 | A-3-x, B-3-x | | desired level | A-3-x, B-3-x | |
| unit 4 | A-4-x | | desired level | A-4-x | |
| unit 5 | | | desired level | A-1-x | |

FIG. 44C

MODIFYING A DISPERSED STORAGE NETWORK MEMORY DATA ACCESS RESPONSE PLAN

CROSS REFERENCE TO RELATED PATENTS

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:

1. U.S. Provisional Application Ser. No. 61/761,005, entitled "ACCESSING DATA IN A DISPERSED STORAGE NETWORK," filed Feb. 5, 2013.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computer networks and more particularly to dispersed storage of data and distributed task processing of data.

2. Description of Related Art

Computing devices are known to communicate data, process data, and/or store data. Such computing devices range from wireless smart phones, laptops, tablets, personal computers (PC), work stations, video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 44A:
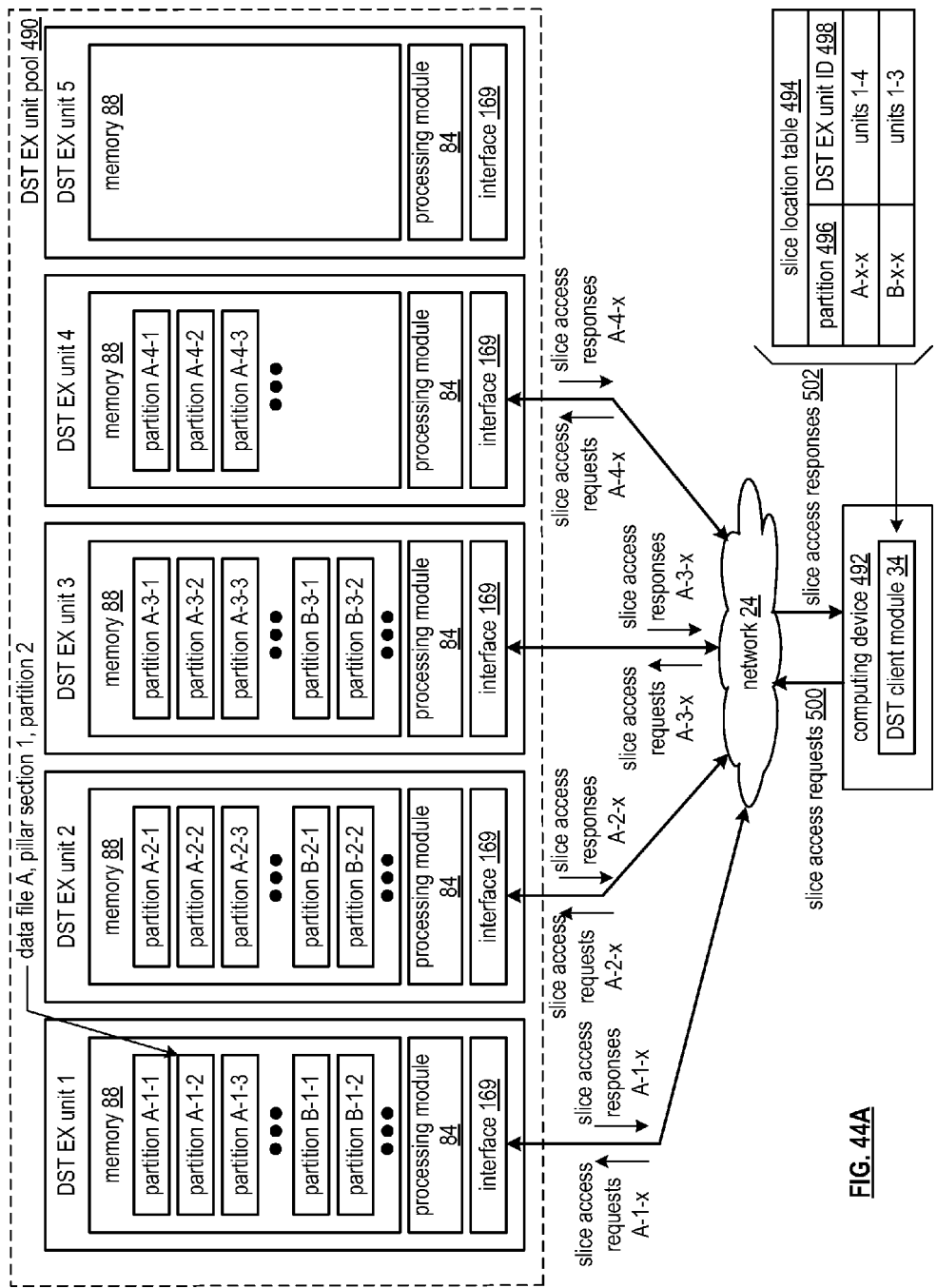
Figure 44B:
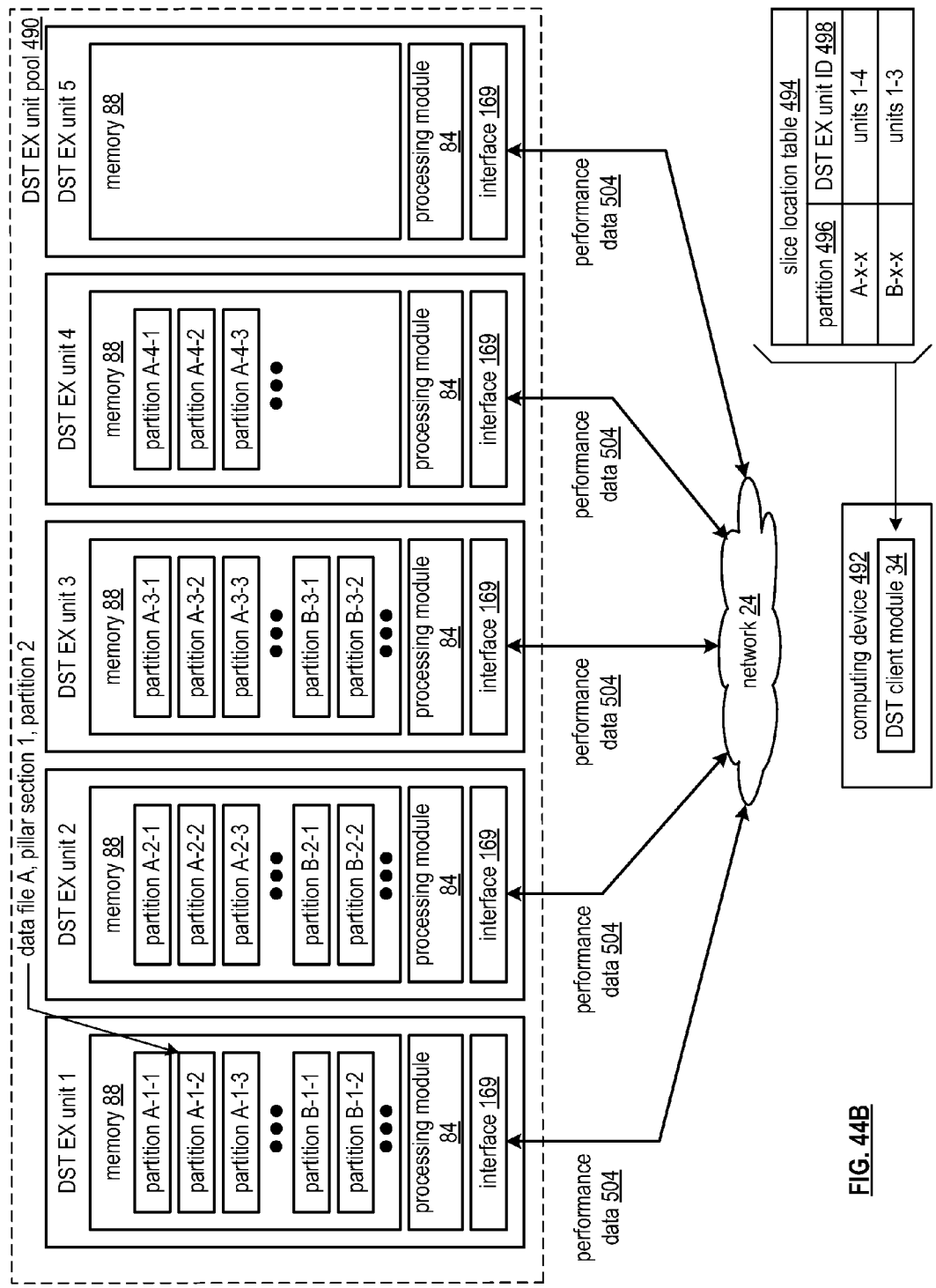
Figure 44D:
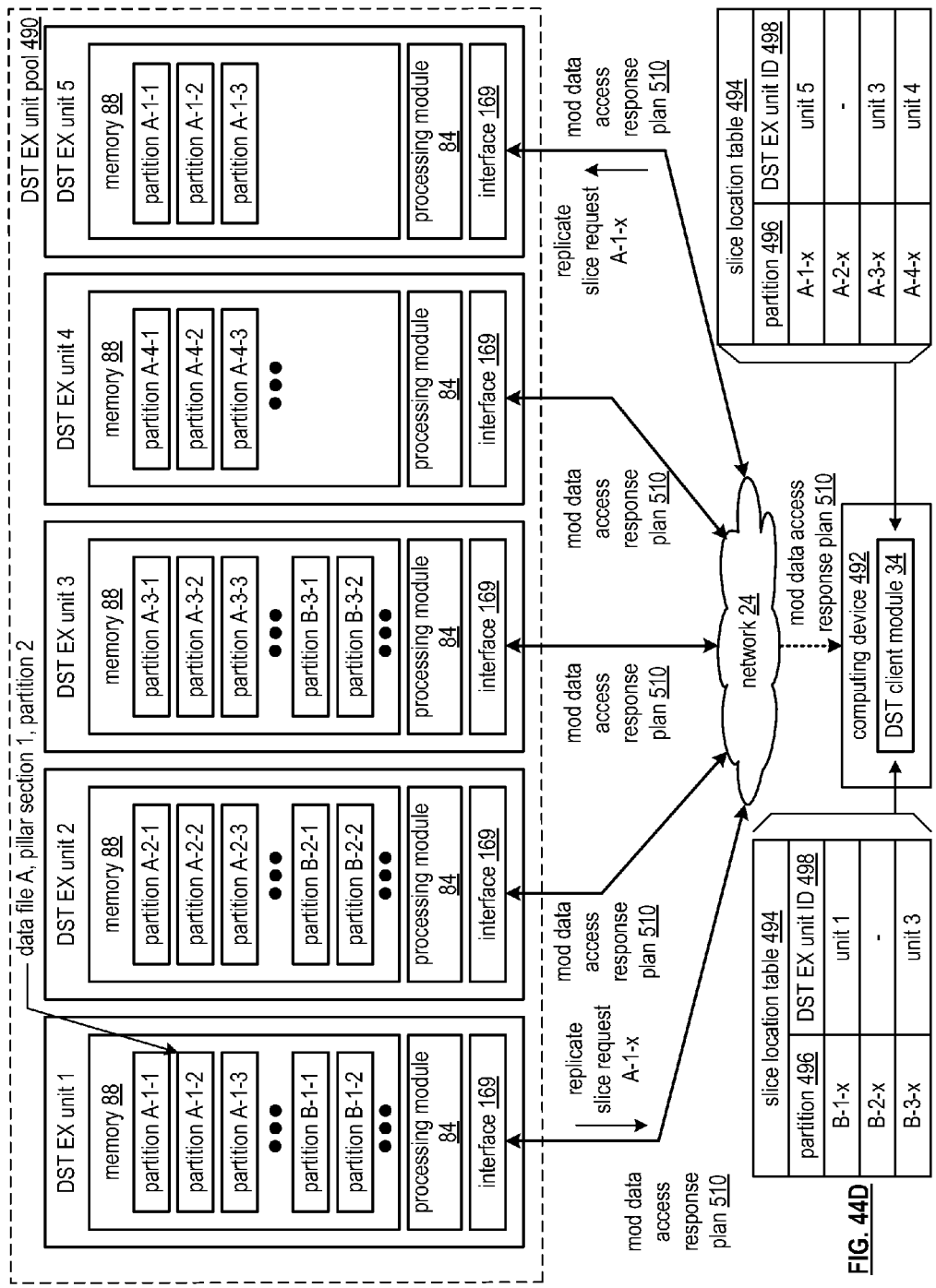
Figure 44E:
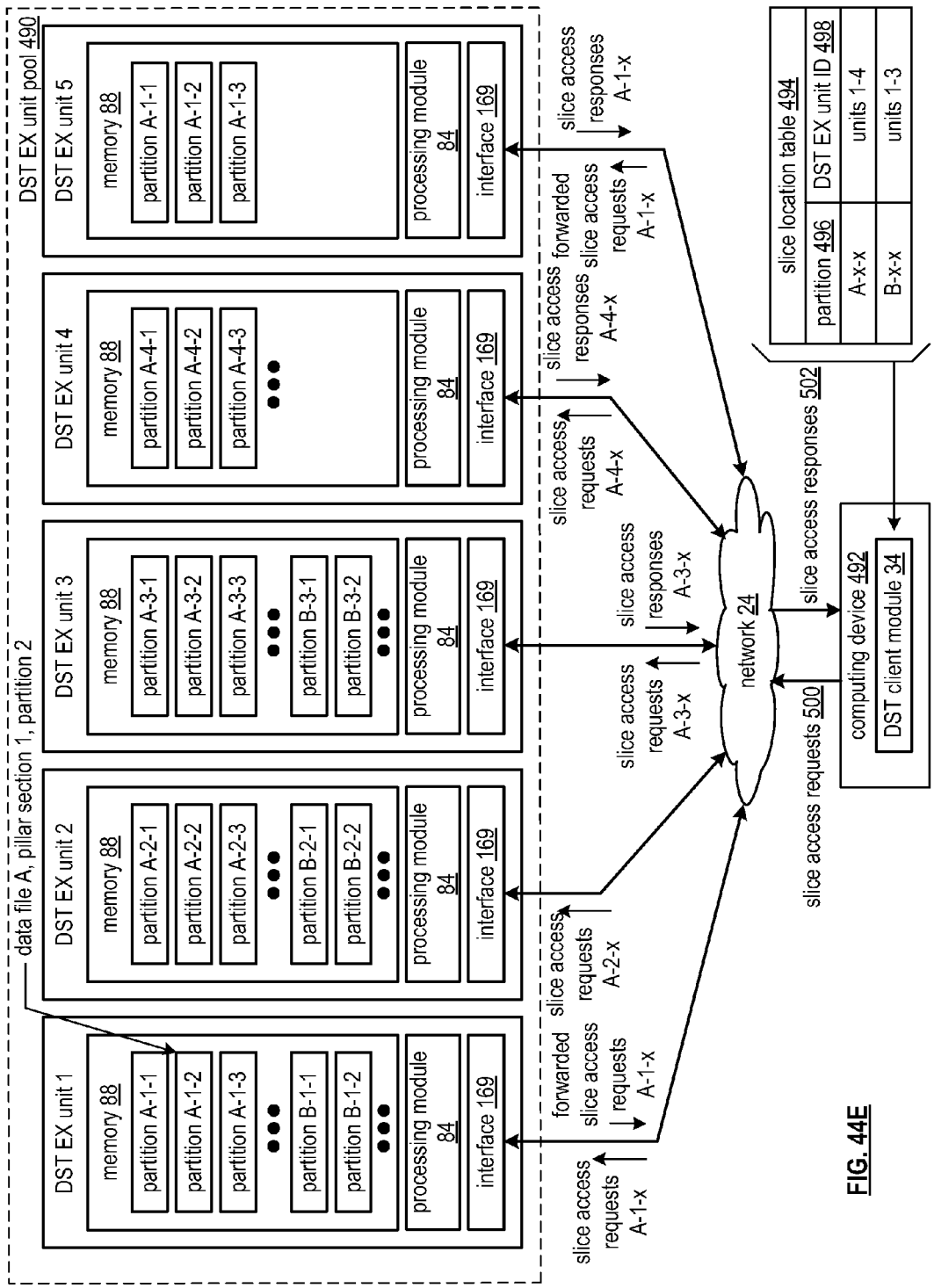
Figure 44F:
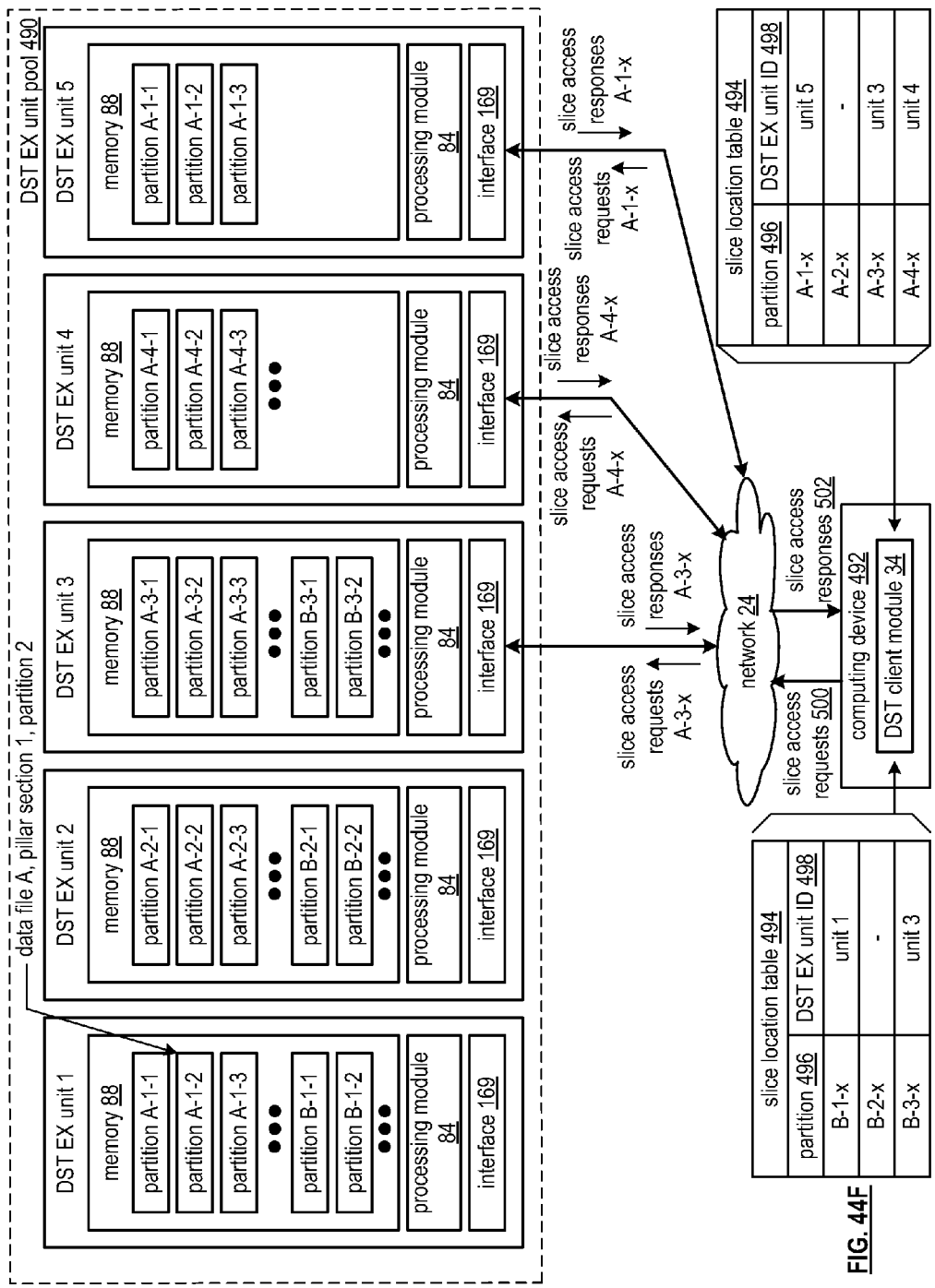
Figure 44G:
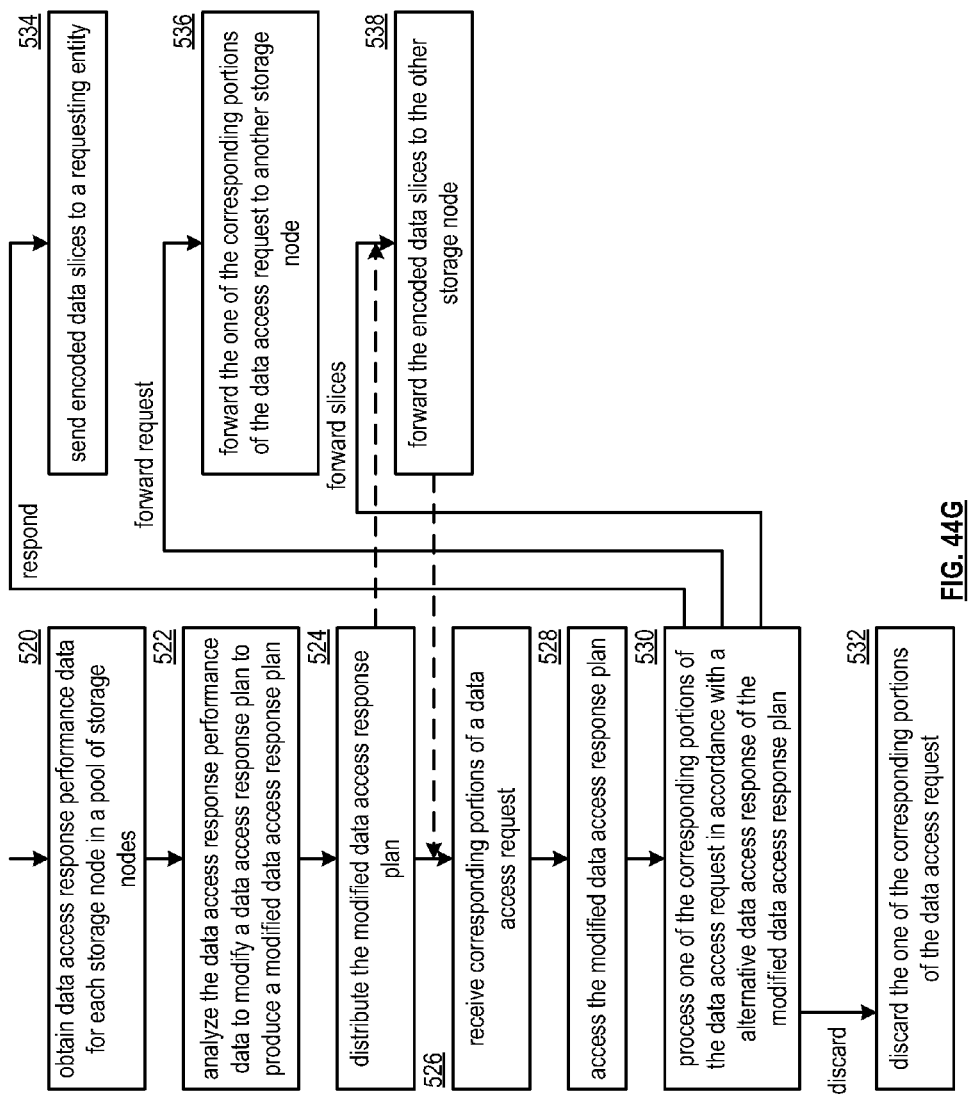
Figure 45A:
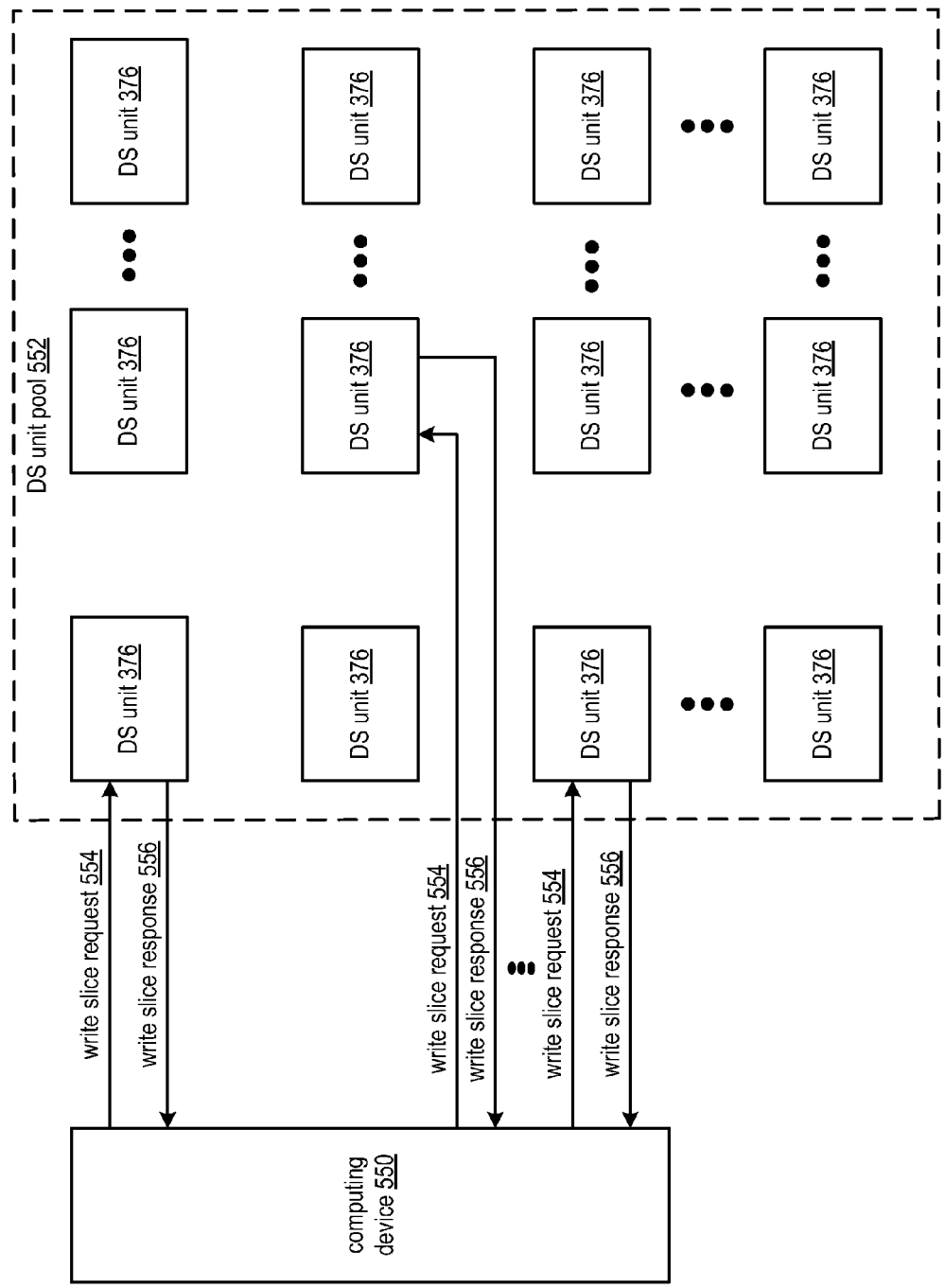
Figure 45B:
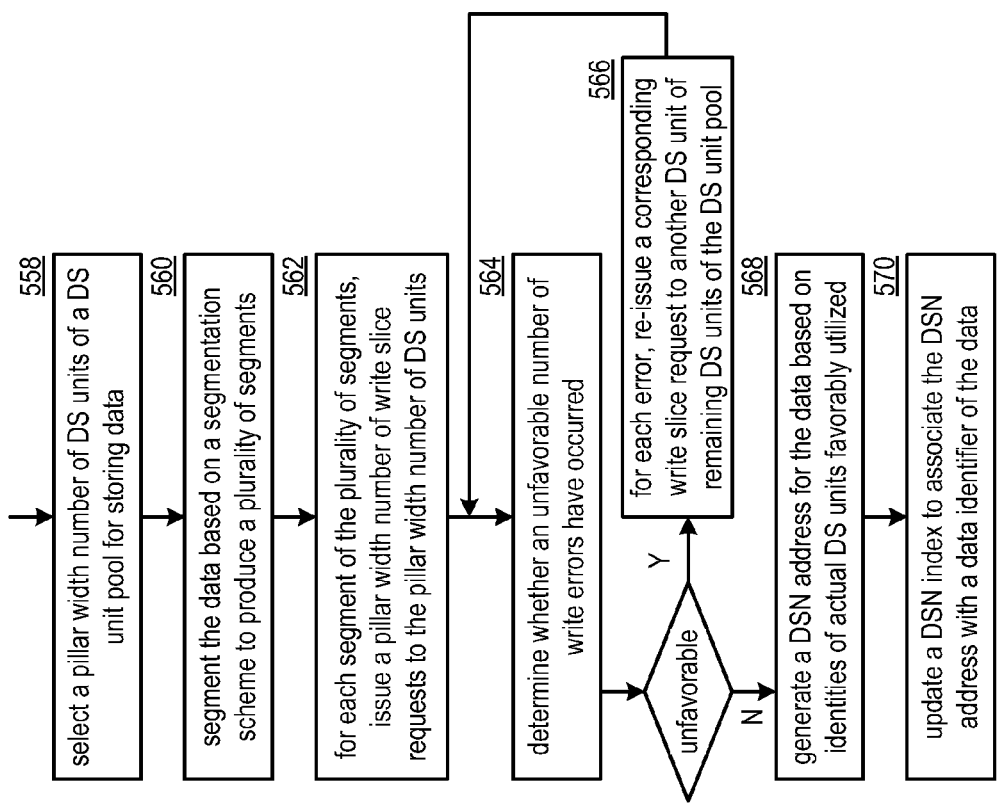

FIGS. 44A, B, D, E, F are schematic block diagrams of an embodiment of a dispersed storage network (DSN) illustrating example steps of modifying a DSN memory data access response plan in accordance with the present invention;

FIG. 44C is a diagram illustrating an example of a storage node pool assignment table in accordance with the present invention;

FIG. 44G is a flowchart illustrating an example of modifying a dispersed storage network (DSN) memory data access response plan in accordance with the present invention;

FIG. 45A is a schematic block diagram of another embodiment of a dispersed storage system in accordance with the present invention; and FIG. 45B is a flowchart illustrating an example of storing data in accordance with the present invention.

DETAILED DESCRIPTION OF THE INVENTION

Figure 1:
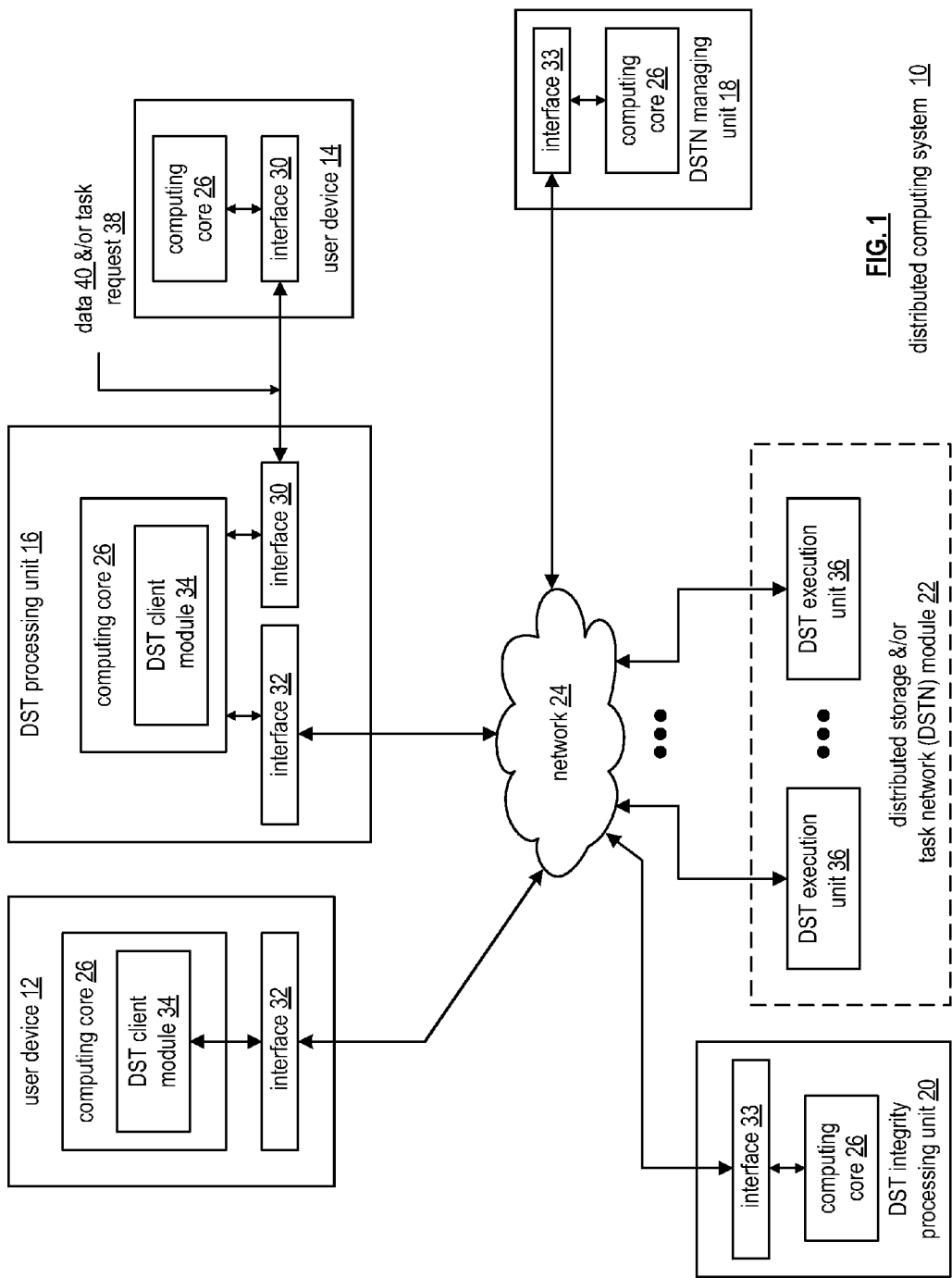
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interfaces 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
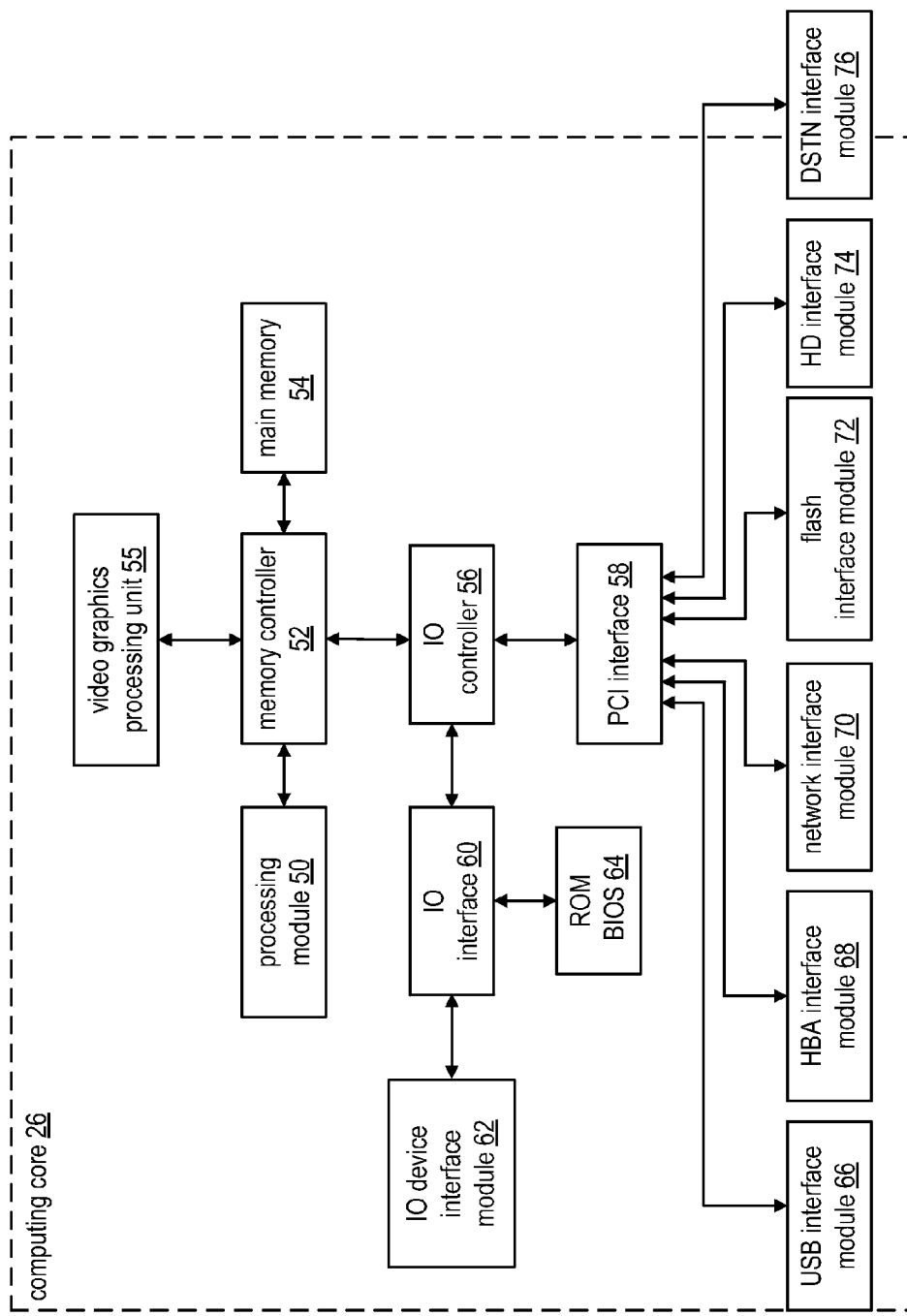
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
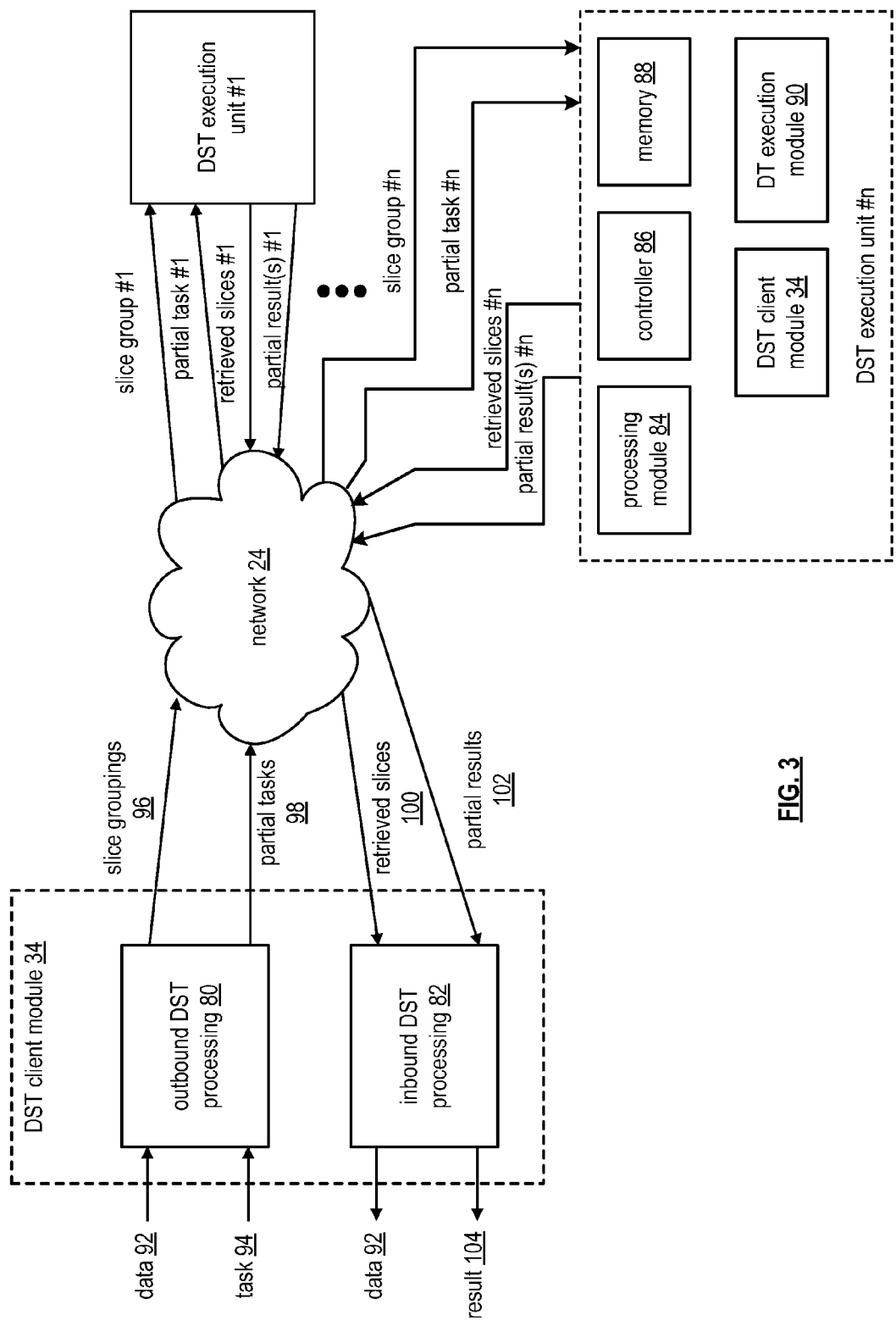
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
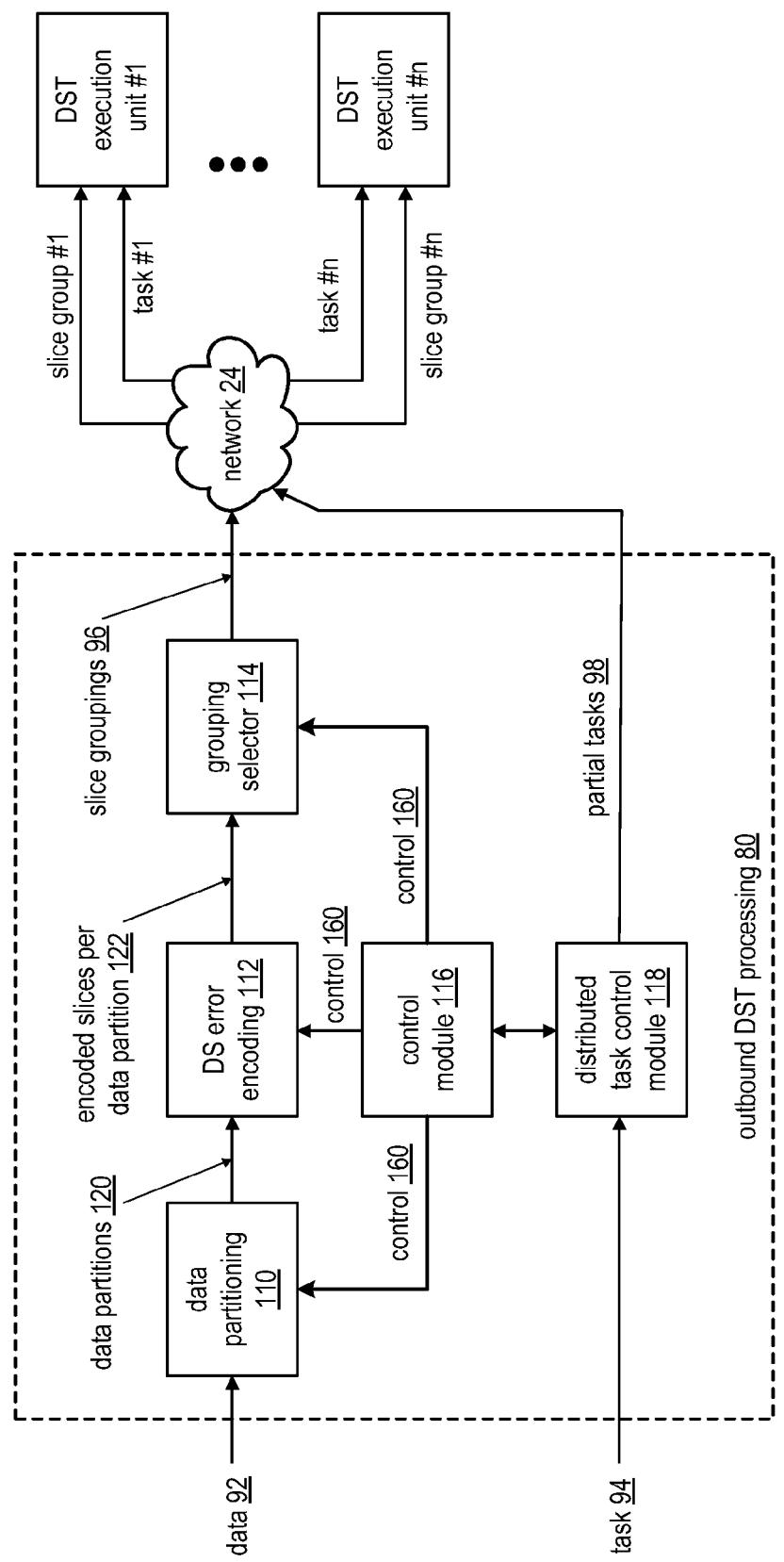
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terra-Bytes) into 100,000 data segments, each being 1 Giga-Byte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the group selecting module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
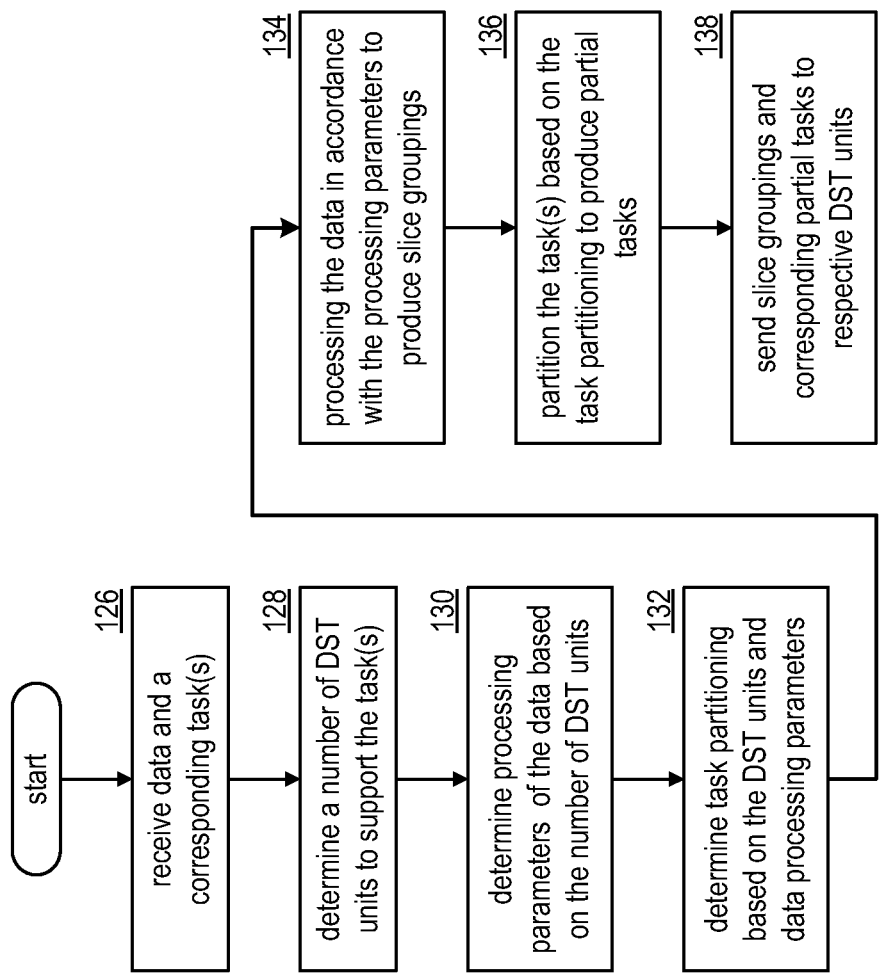
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
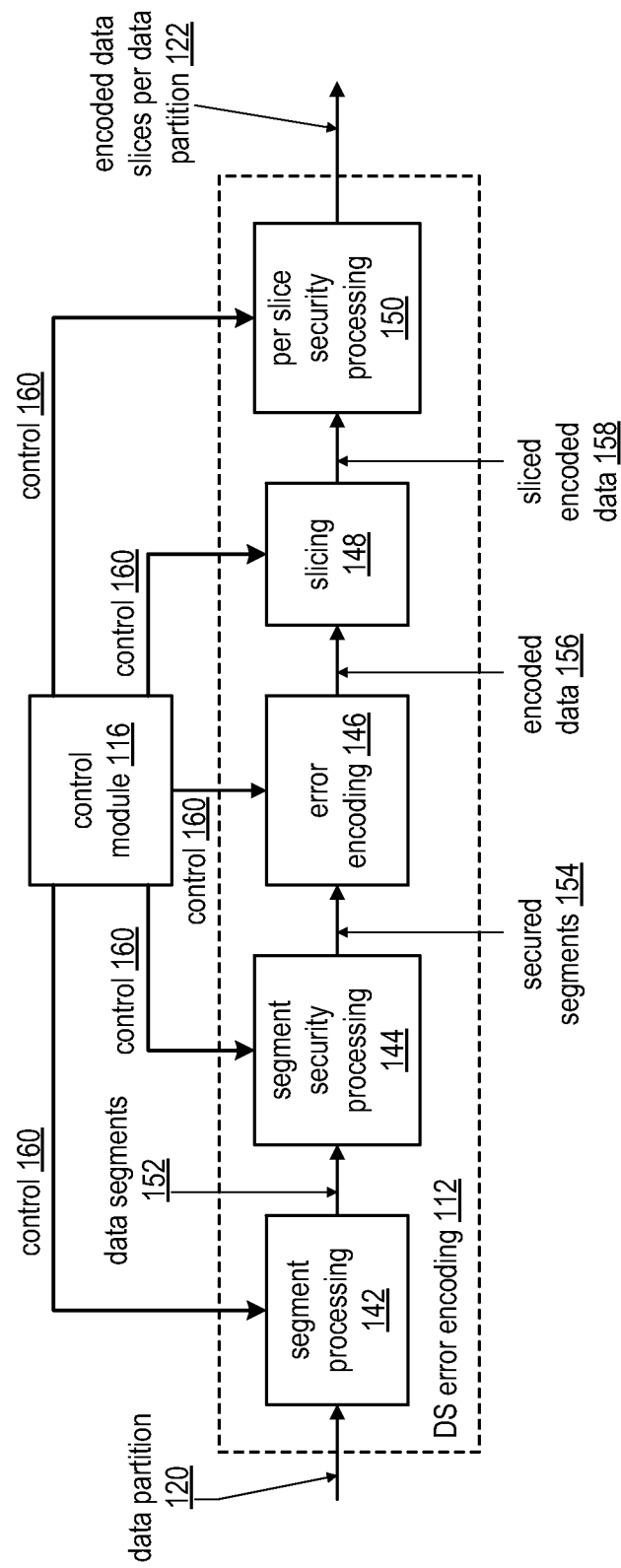
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
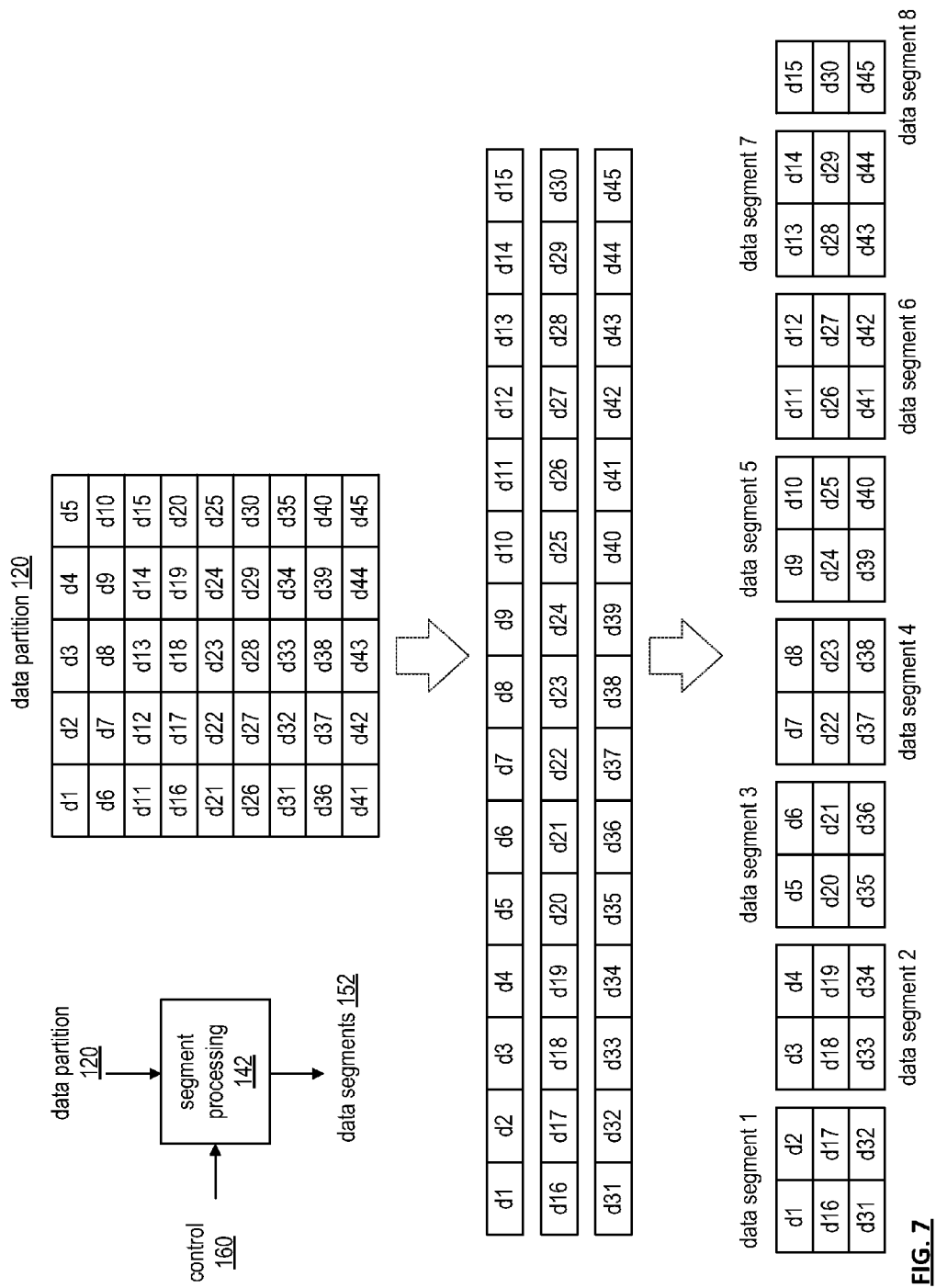
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
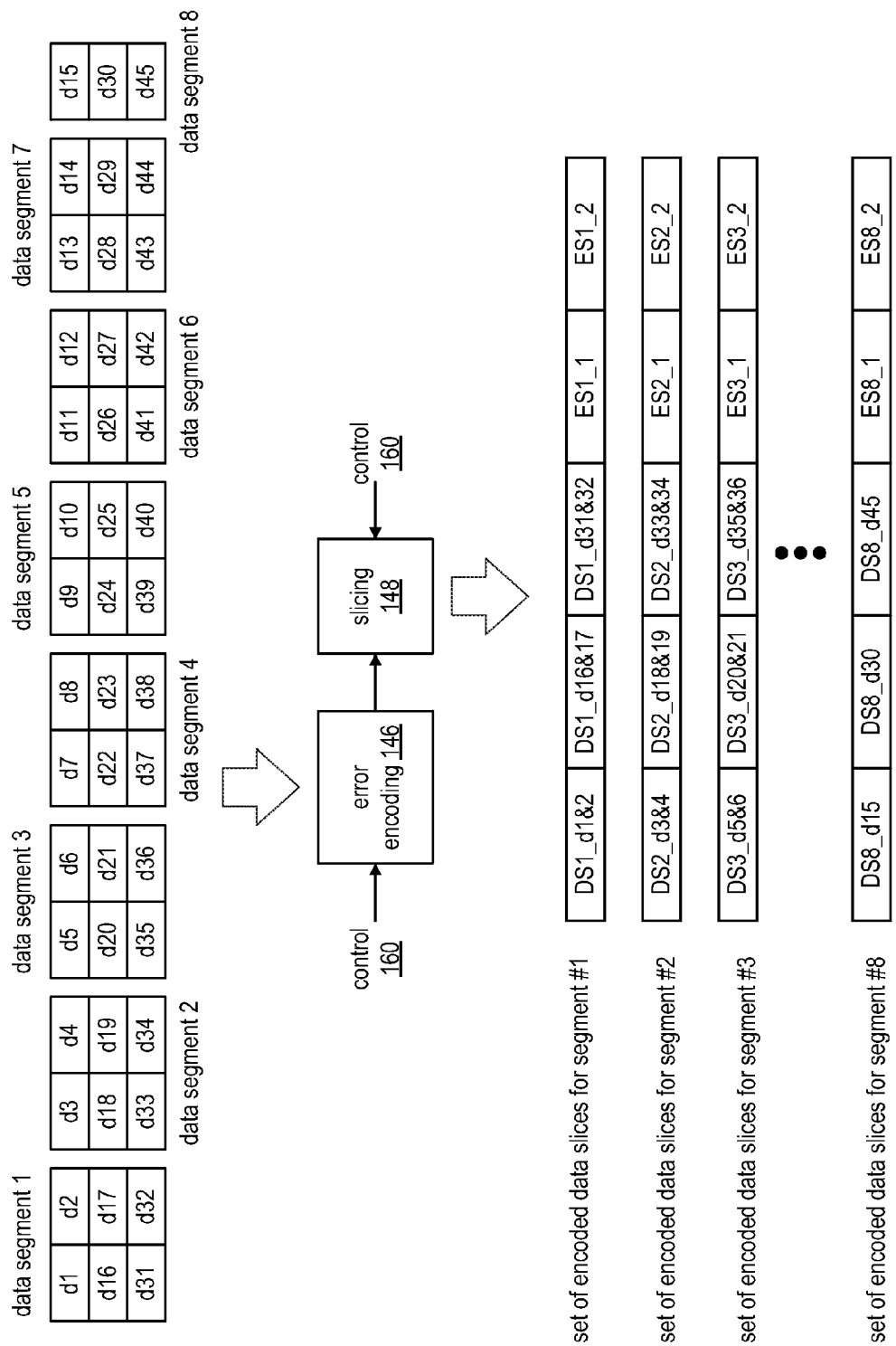
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slices of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
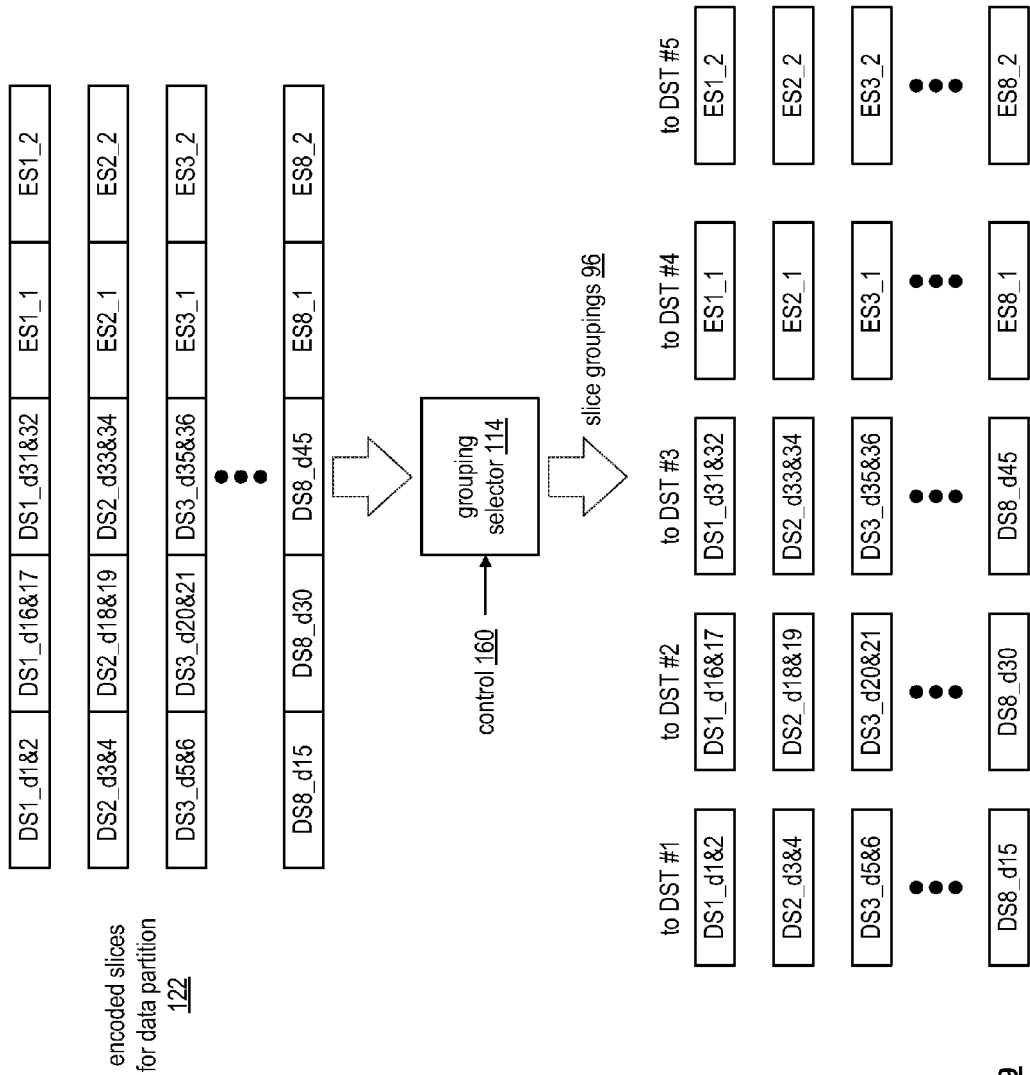
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selection module 114 organizes the encoded data slices into five slice groupings (e.g., one for each DST execution unit of a distributed storage and task network (DSTN) module). As a specific example, the grouping selection module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selection module 114 also creates a second slice grouping for a DST execution unit #2, which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45.

The grouping selection module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selection module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
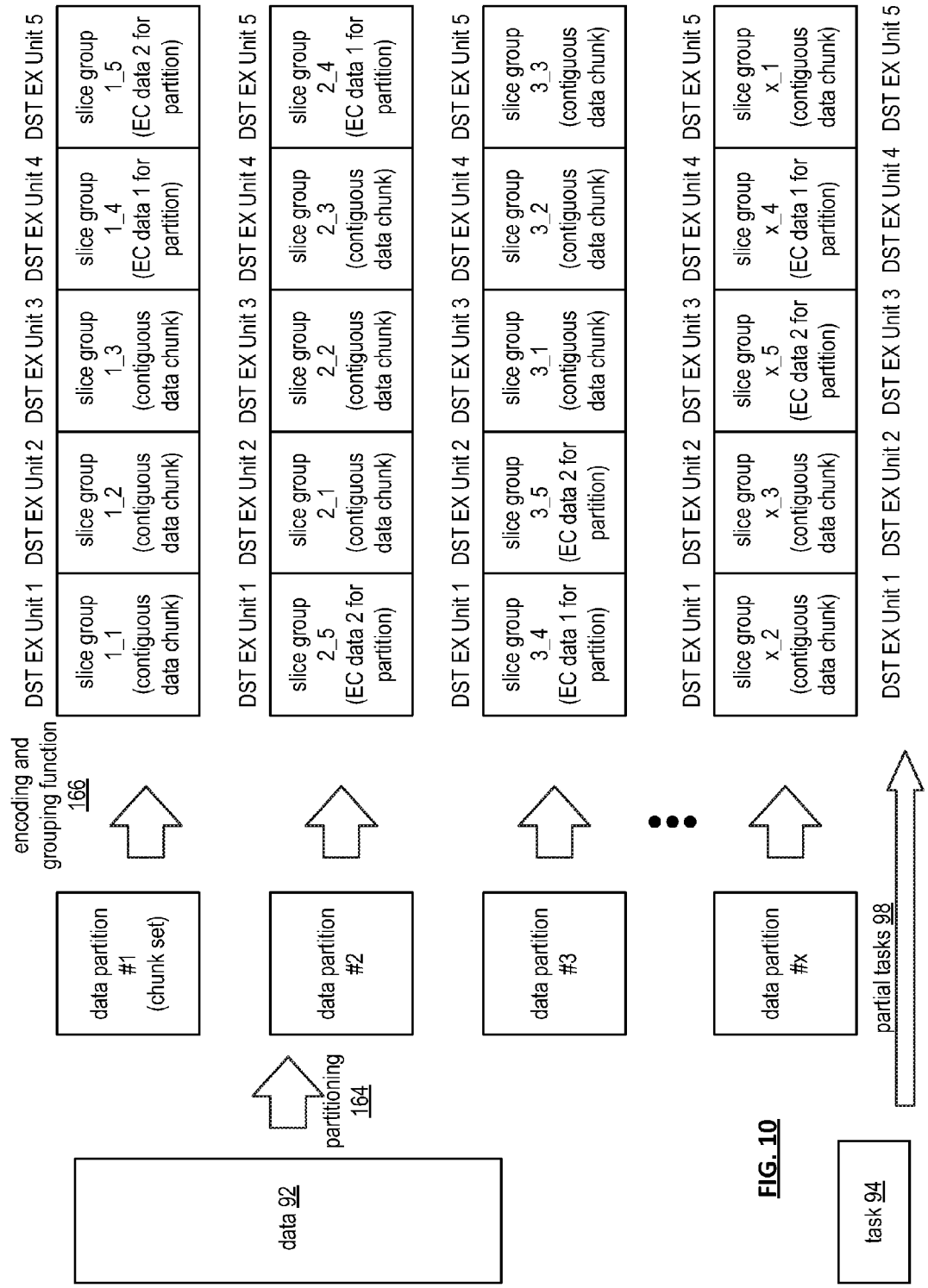
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1–x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
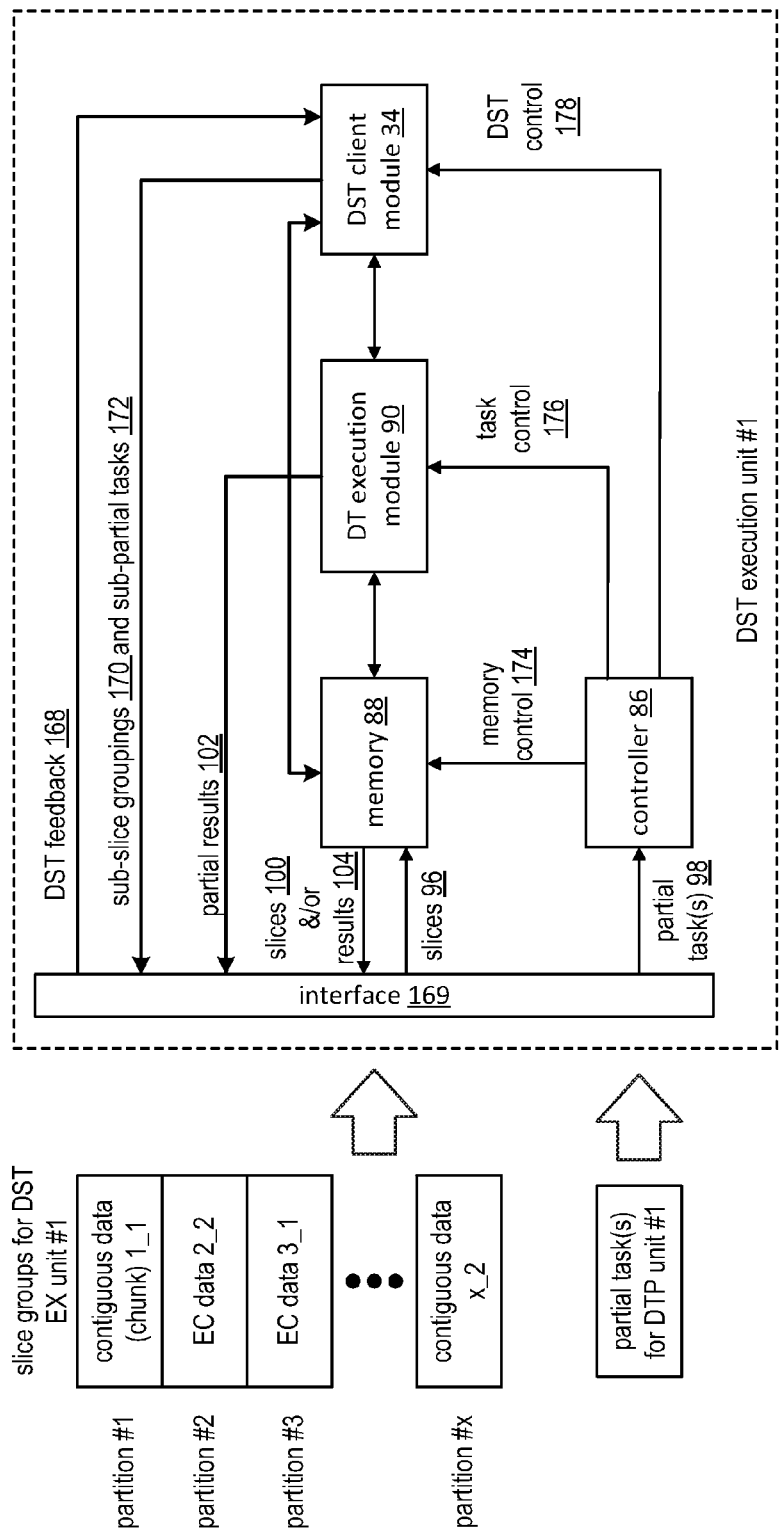
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any the other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 and the memory 88. For example, when the partial task 98 includes a retrieval request, the controller 86 outputs the memory control 174 to the memory 88 to facilitate retrieval of slices 100 and/or results 104.

Figure 12:
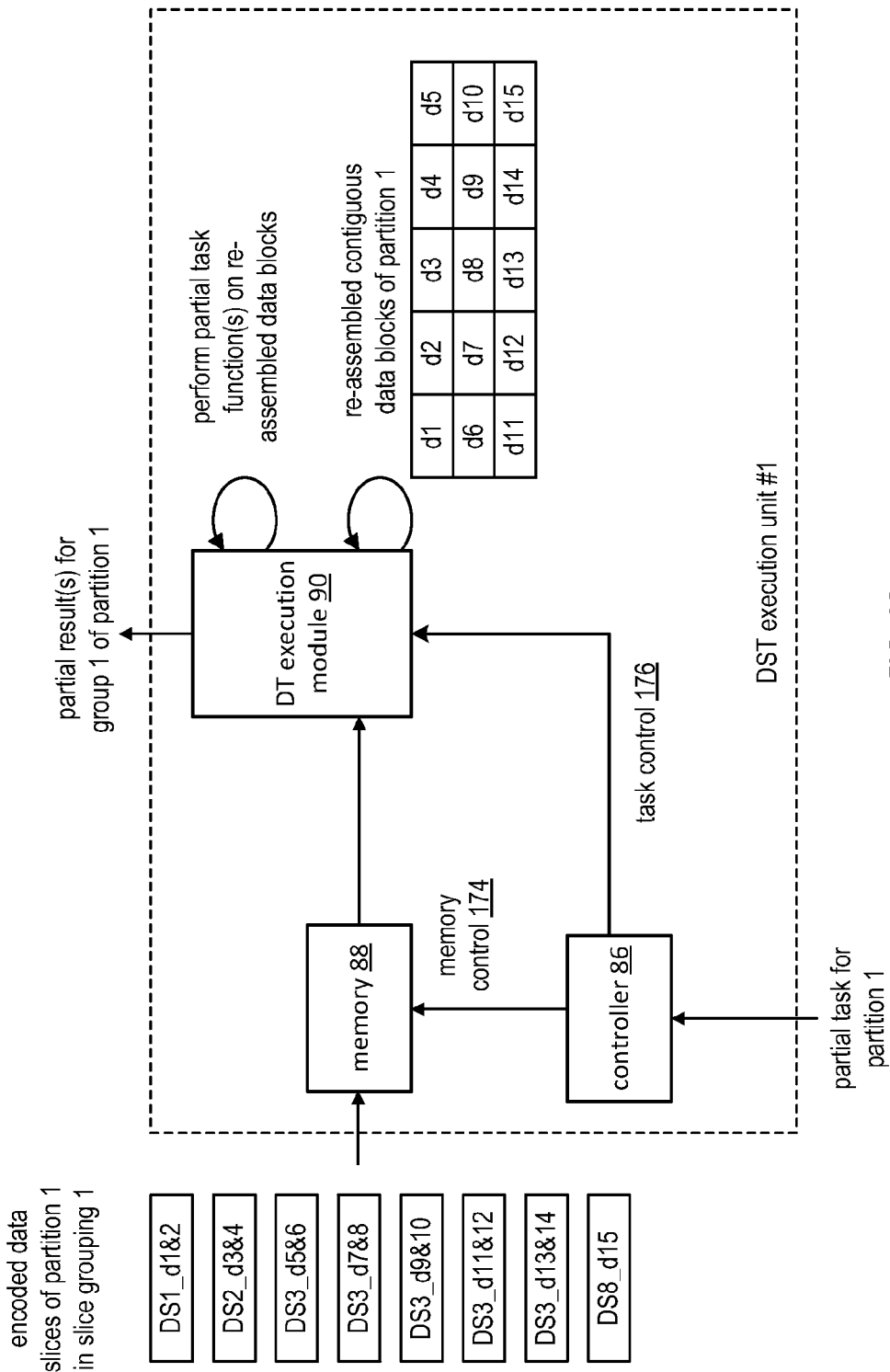
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
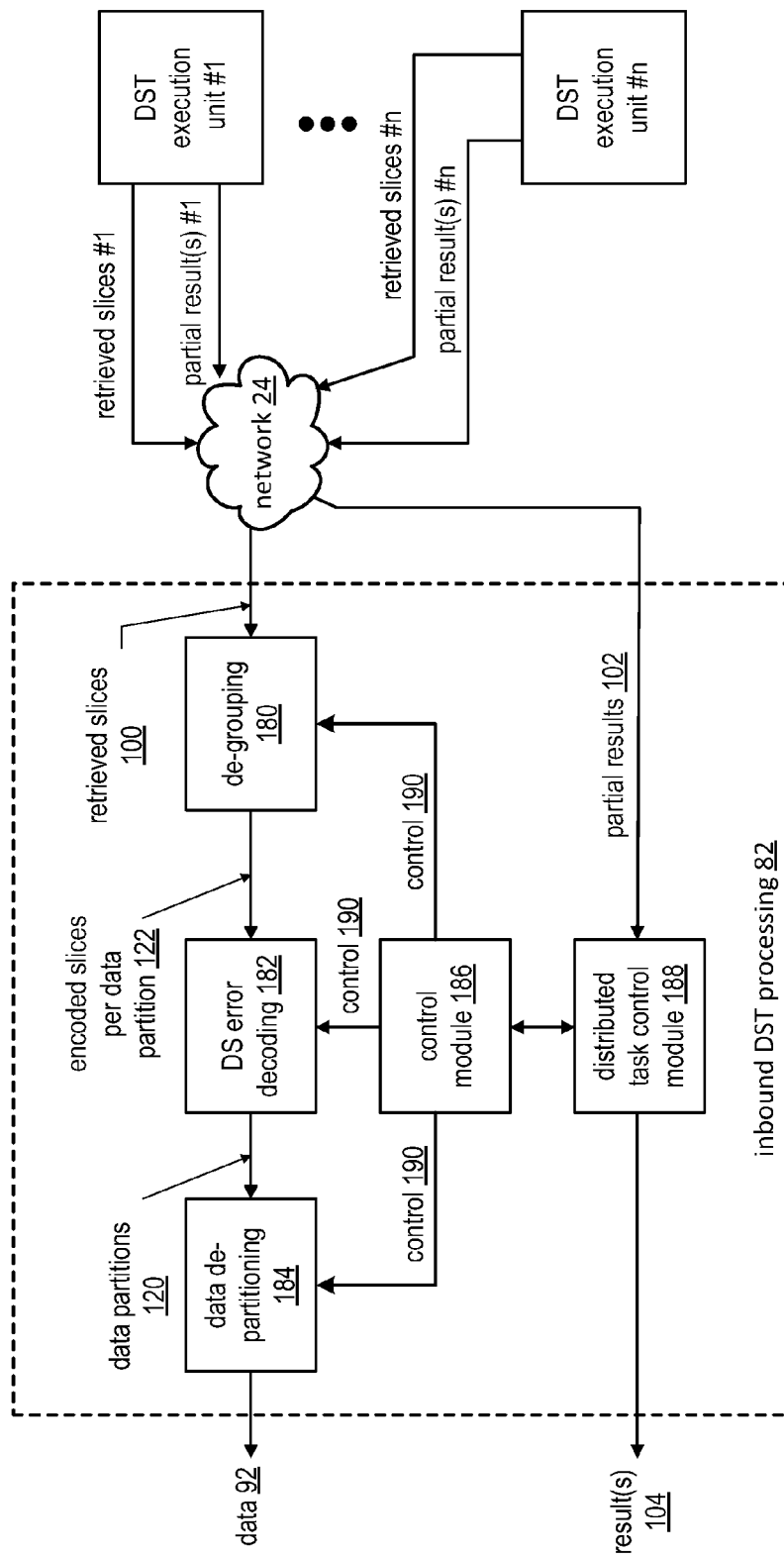
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieve slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
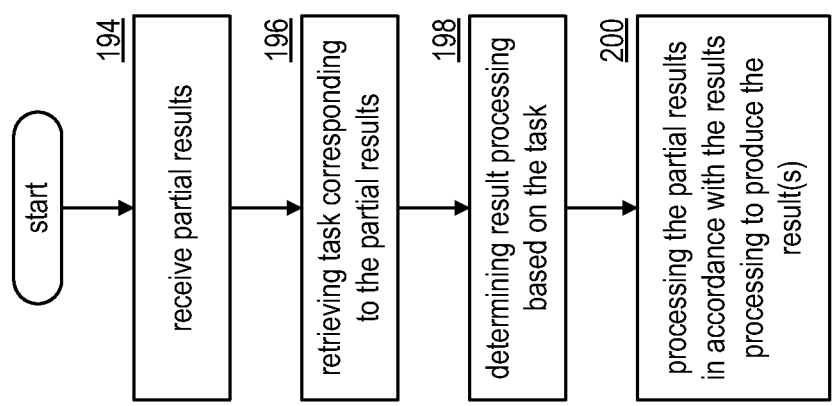
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
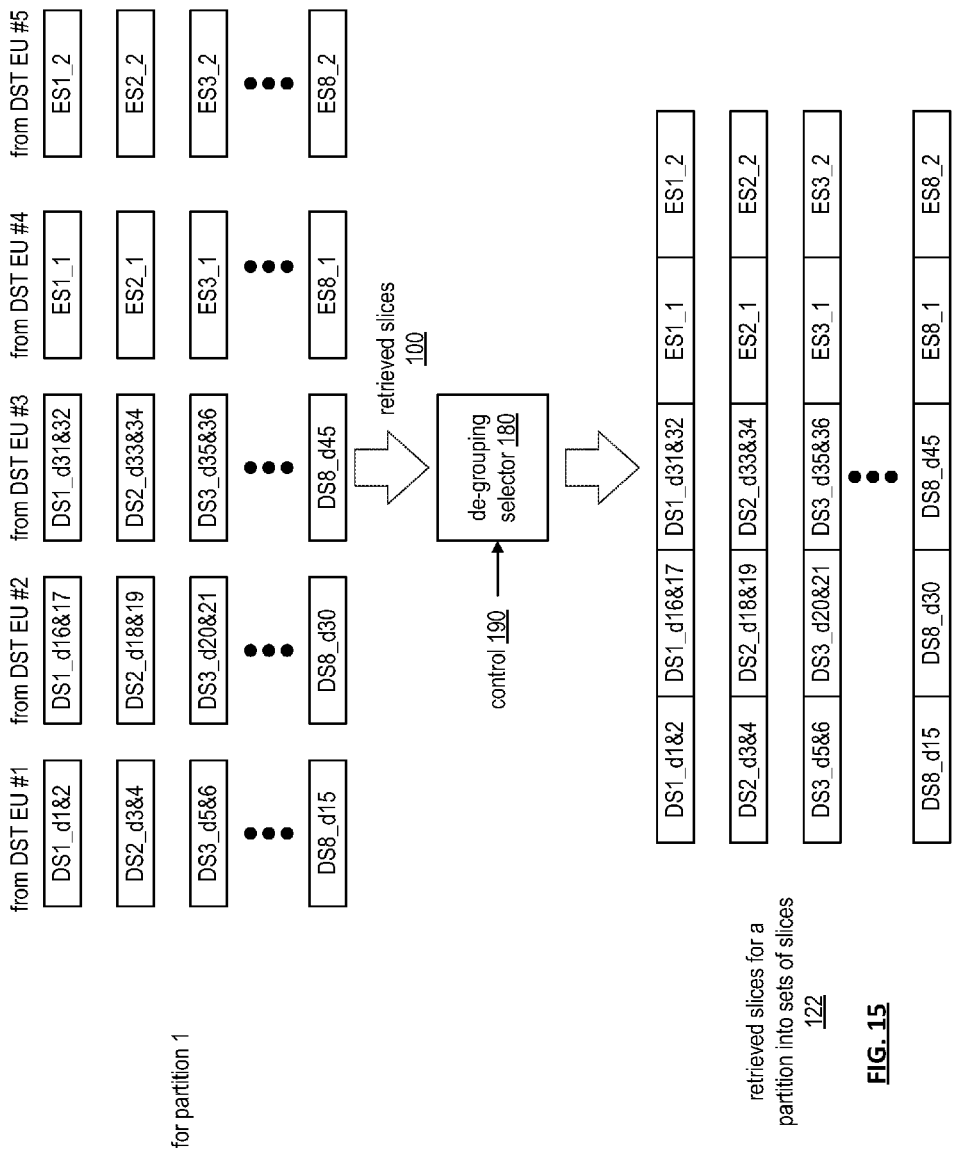
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
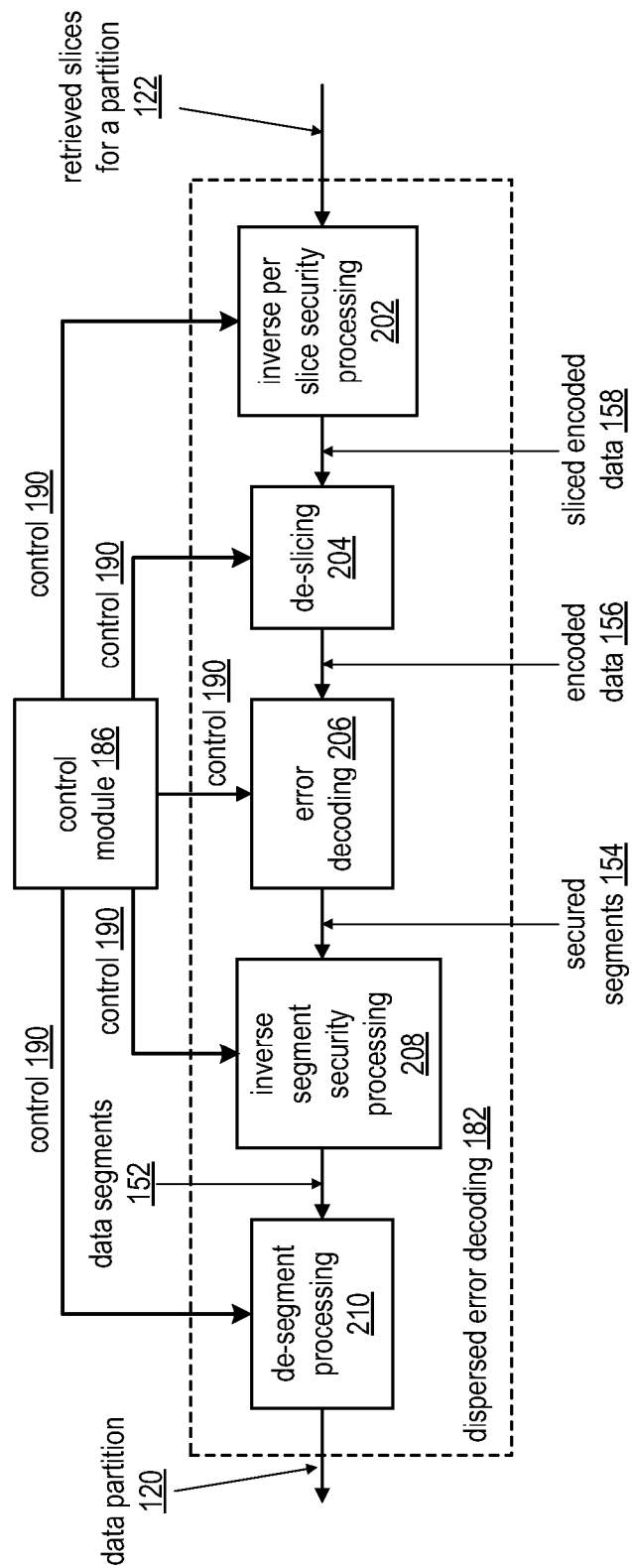
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
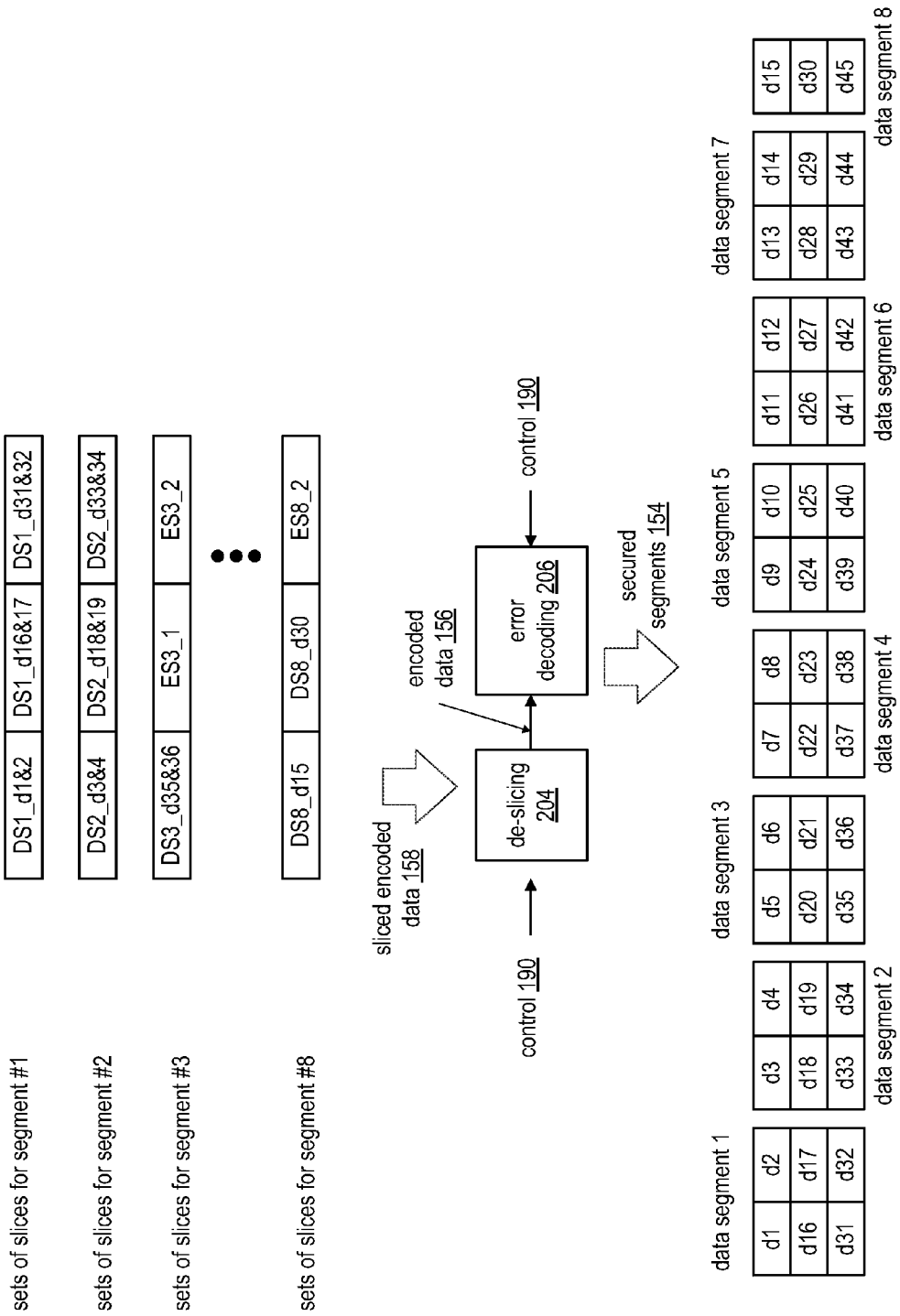
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
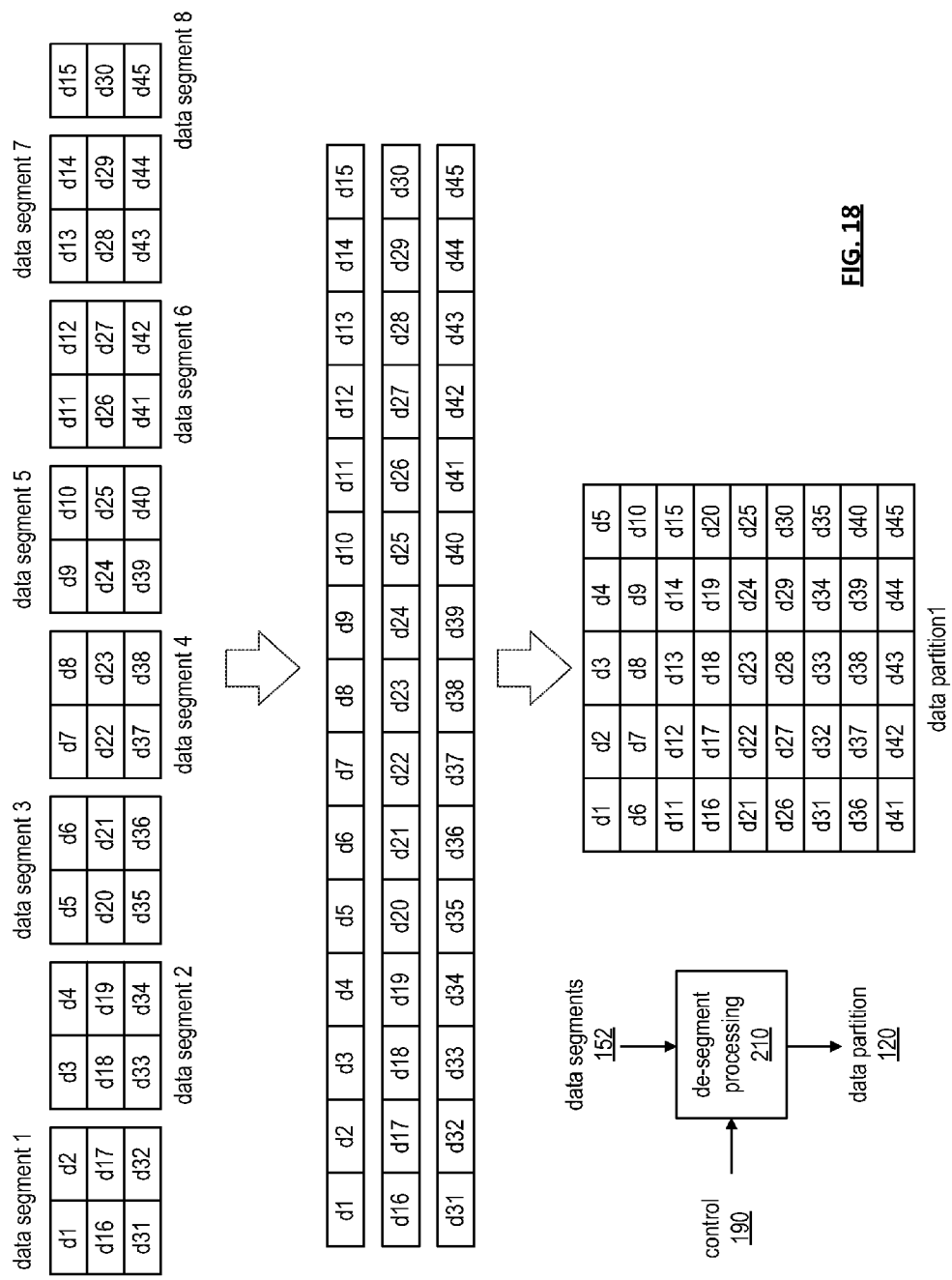
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
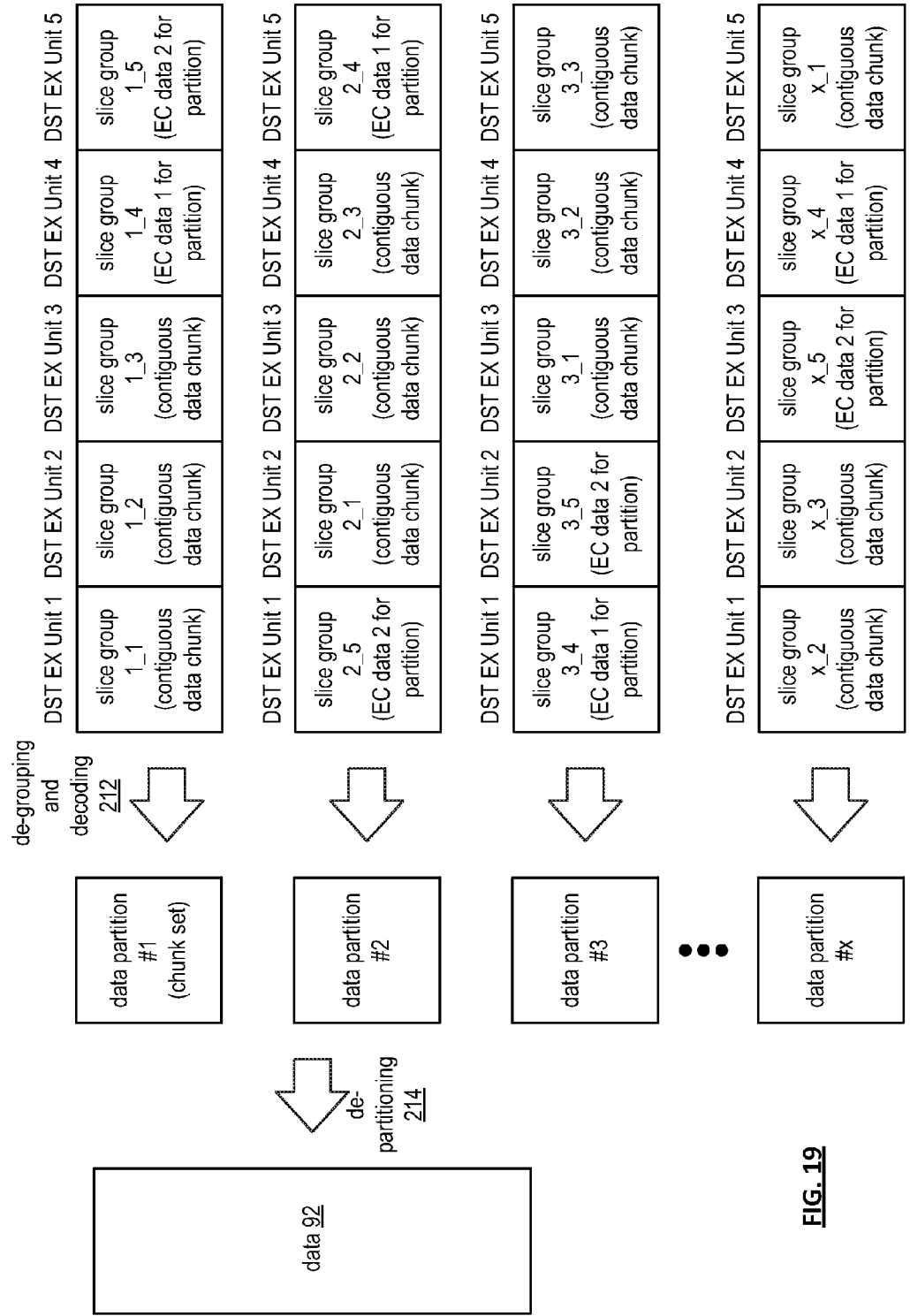
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
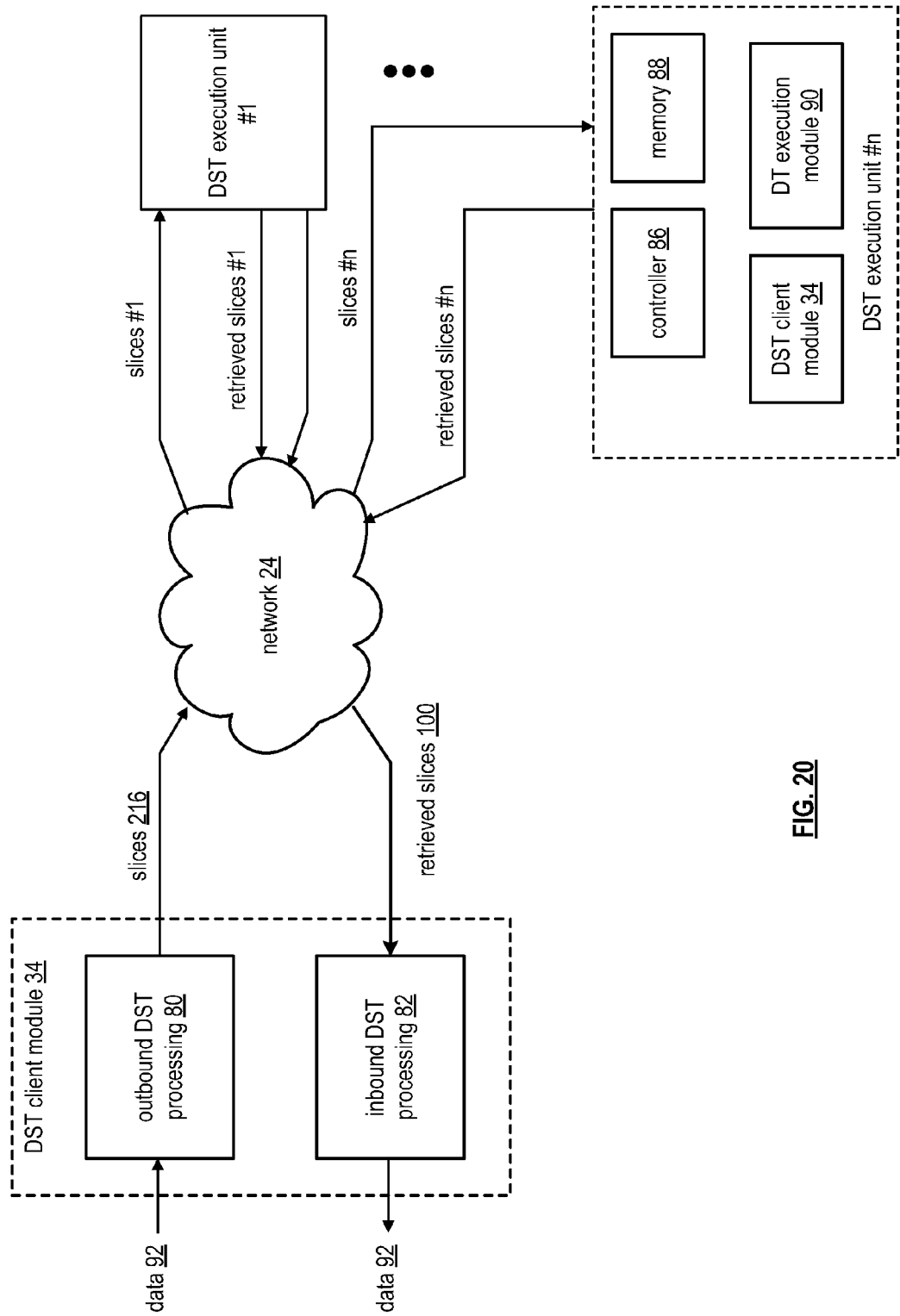
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
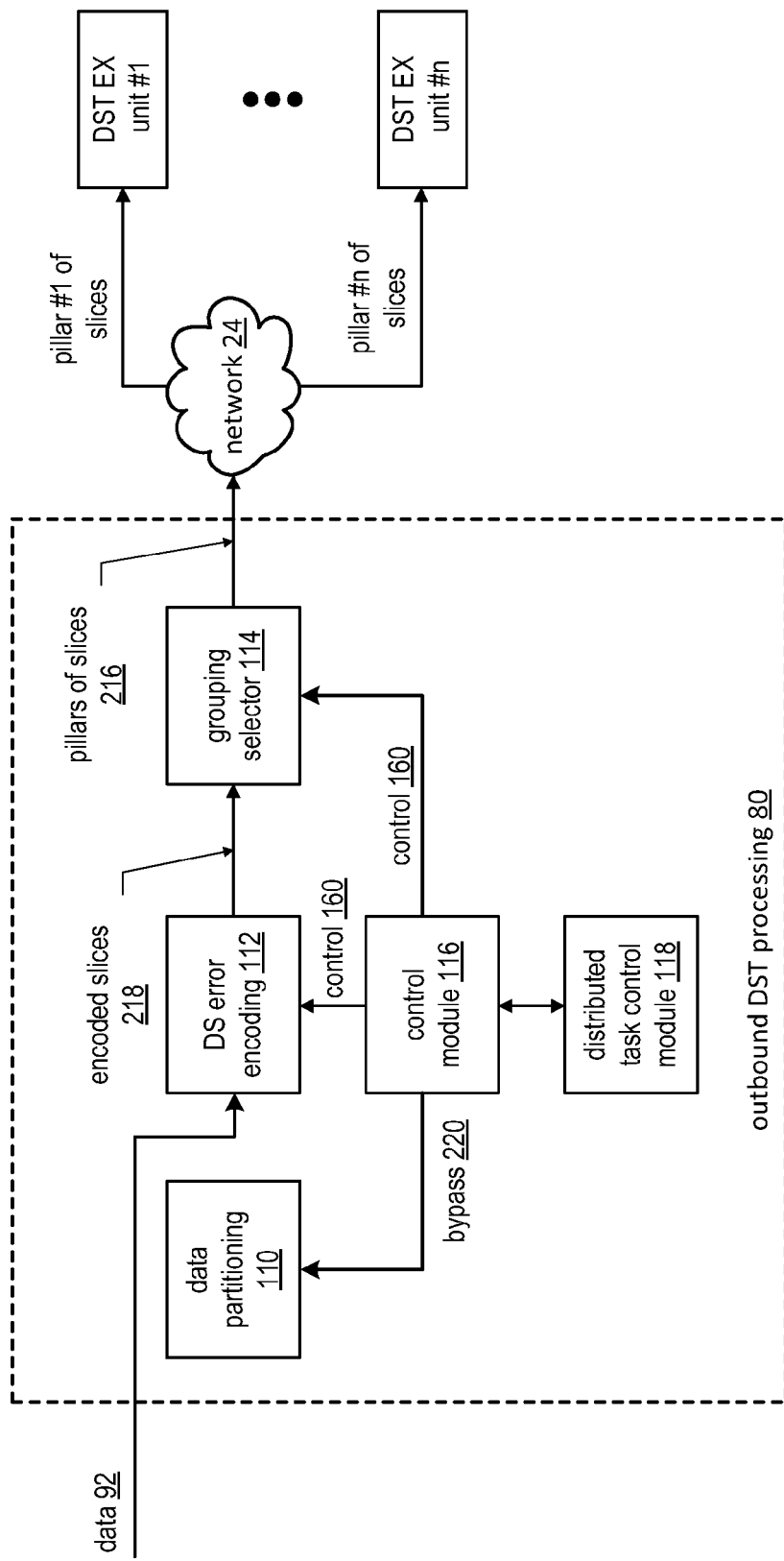
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
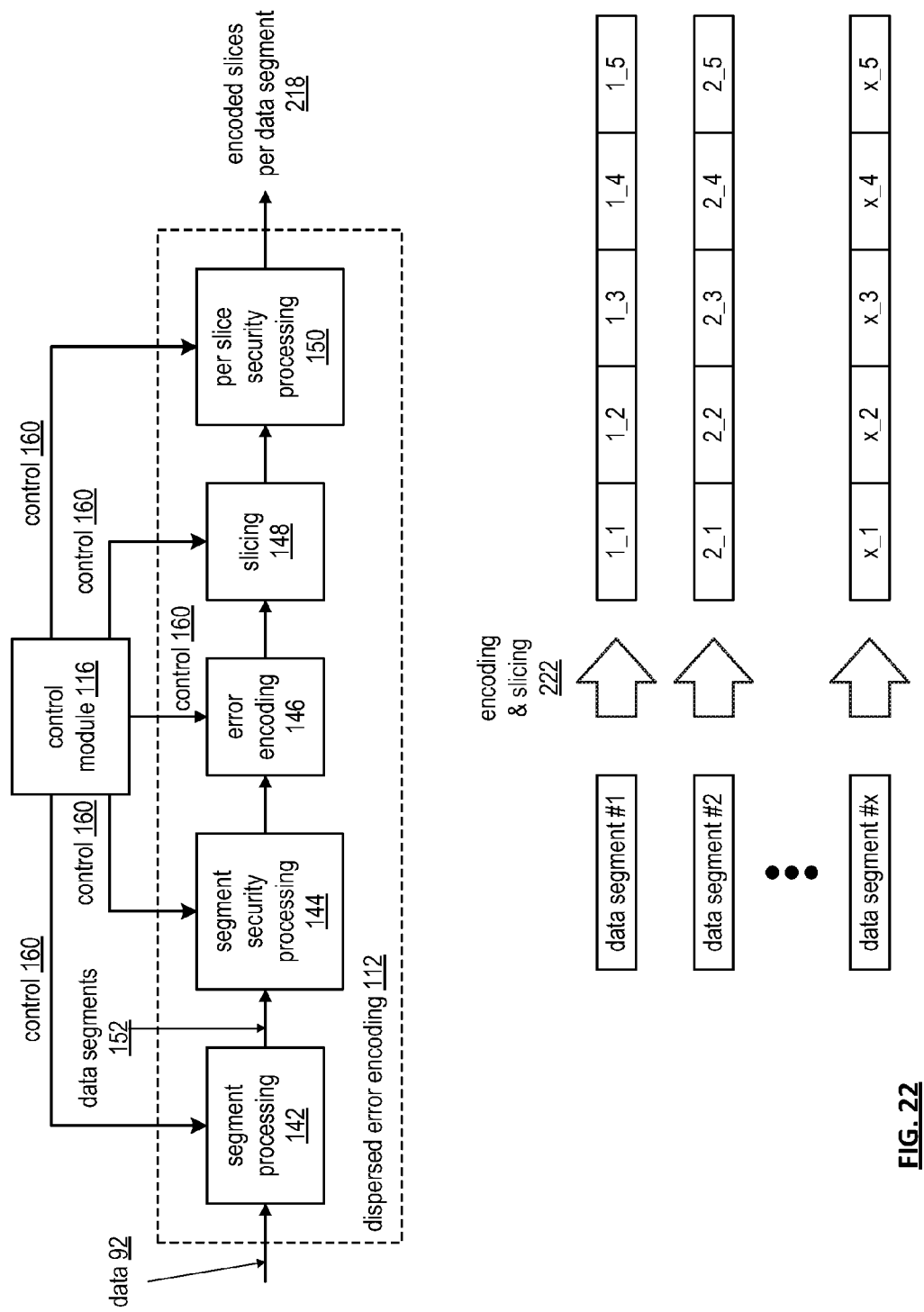
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
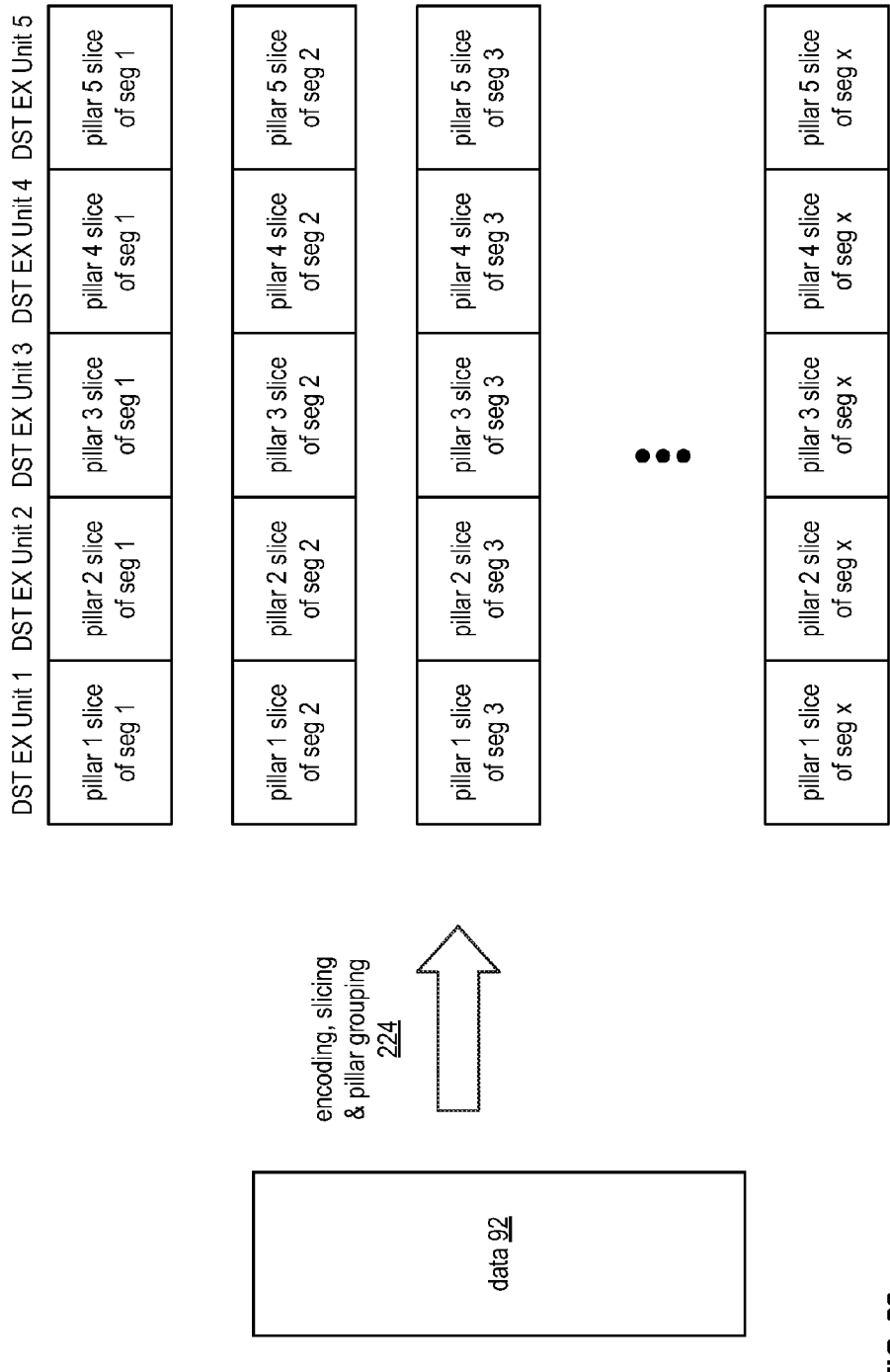
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
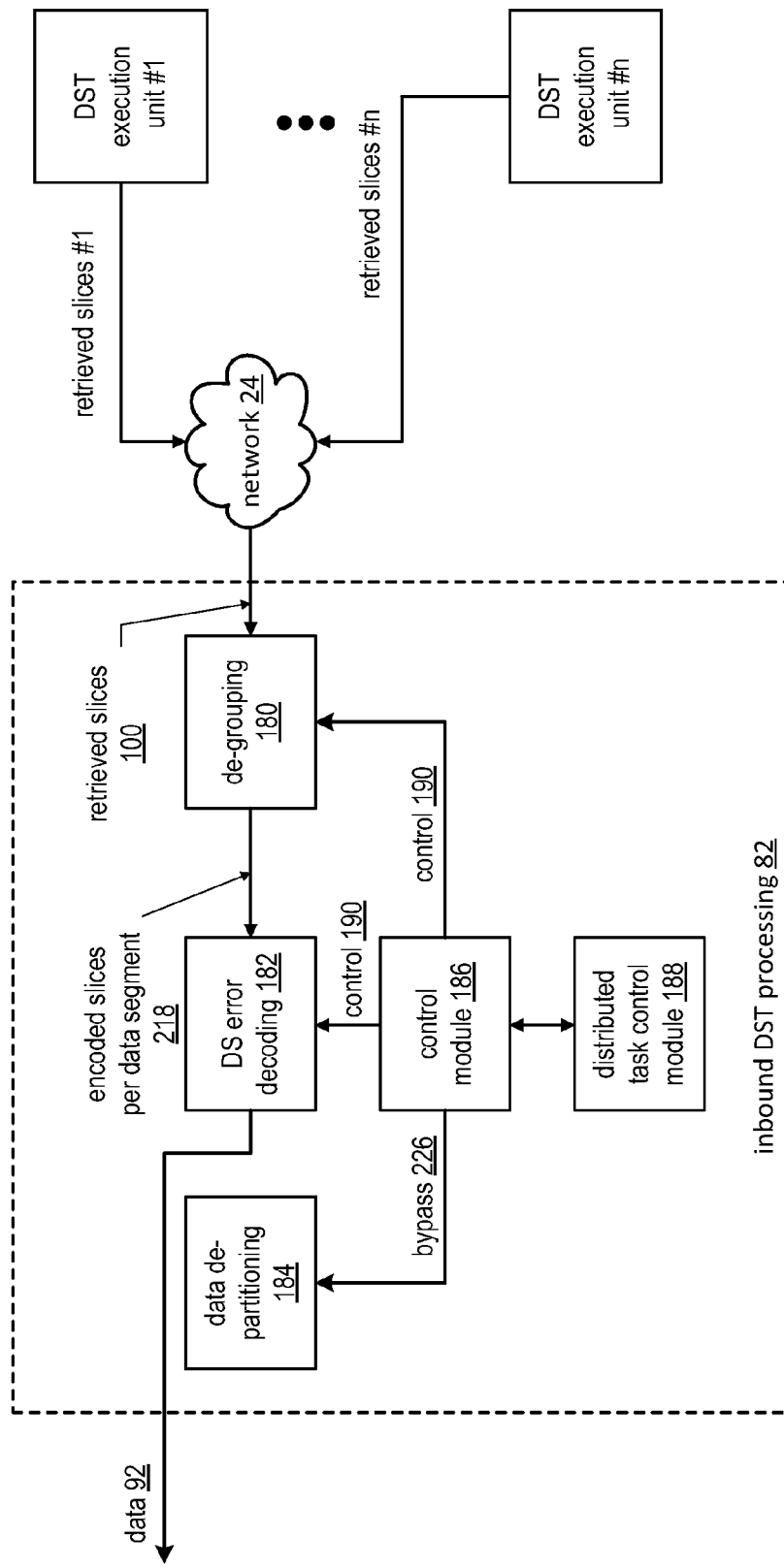
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
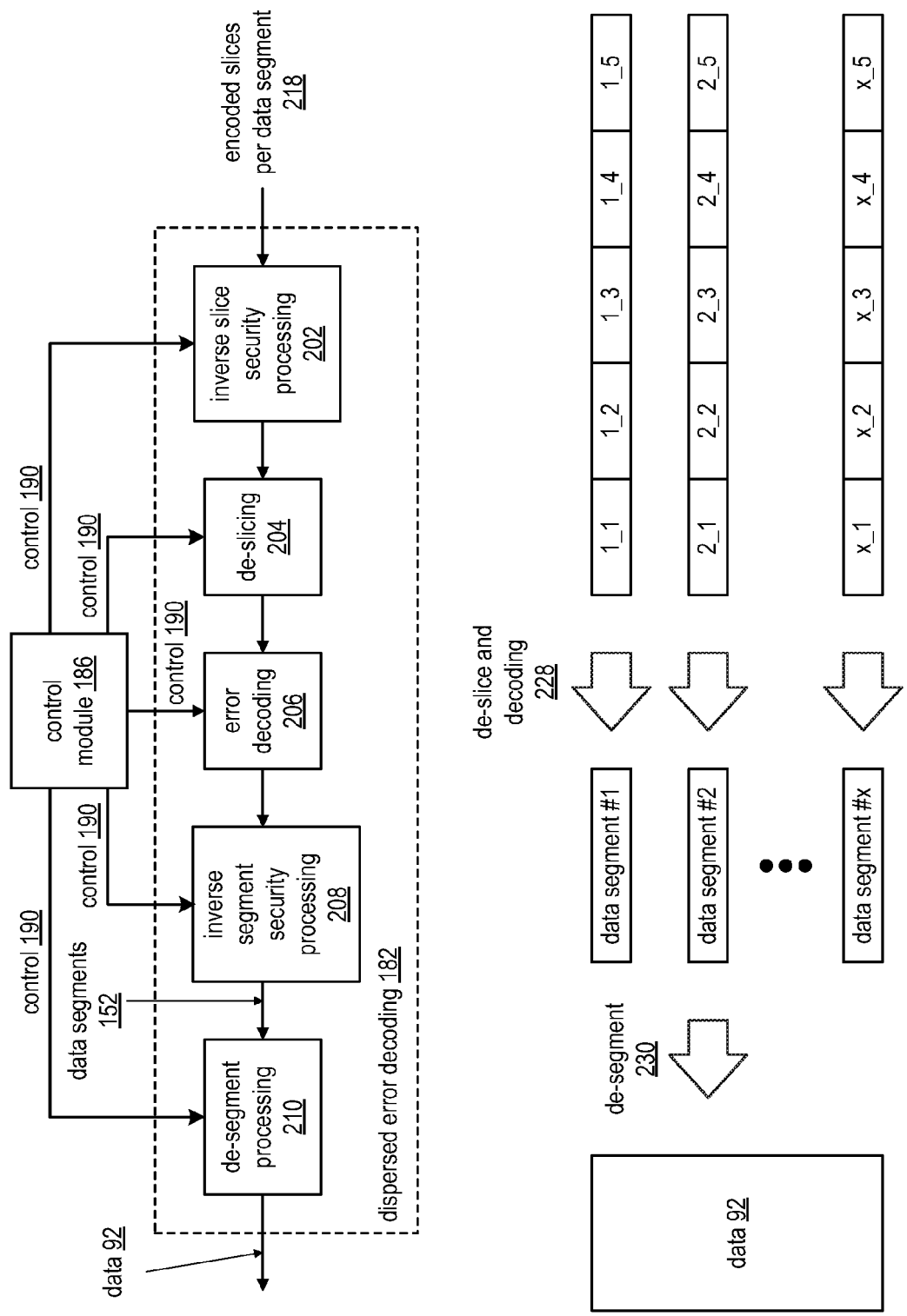
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
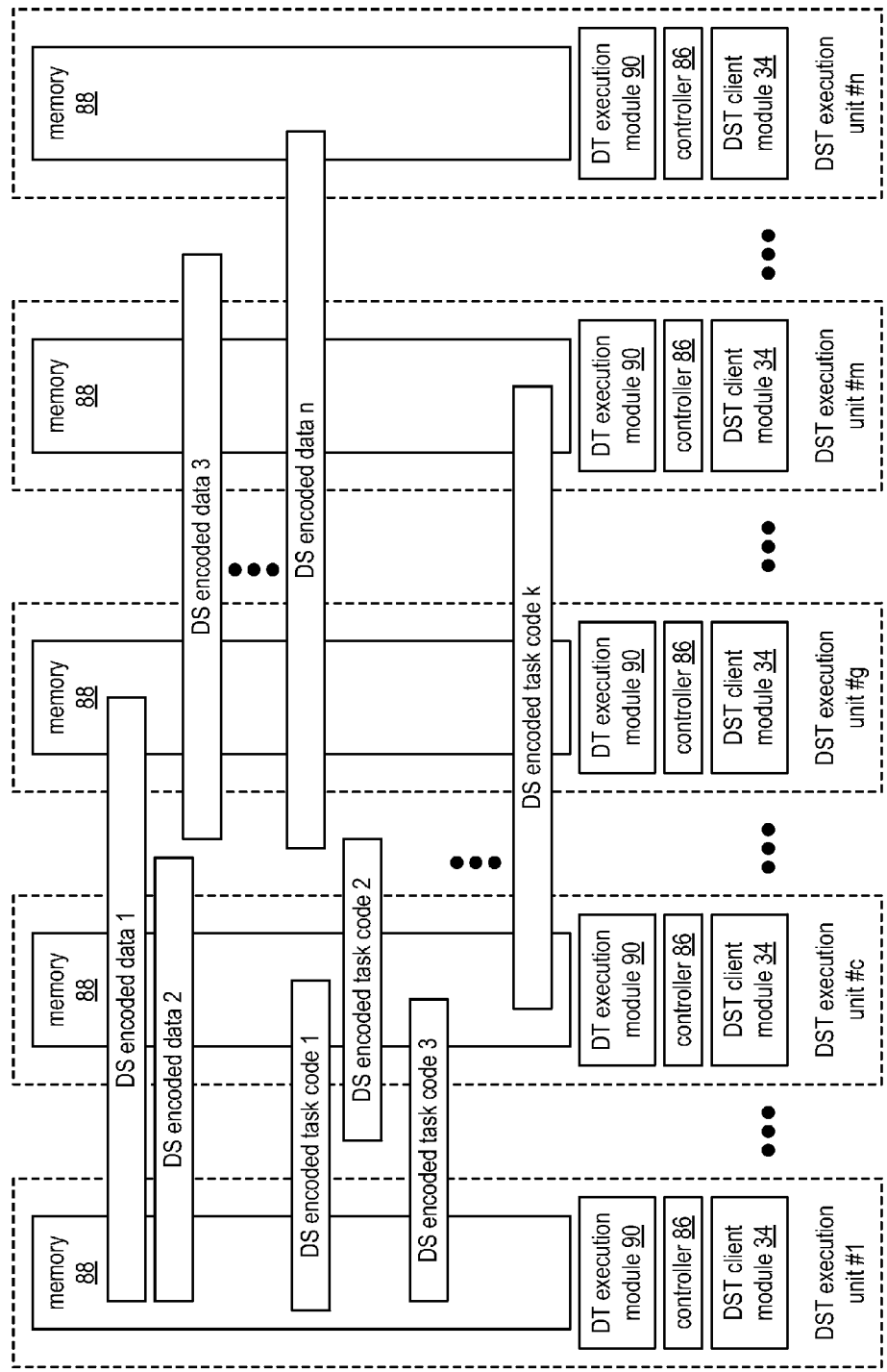
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
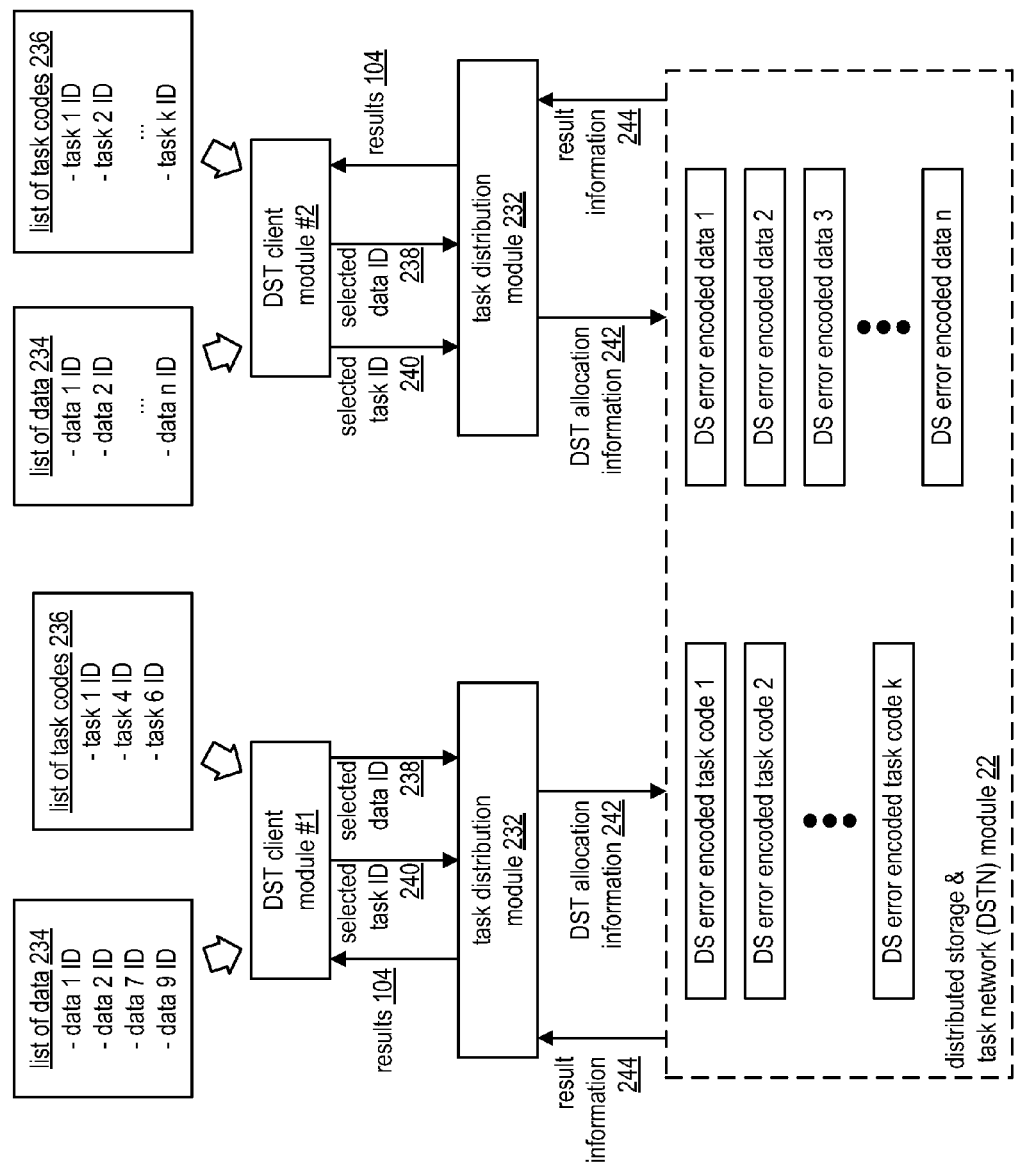
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
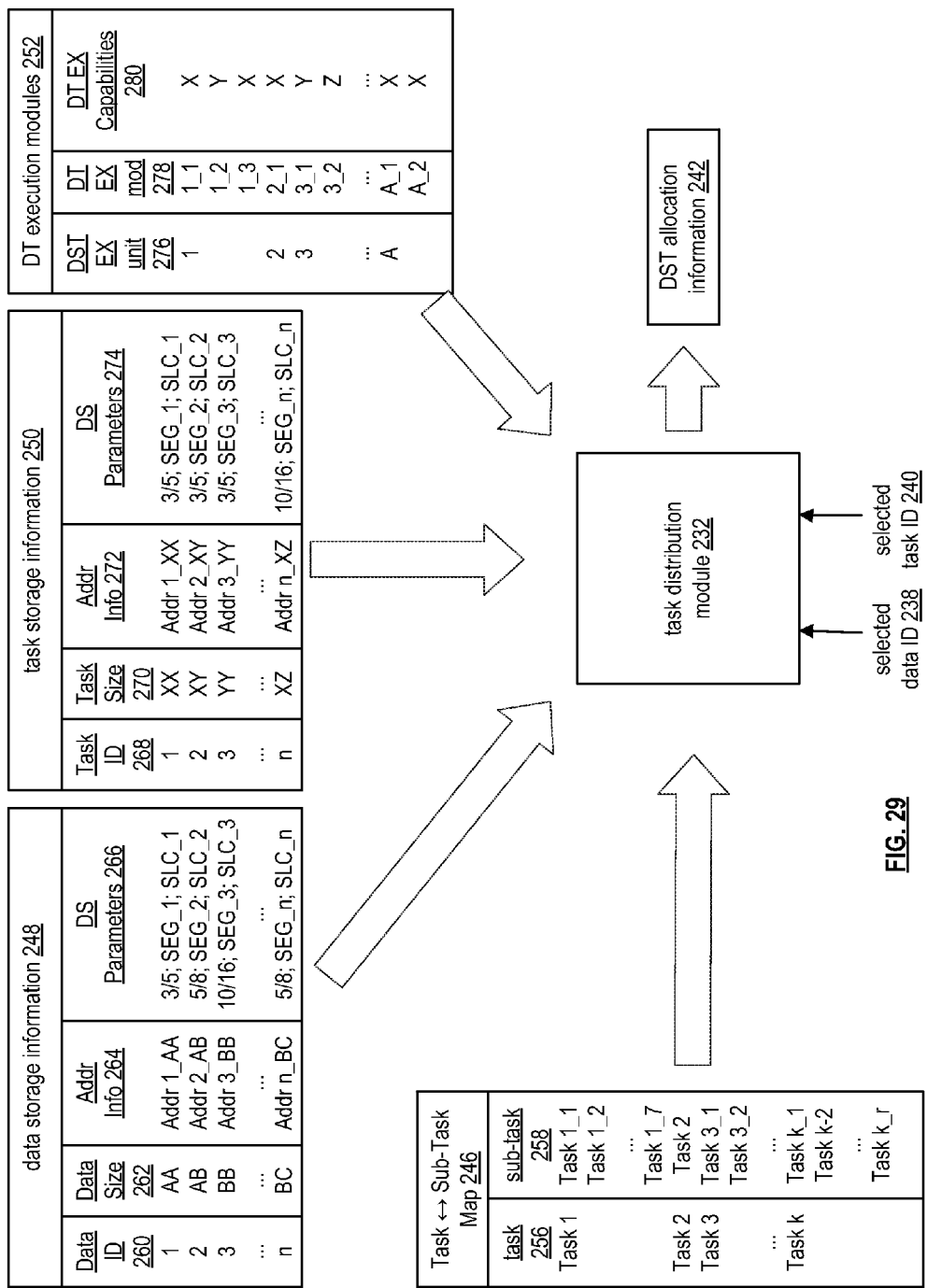
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terra-bytes or more), addressing information of Addr_1_AA, and DS parameters of $\frac{3}{5}$; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., $\frac{3}{5}$ for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of $\frac{3}{5}$; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., $\frac{3}{5}$ for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
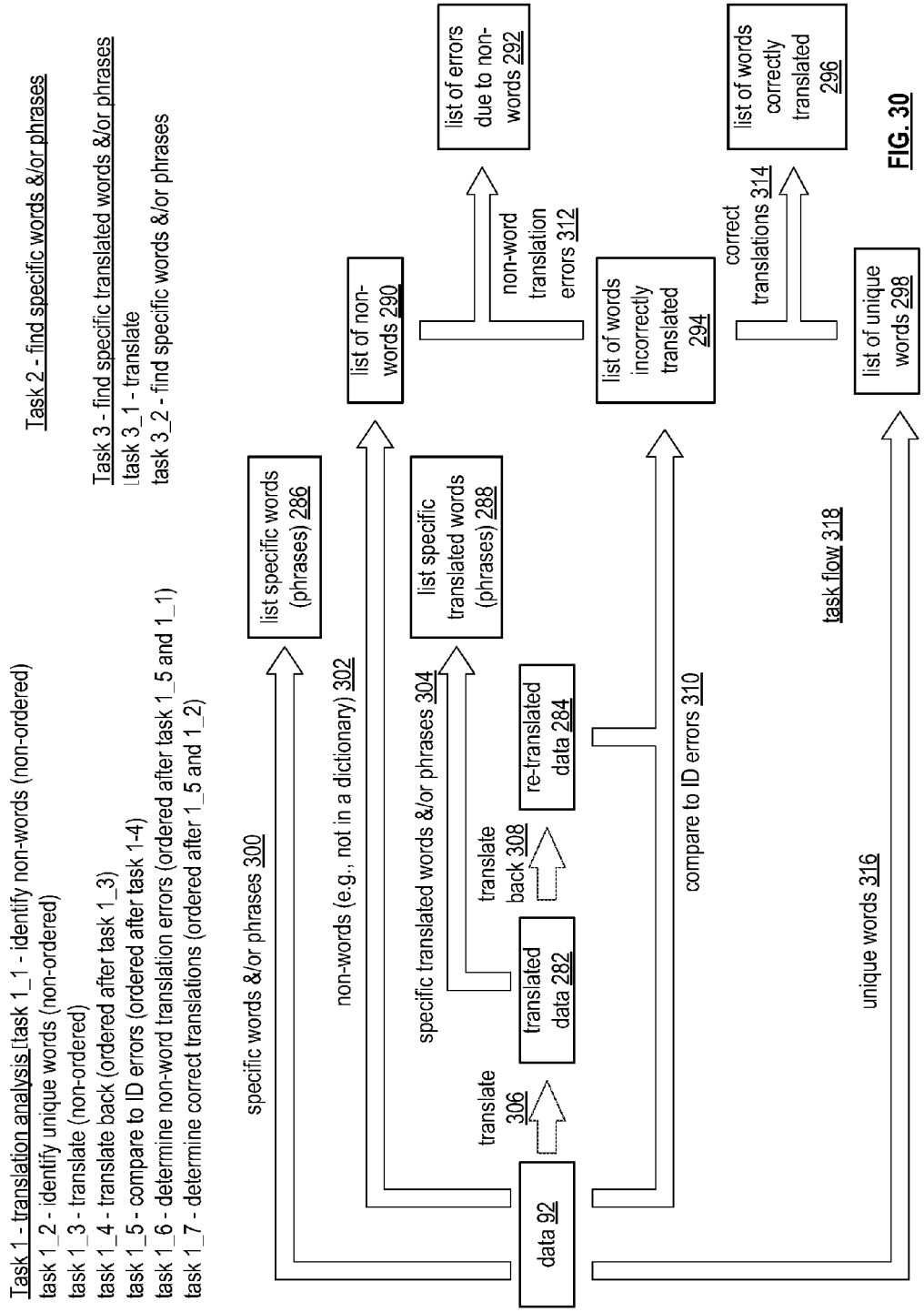
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
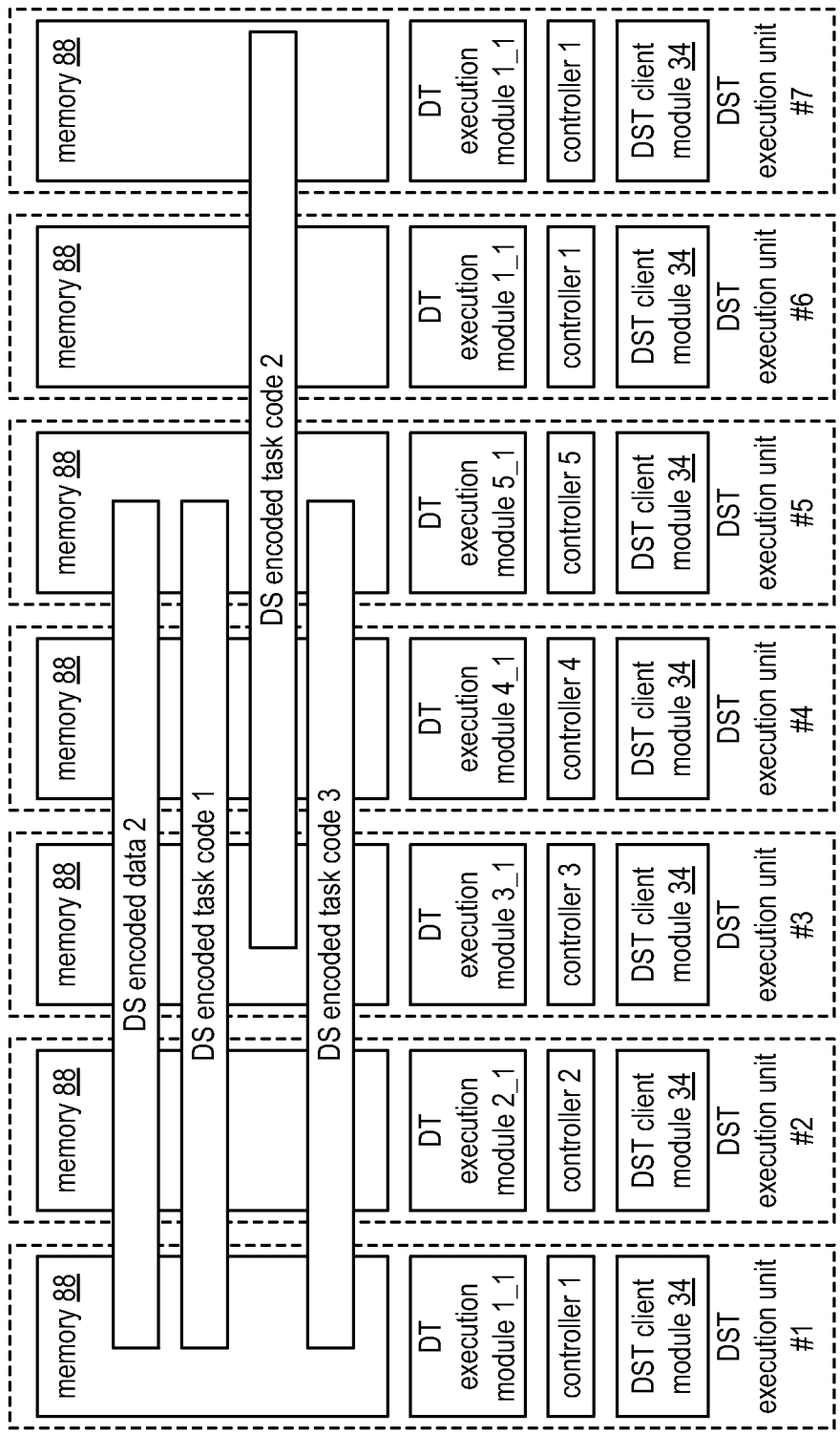
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information.

From data partition to data partition, the set of DT execution modules may be the same, different, or a combination thereof. For the data partitions, the allocated set of DT execution modules executes task 1_2 to produce a partial results (e.g., 1st through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1st through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1st through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
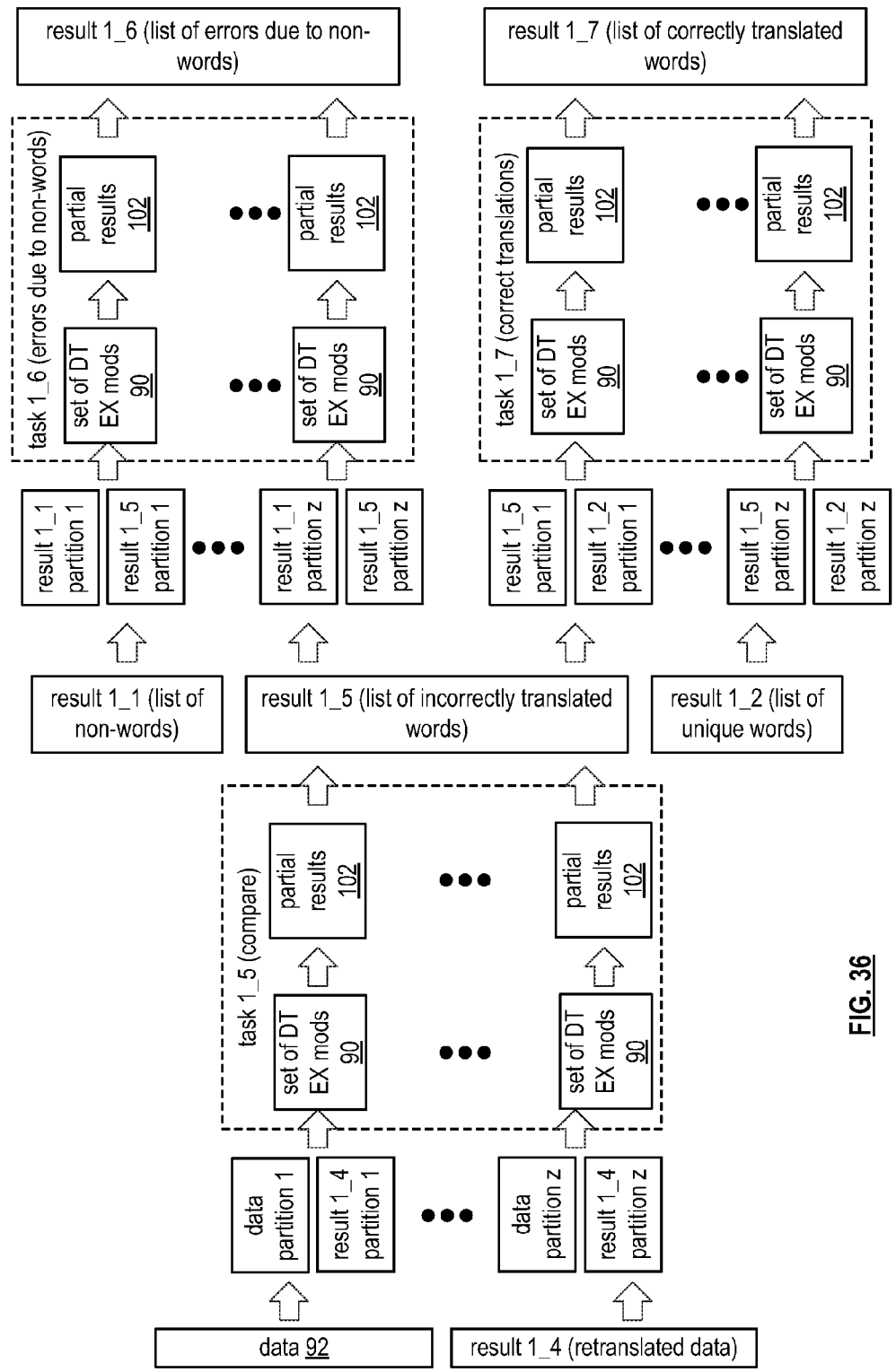

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1st through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
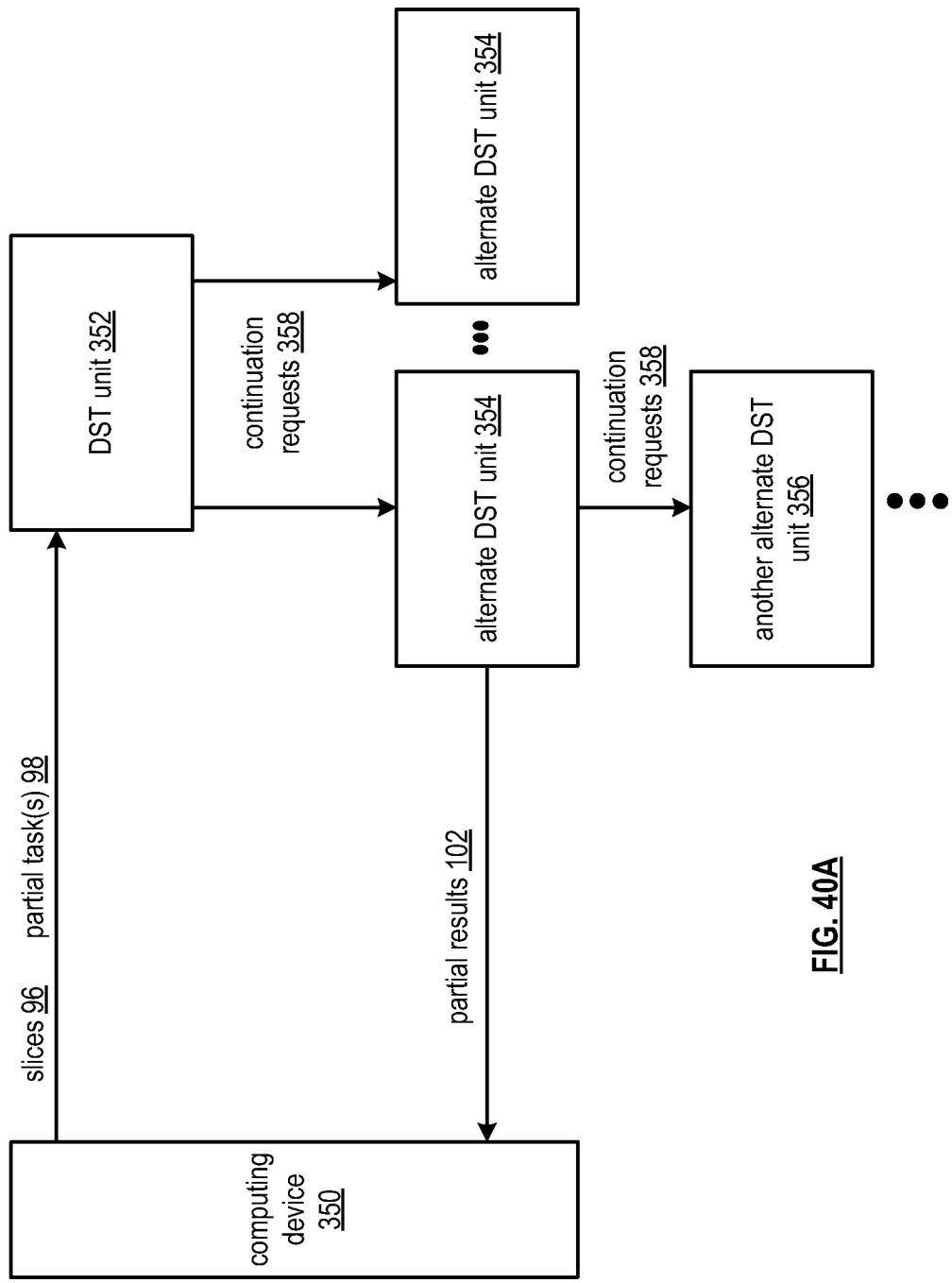
FIG. 40A is a schematic block diagram of another embodiment of a distributed computing system in accordance with the present invention.

FIG. 40A is a schematic block diagram of another embodiment of a distributed computing system that includes a computing device 350, a distributed storage and task (DST) unit 352, a plurality of alternate DST units 354, and a plurality of other alternate DST units 356. Each DST unit 352, 354, and 356 may be implemented by one or more of a storage server, a distributed computing server, a memory module, a memory device, a user device, a DST processing unit, a dispersed storage (DS) unit, and a DS processing unit. The computing device 350 may be implemented utilizing one or more of a DST processing unit, a DST execution unit, a DST unit 352, a DS unit, a storage server, a distributed computing server, a user device, a DS processing unit, an alternate DST unit 354, and another alternate DST unit 356.

The system functions to execute distributed computing tasks. The computing device 350 outputs slices 96 and partial tasks 98 for execution on the slices 96 to the DST unit 352. The DST unit 352 executes the partial task 98 on a slice 96 to produce an intermediate partial result. The DST unit 352 determines to suspend partial task execution when a performance factor of the DST unit is unfavorable. For example, the DST unit 352 determines to suspend partial task execution when execution of the dispersed storage activities compares unfavorably to a dispersed storage performance threshold level (e.g., read slice responses are too slow).

The DST unit 352 issues one or more continuation requests 358 to one or more alternate DST units 354. Each continuation request 358 includes one or more of a partial task execution state, a sub-partial task, and the intermediate partial result. An alternate DST unit 354 of the plurality of alternate DST units receives a corresponding continuation request 358 and executes the sub-partial task on a slice and/or the intermediate partial result to produce partial results 102. The alternate DST unit 354 outputs the partial results 102 to the computing device 350. Alternatively, or in addition to, the alternate DST unit 354 may function in a similar manner to the DST unit 352 to further determine to suspend partial task processing by the alternate DST unit 354 and issue another continuation request 358 to another alternate DST unit 356 of the plurality of other alternate DST units.

Figure 40B:
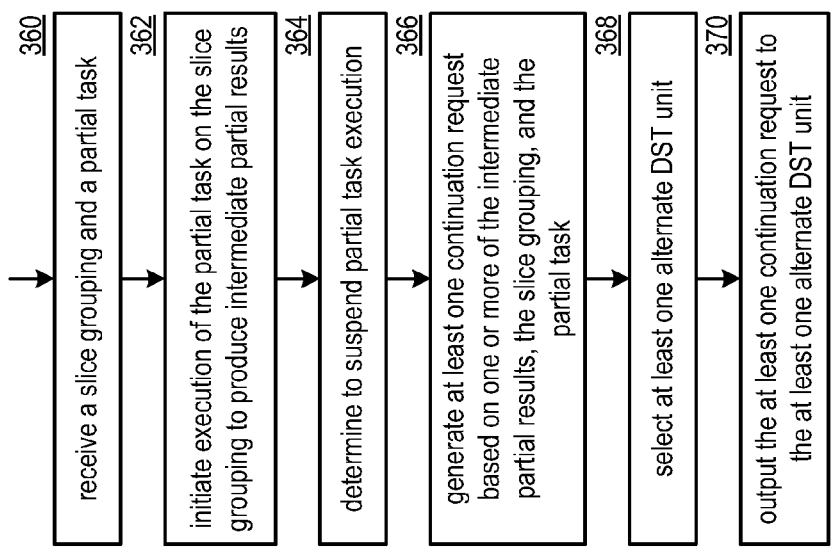
FIG. 40B is a flowchart illustrating an example of executing distributed computing tasks in accordance with the present invention.

FIG. 40B is a flowchart illustrating an example of executing distributed computing tasks. The method begins at step 360 where a processing module (e.g., of a distributed storage and task (DST) unit) receives a slice grouping and a partial task. The method continues at step 362 where the processing module initiates execution of the partial task on the slice grouping to produce intermediate partial results. The method continues at step 364 where the processing module determines to suspend partial task execution. The determining may be based on one or more of a memory utilization level, a task processing resource utilization level, a dispersed storage performance level, a distributed computing performance level, and a pending task execution queue level. The method continues at step 366 where the processing module generates at least one continuation request based on one or more of the intermediate partial results, the slice grouping, and the partial task. The generating includes identifying how many continuation requests to generate based on one or more of a desired partial task execution time frame, task processing capability levels of one or more alternate DST units, the intermediate partial results, the slice grouping, and the partial task.

The method continues at step 368 where the processing module selects at least one alternate DST unit. The selecting includes selecting a number of DST units to substantially match the number of continuation request and identifying the at least one alternate DST unit based on one or more of a DST unit memory availability level and a DST unit processing resource availability level. The method continues at step 370 where the processing module outputs the at least one continuation request to the at least one alternate DST unit.

Figure 41A:
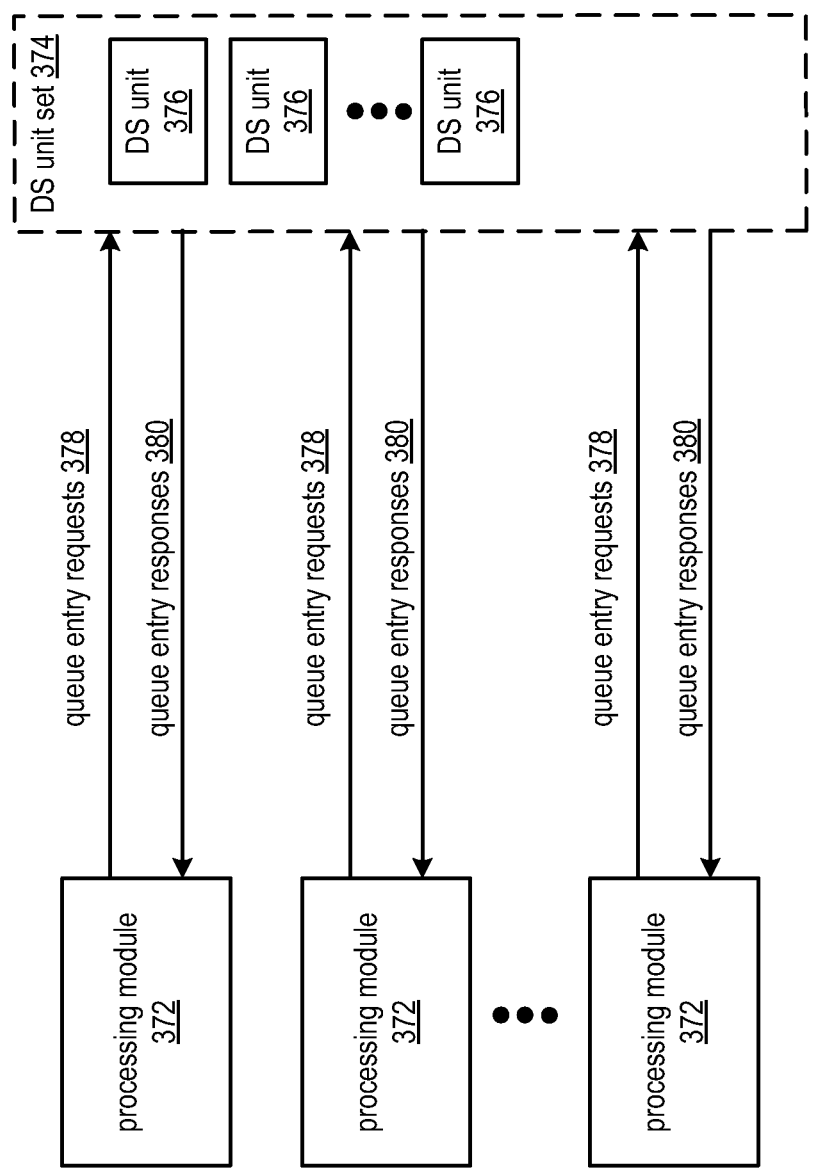
FIG. 41A is a schematic block diagram of another embodiment of a distributed computing system in accordance with the present invention.

FIG. 41A is a schematic block diagram of another embodiment of a distributed computing system that includes a plurality of processing modules 372 and a dispersed storage (DS) unit set 374. The DS unit set 374 includes a set of DS units 376. Each DS unit 376 may be implemented by one or more of a distributed storage and task (DST) unit, a DST execution unit, a storage server, a distributed computing server, a memory module, a memory device, a user device, a DST processing unit, a dispersed storage (DS) unit, and a DS processing unit. The plurality of processing modules 372 may be associated with one or more computing devices. For example, each processing module 372 is affiliated with a different distributed task (DT) module of a plurality of DST execution units.

The system functions to execute tasks. The plurality of processing modules 372 provides task execution capacity to execute a plurality of pending tasks. The DS unit set 374 provides storage for one or more dispersed queues stored as plurality of sets of encoded queue slices. Each queue of the one or more dispersed queues includes one or more queue entries where each queue entry includes one or more tasks (e.g., distributed computing tasks). A first queue of the one or more dispersed queues includes an unassigned queue to hold queue entries that have not been assigned to a processing module for task execution of one or more tasks associated with each queue entry of the queue entries. Other queues of the one or more dispersed queues may be utilized to store queue entries associated with assigned tasks.

A processing module 372 associated with available task execution capacity obtains a queue entry from the unassigned queue by reading it (e.g., issuing queue entry requests 378 and receiving queue entry responses 380 that includes slices of the queue entry) and immediately issues delete requests to the DS unit set 374 for slices associated with the queue entry (e.g., issues queue entry request 378 that includes delete slice requests). The queue entry requests 378 include one or more of a list request, a delete request, a write request, a read request, a commit transaction request, a finalize transaction requests, and a rollback transaction request. The processing module 372 stores the queue entry in an assigned queue of the DS unit set (e.g., processing module issues write requests, commit request, and finalize requests of a three-phase commit process). Next, the processing module 372 issues delete requests for the slices of the queue entry in the assigned queue to provide a lock on the queue entry (e.g., but does not send commit transaction requests for the delete requests yet). The processing module 372 initiates execution of one or more tasks of the queue entry. Upon completion of the one or more tasks of the queue entry, the processing module 372 issues the commit transaction requests for the delete requests for the slices of the queue entry in the assigned queue to complete deletion of the queue entry from the assigned queue. Alternatively, upon a failure, the processing module 372 issues a rollback transaction for the delete requests for the assigned queue to remove the lock without the leading the queue entry.

Another processing module 372 of the plurality of processing modules may read the queue entry from the assigned queue and issue delete requests for the slices of the queue entry to determine whether a lock is present on the queue entry. The other processing module 372 determines that the lock is present when receiving a queue entry response that includes a write conflict error in response to the delete requests. When the queue entry response 380 does not indicate the conflict error (e.g., no lock active), the other processing module 372 stores the queue entry in the unassigned queue (e.g., issuing queue entry requests to write slices of the queue entry to the unassigned queue). Next, the other processing module 372 issues a commit transaction request for the delete requests for the queue entry of the assigned queue to complete deletion of the queue entry from the assigned queue. Alternatively, or in addition to, the other processing module 372 may execute tasks of the queue entry as previously described. When the queue entry response includes a delete response that indicates a conflict or lock error, the other processing module 372 may attempt to identify another queue entry of the assigned queue that is not locked.

Figure 41B:
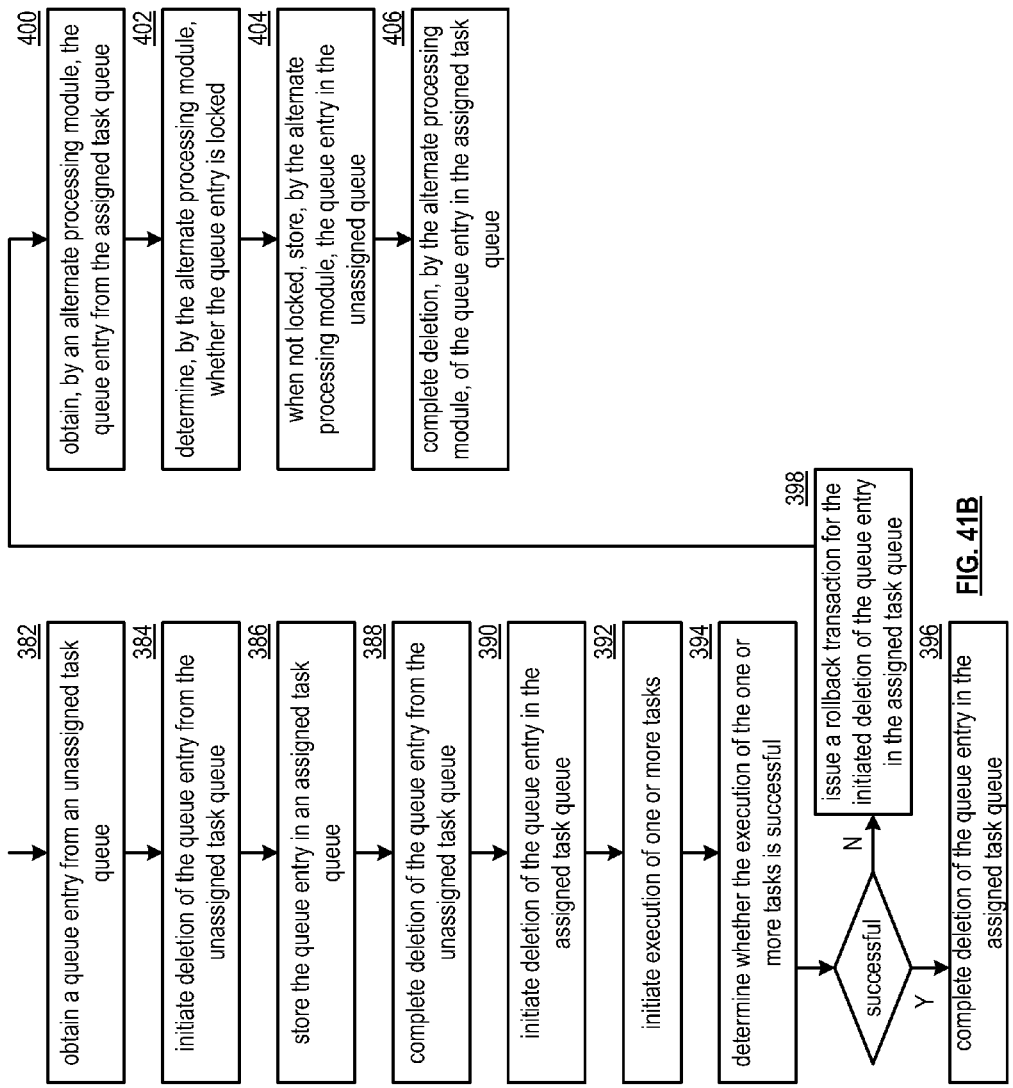
FIG. 41B is a flowchart illustrating an example of executing tasks in accordance with the present invention.

FIG. 41B is a flowchart illustrating an example of executing tasks. The method begins at step 382 where a processing module (e.g., of a computing device) obtains a queue entry from an unassigned task queue stored in a dispersed storage network (DSN) memory. The obtaining includes one or more of determining that available task execution capacity exists, outputting list requests, interpreting list responses to identify the queue entry, and retrieving the queue entry by issuing read requests for slices of the queue entry (e.g., receiving read responses including the slices of the queue entry and decoding the slices using a dispersed storage error coding function to produce the queue entry).

The method continues at step 384 where the processing module initiates deletion of the queue entry from the unassigned task queue. The initiating includes issuing delete slice requests to the DSN memory for the slices of the queue entry (e.g., but no commit transaction requests yet). The method continues at step 386 where the processing module stores the queue entry in an assigned task queue. The storing includes one or more of identifying the assigned task queue, generating write slice requests for the slices of the queue entry, outputting the write slice requests to the DSN memory, issuing commit transaction requests to the DSN memory, and issuing finalize transaction requests to the DSN memory to complete a three-phase dispersed storage process.

The method continues at step 388 where the processing module completes deletion of the queue entry from the unassigned task queue. The completion of the deletion includes issuing commit transaction requests and finalize transaction requests to the DSN memory for a transaction associated with the initiation of the deletion of the queue entry. The method continues at step 390 where the processing module initiates deletion of the queue entry in the assigned task queue. The initiation of the deletion includes issuing delete slice requests for the slices of the queue entry to the DSN memory.

The method continues at step 392 where the processing module initiates execution of one or more tasks associated with the queue entry. The method continues at step 394 where the processing module determines whether the execution of the one or more tasks is successful (e.g., completed with available resources). The method branches to step 398 when the execution of the one or more tasks is not successful. The method continues to step 396 when the execution of the one or more tasks is successful. The method continues at step 396 where the processing module completes deletion of the queue entry in the assigned task you. The completing of the deletion includes outputting commit transaction requests associated with the delete slice requests.

The method continues at step 398 where the processing module issues a rollback transaction for the initiated deletion of the queue entry in the assigned task queue when the execution of the one or more tasks is not successful. The method continues at 400 where an alternate processing module obtains the queue entry from the assigned task queue (e.g., in a similar fashion as the processing module obtains the queue entry from the unassigned task queue). The method continues at step 402 where the alternate processing module determines whether the queue entry is locked. The determining includes issuing a delete slice request for a slice of the queue entry, receiving a delete slice response, and indicating that the queue entry is locked when receiving a locked error message. When not locked, the method continues at step 404 where the alternate processing module stores the queue entry in the unassigned queue. Alternatively, the alternate processing module initiates execution of the one or more tasks associated with the queue entry. The method continues at step 406 where the alternate processing module completes deletion of the queue entry in the assigned task queue. The completing deletion includes issuing commit transaction requests and finalize transaction requests to the DSN memory with regards to the issuing of the delete slice requests to determine whether the queue entry is locked.

Figure 42A:
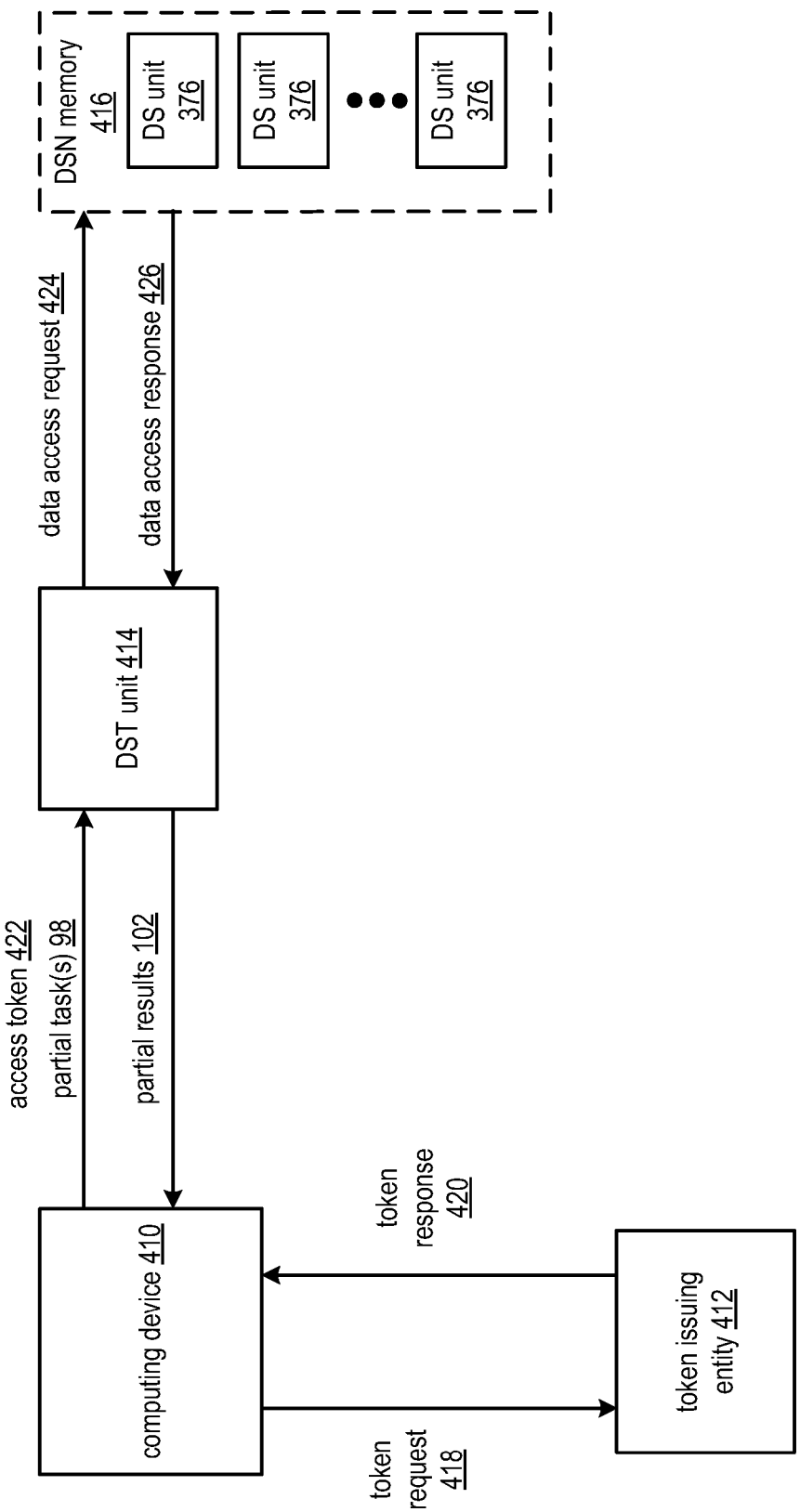
FIG. 42A is a schematic block diagram of another embodiment of a distributed computing system in accordance with the present invention.

FIG. 42A is a schematic block diagram of another embodiment of a distributed computing system that includes a computing device 410, a token issuing entity 412, a distributed storage and task (DST) unit 414 and a dispersed storage network (DSN) memory 416. The DSN memory 416 includes at least one set of dispersed storage (DS) units 376. Each DS unit 376 may be implemented by one or more of a distributed storage and task (DST) unit, a DST execution unit, a storage server, a distributed computing server, a memory module, a memory device, a user device, a DST processing unit, a dispersed storage (DS) unit, and a DS processing unit. The computing device 410 and the token issuing entity 412 each may be implemented as one or more of a DST unit 414, a DST processing unit, a DST execution unit, a DS unit 376 of the DSN memory 416, a storage server, a user device and a distributed computing server.

The system functions to validate access by the computing device 410 to the DSN memory 416 via the DST unit 414. The computing device 410 authenticates with the token issuing entity 412 by issuing a token request 418, that includes credentials of the computing device, to the token issuing entity 412. The computing device 410 issues access restrictions in another token request 418 and/or the token request 418 to the token issuing entity 412. The token request 418 includes one or more of credentials of an existing authorized user of the DSN memory 416 for which a distributed computing task will be executed and access restrictions including one or more of a time frame, a set of data to be accessed, and identity of authorized requesting entities to access the data, a write restriction, a read restriction, a delete restriction, a listing restriction, and other similar restrictions.

The token issuing entity 412 authenticates the computing device 410 when receiving credentials of the computing device. When authenticated, the token issuing entity 412 generates an access token 422 and issues a token response 420 to the computing device 410 that includes the access token 422. The token response 420 includes one or more of an authentication indication and the access token 422 which includes one or more of the access restrictions, the identity of the requesting entity, a signature generated using a private key of the token issuing entity, and a public key or digital certificate of the token issuing entity.

The computing device 410 receives the token response for 420 from the token issuing entity 412 and issues partial tasks 98 and the access token 422 to the DST unit 414. The DST unit 414 identifies a DSN address for data required for a partial task of the partial task 98. The DST unit 414 issues a data access request 424 using the DSN address to the DSN memory where the data access request 424 includes the access token 422. A DS unit 376 of the DSN memory 416 receives the data access request 424 and verifies the data access request 424 using the access token 422. The DS unit 376 generates a data access response 426 based on the verification and outputs the data access response 426 to the DST unit 414. The verifying of the data access request 424 using the access token 422 includes verifying that the data access request 424 would be authorized when the same entity whose credentials were used to request the access token 422 had directly made the request, that the access request does not violate any restrictions present an access token, and that the signature is valid for the access token 422 and the certificate is that of a trusted token issuing entity (e.g., the token issuing entity 412).

The DST unit 414 receives the data access response 426 from the DS unit 376 and recovers data from at least a decode threshold number of data access responses 426 from the DSN memory 416 (e.g., decodes a decode threshold number of slices using a dispersed storage error coding function to produce recovered data). Next, the DST unit 414 executes the partial task on the recovered data to produce partial results 102. The DST unit 414 outputs the partial results 102 to the computing device 410.

Figure 42B:
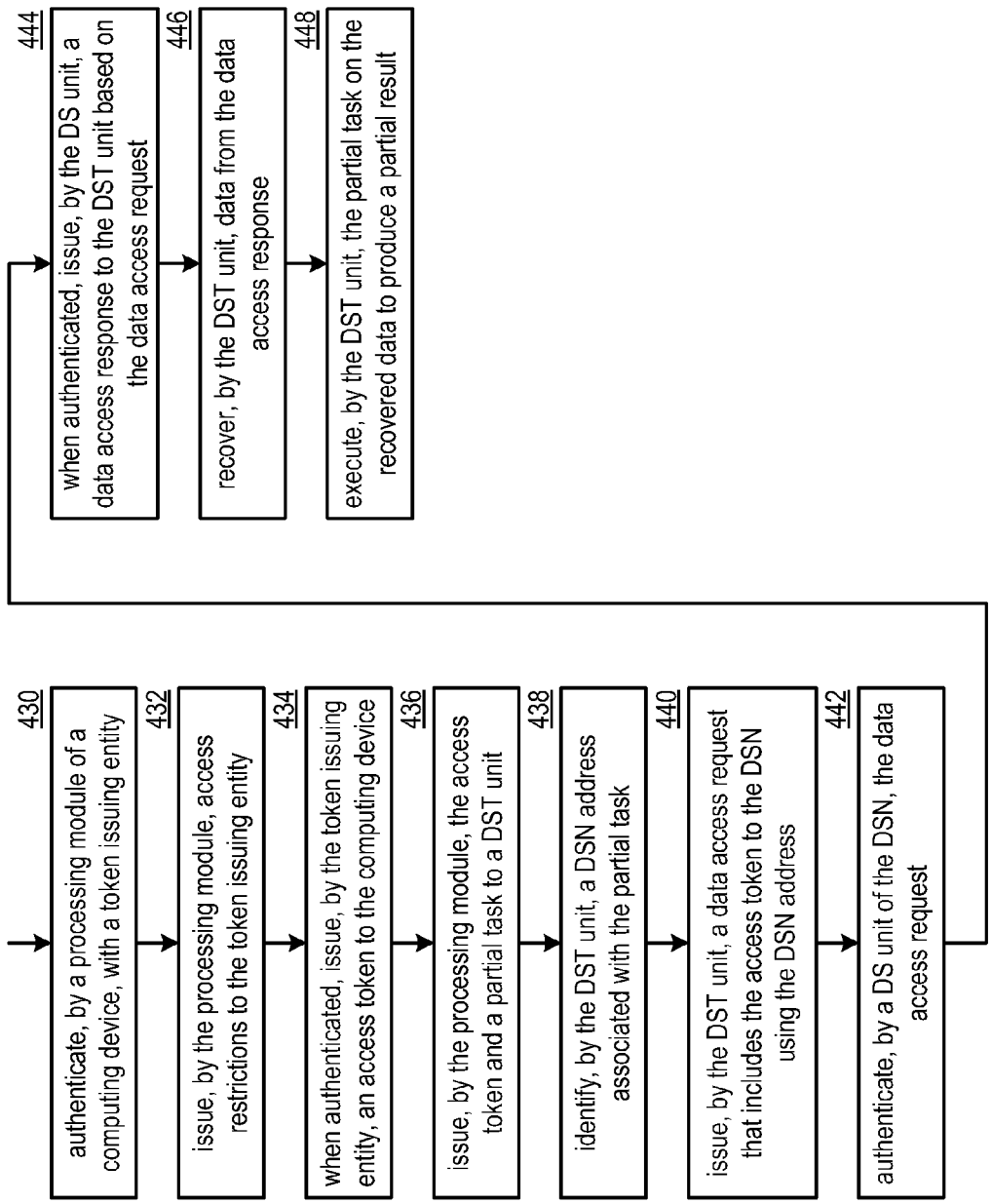
FIG. 42B is a flowchart illustrating an example of validating access in accordance with the present invention.

FIG. 42B is a flowchart illustrating an example of validating access. The method begins at step 430 where a processing module (e.g., of a computing device) authenticates with a token issuing entity. The authentication includes issuing credentials to the token issuing entity. The method continues at step 432 where the processing module of the computing device issues access restrictions to the token issuing entity. The issuing includes generating and outputting a token request to the token issuing entity. When authenticated, the method continues at step 434 where the token issuing entity issues an access token to the computing device. The issuing includes generating and outputting a signed token response using a private key of the token issuing entity.

The method continues at step 436 where the processing module of the computing device issues the access token and a partial task to a distributed storage and task (DST) unit. Alternatively, or in addition to, the processing module of the computing device may authenticate with the DST unit prior to issuing. The method continues at step 438 where the DST unit identifies a dispersed storage network (DSN) address associated with the partial task. The identifying includes at least one of identifying required data for the partial task and accessing an index (e.g., a dispersed hierarchical index) based on a date identifier to obtain the DSN address. The method continues at step 440 where the DST unit issues a data access request to the DSN using the DSN address where the request includes the access token.

The method continues at step 442 where a dispersed storage (DS) unit of the DSN authenticates the data access request. The authenticating includes one or more of verifying that the user of the access token is authenticated to perform the requested DSN access, verify that no access restrictions included in the access token are violated, verify that the signature of the access token is valid, and verify that the access token certificate was issued by a trusted token issuing entity. When authenticated, the method continues at step 444 where the DS unit issues a data access response to the DST unit based on the data access request. The issuing includes generating and outputting the data access response to include a slice for a read request and an acknowledgment when receiving a write request.

The method continues at step 446 where the DST unit recovers data from at least a decode threshold number of data access responses. The recovering includes decoding the decode threshold number of slices using a dispersed storage error coding function to produce the recovered data. The method continues at step 448 where the DST unit executes the partial task on the recover data to produce a partial result.

Figure 43A:
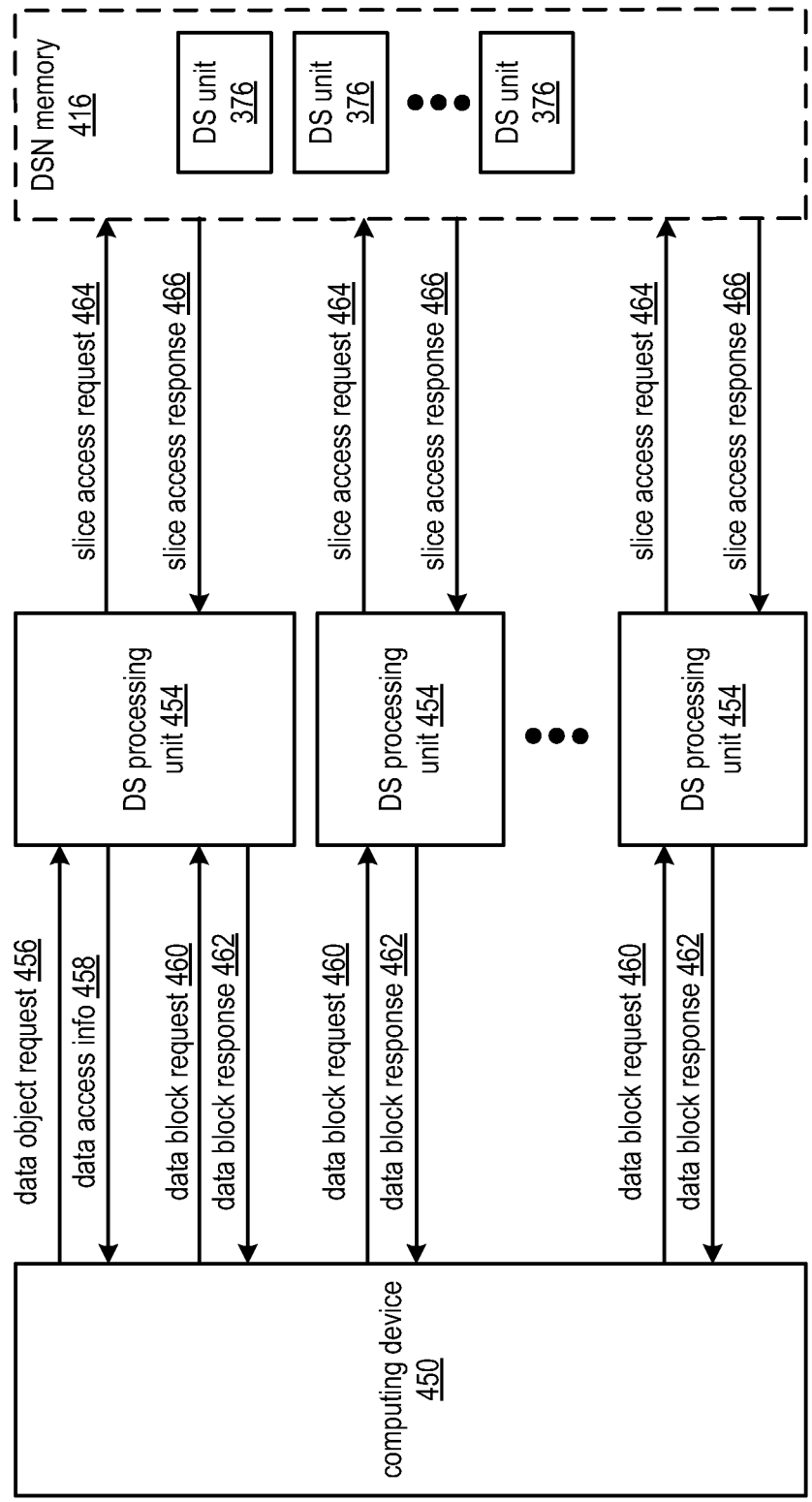
FIG. 43A is a schematic block diagram of another embodiment of a distributed computing system in accordance with the present invention.

FIG. 43A is a schematic block diagram of another embodiment of a distributed computing system that includes a computing device 450, a plurality of dispersed storage (DS) processing units 454, and the dispersed storage network (DSN) memory 416 of FIG. 42A. The computing device 450 and each DS processing unit 450 may be implemented as one or more of a distributed storage and task (DST) unit, a DST processing unit, a DST execution unit, a DS unit 376 of the DSN memory 416, a storage server, a user device and a distributed computing server.

The system functions to provide access to data stored in the DSN memory 416 as a plurality of blocks of data where each block is stored as one or more sets of encoded data slices. The computing device 450 issues a data object request 456 to a first DS processing unit 454 of the plurality of DS processing units where the data object request 456 includes a parallel operation indicator (e.g., utilize a bit torrent protocol). The first DS processing unit 454 issues data access information 458 (e.g., a torrent file) to the computing device 450 in response to receiving the data object request 456 where the data access information 458 includes identities of other DS processing units 454 (e.g., seeders) to utilize and retrieval of the data object and data block mapping information. The data block mapping information includes one or more of a data object size, a block size, a number of blocks, a segment size, a number of segments per block, the data block ranges based on affiliation of DS processing units 454 and data blocks, etc. For example, block size to be chosen as a multiple of segment size for improved efficiency.

The computing device 450 generates one or more data block requests 460 based on the data access information 458 from the first DS processing unit 454. The computing device 450 outputs the one or more data block requests 460 to a corresponding one or more other DS processing units 454 in accordance with the data access information 458. Each other DS processing unit 454 of the one or more other DS processing units issues slice access requests 464 to the DSN memory 416 in response to receiving a data block request 460 of the one or more data block requests. The issuing includes mapping a range of requested data blocks to DSN addresses utilized in generation of read slice access requests. Next, the DS processing unit 454 issues a data block response 462 to the computing device 450 based on slice access responses 466 received from the DSN memory 416. The issuing includes decoding at least a decode threshold number of slices from the slice access responses 466 to reproduce one or more data segments of one or more corresponding data blocks. The computing device 450 regenerates the data object using data blocks from one or more receive data block responses 462 from the one or more other DS processing units 454.

Figure 43B:
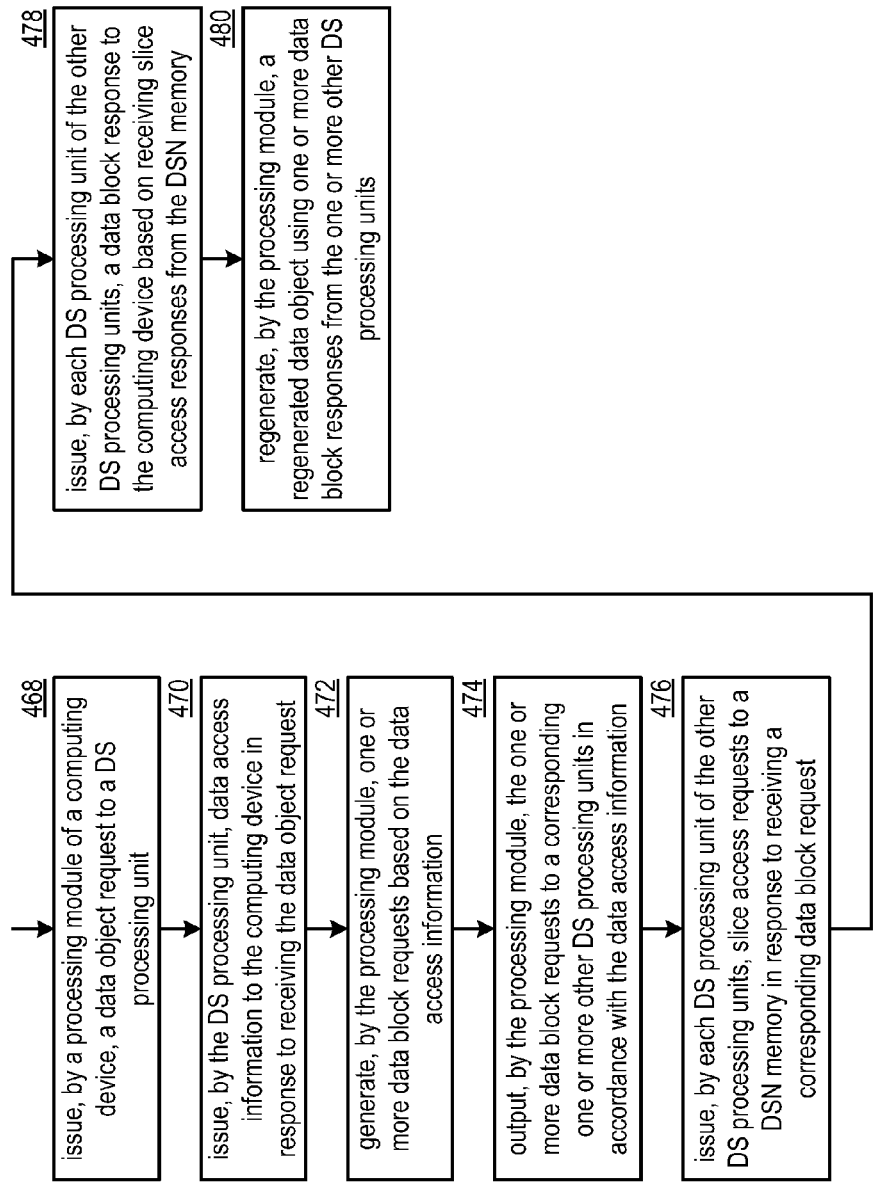
FIG. 43B is a flowchart illustrating an example of accessing data in accordance with the present invention.

FIG. 43B is a flowchart illustrating an example of accessing data. The method begins at step 468 where a processing module (e.g., of a computing device) issues a data object request to a dispersed storage (DS) processing unit. The request may include a parallel operation indicator. The method continues at step 470 where the DS processing unit issues data access information to the computing device in response to receiving the data object request. The issuing includes at least one of performing an index lookup, performing a table lookup, and initiating a query. Alternatively, the processing module obtains the data access information from another source including at least one of a system manager, a user device, a registry lookup, a result of initiating a query, and receiving the data access information. The method continues at step 472 where the processing module of the computing device generates one or more data block requests based on the data access information. The generating includes identifying block ranges of the data object and mapping the block ranges to the requests in accordance with the data access information.

The method continues at step 474 where the processing module outputs the one or more data block requests to a corresponding one or more other DS processing units in accordance with the data access information. The outputting includes identifying the one or more other DS processing units from the data axis information. The other DS processing units may include the DS processing unit. The method continues at step 476 where each DS processing unit of the other DS processing units issues slice access requests to a dispersed storage network (DSN) memory in response to receiving a corresponding data block request. The issuing includes identifying data segments corresponding to data blocks of the data block request and generating the slice access requests using the segment identification.

The method continues at step 478 where each DS processing unit of the other DS processing units issues a data block response to the computing device based on receiving slice access responses from the DSN memory. The issuing includes receiving slices via the slice access responses, decoding the slices using a dispersed storage error coding function to produce segments, and arranging the segments to produce data blocks in accordance with the data access information. The method continues at step 480 where the processing module of the computing device regenerates a regenerated data object using one or more data block responses from the one or more other DS processing units. The regenerating includes aggregating data blocks of the data block responses in accordance with data block mapping of the data access information (e.g., ordering).

FIGS. 44A, B, D, E, F are schematic block diagrams of an embodiment of a dispersed storage network (DSN) illustrating example steps of modifying a DSN memory data access response plan. The DSN includes a DSN memory, the network 24 of FIG. 1, and a computing device 492. The computing device 492 includes the distributed storage and task (DST) client module 34 of FIG. 1. The DSN memory may include a DST execution unit pool 490 that includes a pool of storage nodes. Each storage node may be implemented with the DST execution unit 36 of FIG. 1. Each DST execution unit includes the processing module 84 of FIG. 3, the network interface 169 of FIG. 11, and a computer readable storage medium. The computer readable storage medium may be implemented with the memory 88 of FIG. 3. The memory 88 includes storage sections for one or more of operational instructions and slice portions. One or more of the processing modules 84 executes the operational instructions.

The DST execution unit pool 490 stores a multitude of encoded data files. Each encoded data file includes data partitions where each data partition includes one portion of at least a portion of the one encoded data file of the multitude of encoded data files. Each data partition includes one or more data segments where each data segment is dispersed storage error encoded in accordance with dispersed storage error encoding parameters to produce a set of encoded data slices. The dispersed storage error encoding parameters includes one or more of a width number, a write threshold number, a read threshold number, and a decode threshold number. The DST execution unit pool 490 includes at least a width number of DST execution units for each set of dispersed storage error encoding parameters. As a specific example, the DST execution unit pool 490 includes five DST execution units 1-5 when a maximum width number of corresponding sets of dispersed storage error encoding parameters is four.

As a specific example, the DST execution unit pool 490 stores encoded data file A and encoded data file B. For instance, data file A includes an electronic book with 10 chapters (e.g., 10 portions) where a first chapter includes three subchapters (e.g., 3 partitions). Each subchapter (e.g., partition) includes corresponding one or more data segments.

Each data segment is encoded in accordance with a first set of dispersed storage error encoding parameters to produce a corresponding set of encoded data slices that includes four encoded data slices when the width number of the first set of dispersed storage error encoding parameters is four. For example, the corresponding one or more data segments of subchapter 1 of the first chapter (e.g., first partition) are encoded to produce four groups of partition slices A-1-1, A-2-1, A-3-1, and A-4-1. As such, a first group of partition slices A-1-1 includes first pillar slices of the first partition of the data file A. As another example, the corresponding one or more data segments of subchapter 2 of the first chapter (e.g., second partition) are encoded to produce another four groups of partition slices A-1-2, A-2-2, A-3-2, and A-4-2. As such, a third group of partition slices A-3-2 includes third pillar slices of the second partition of the data file A.

As another instance of the DST execution unit pool 490 storing the encoded data files A and B, data file B includes a movie with 5 chapters (e.g., 5 portions) where a first movie chapter includes two movie subchapters (e.g., 2 partitions). Each movie subchapter (e.g., partition) includes corresponding one or more data segments. Each data segment is encoded in accordance with a second set of dispersed storage error encoding parameters to produce a corresponding set of encoded data slices that includes three encoded data slices when the width number of the second set of dispersed storage error encoding parameters is three. For example, the corresponding one or more data segments of movie subchapter 1 of the first movie chapter (e.g., first movie partition) are encoded to produce three groups of partition slices B-1-1, B-2-1, and B-3-1.

FIG. 44A illustrates accessing the DSN memory. As a specific example, the computing device 492 determines to recover the first chapter of the electronic book with 10 chapters. The determining includes at least one of receiving a request to recover the electronic book, a random chapter selection, and a specific chapter selection. The computing device 492 identifies the three partitions corresponding to the three subchapters of the first chapter. The identifying may be based on one or more of initiating a query, performing a lookup, receiving a response, and calculating subchapter identifiers based on an index of the electronic book.

With the three partitions identified, the DST client module 34 identifies DST execution units of the DST execution unit pool 490 associated with storing the three partitions of the first chapter of the data file A (e.g., the electronic book). The computing device 492 may maintain a slice location table 494, where the slice location table 494 includes a plurality of entries corresponding to the multitude of encoded data files stored by the DST execution unit pool 490. Each entry includes a partition entry of a partition field 496 and unit identifier (ID) a DST execution unit ID field 498. As a specific example, a first entry indicates that all partitions of data file A are stored in the DST execution units 1-4 and a second entry indicates that all partitions of data file B are stored in the DST execution units 1-3.

Having identified the DST execution units associated with storing the three partitions of the first chapter of the data file A, the DST client module 34 issues slice access requests 500 to the identified DST execution units 1-4 of the DST execution unit pool 490, where the slice access requests 500 corresponds to the three partitions of the sets of encoded data slices. As a specific example, the DST client module 34 generates and sends slice access requests A-1-x to the DST execution unit 1, slice access requests A-2-x to the DST execution unit 2, slice access requests A-3-x to the DST execution unit 3, and slice access requests A-4-x to the DST execution unit 4. Each slice access request includes at least one of a read slice requests, a write slice request, a delete slice request, and a list slice request. For instance, the slice access requests A-1-x includes a first read slice request for the group of partition slices A-1-1 associated with pillar 1 encoded data slices of the first subchapter, a second read slice request for the group of partition slices A-1-2 associated with pillar 1 encoded data slices of the second subchapter, and a third read slice request for the group of partition slices A-1-3 associated with pillar 1 encoded data slices of the third subchapter.

Having issued the slice access request 500, the DST client module 34 receives slice access responses 502, where the slice access responses 502 includes the three partitions of the sets of encoded data slices. As a specific example, the slice access responses 502 includes slice access responses A-1-x, A-2-x, A-3-x, and A-4-x. Each slice access response includes at least one of a read slice response, a write slice response, a delete slice response, and a list slice response. For instance, the slice access responses A-1-x includes a first read slice response for the group of partition slices A-1-1 associated with the pillar 1 encoded data slices of the first subchapter, a second read slice response for the group of partition slices A-1-2 associated with pillar 1 encoded data slices of the second subchapter, and a third read slice response for the group of partition slices A-1-3 associated with pillar 1 encoded data slices of the third subchapter. Having received the slice access responses 502, the DST client module 34 dispersed storage error decodes each set of encoded data slices of the three partitions of sets of encoded data slices using the first set of dispersed storage error encoding parameters to reproduce subchapters 1-3 (e.g., partitions 1-3) of the first chapter.

FIG. 44B illustrates initial steps of the example of modifying the DSN memory data access response plan. As a specific example, the one or more of the processing modules 84 executes operational instructions from a first storage section of the computer readable storage medium (e.g., a corresponding memory 88) that causes the one or more of the processing modules 84 to obtain data access response performance data 504 for each of the DST execution units 1-5 (e.g., storage nodes) in the DST execution unit pool 490 (e.g., pool of storage nodes). The obtaining includes at least one of issuing one or more requests for the data access response performance data 504, receiving at least one response that includes the data access response performance data 504, and receiving an unsolicited message that includes the data access response performance data 504. For instance, each DST execution unit 1-5 generates data access response performance data 504 corresponding to the DST execution unit and sends its data access response performance data 504 to each other DST execution unit 1-5. The data access response performance data 504 includes one or more of a throughput level, a data response latency level, a memory availability level, and a processing resource availability level.

Having obtained the data access response performance data 504 for each of the DST execution units 1-5, the one or more of the processing modules 84 analyzes the data access response performance data 504 for the DST execution unit pool 490 to modify a data access response plan 508 to produce a modified data access response plan 510. The data access response plan 508 includes, for at least a portion of one of the multitude of encoded data files, a per data segment encoded data slice response level (e.g., how to recover each data segment), identity of a set of DST execution units (e.g., a set of storage nodes of the pool of storage nodes) storing encoded data slices of the at least a portion of the one of the multitude of encoded data files (e.g., initially DST execution units 1-4 for the data file A and DST execution units 1-3 for data file B), and identity of preferred DST execution units (e.g., preferred storage nodes) of the set of DST execution units (e.g., storage nodes) to respond to a data access request for the at least a portion of the one of the multitude of encoded data files. The modifying of the data access response plan 508 to produce the modified data access response plan 510 is discussed in an example in greater detail with reference to FIG. 44C.

FIG. 44C is a diagram illustrating an example of a storage node pool assignment table 506 utilized when modifying the data access response plan 508 to produce the modified data access response plan 510. The storage node pool assignment table 506 includes table entries for each DST execution unit of the DST execution unit pool 490. Each table entry includes a unit identifier of a DST execution unit ID field 498, an entry of a field of the data access response plan 508, a data access response performance data entry of a data access response performance data field 504, and a modified data access response plan entry of a field of the modified data access response plan 510. Each field of the data access response plan 508 and the modified data access response plan 510 includes respond entries of a respond field 512 and don't respond entries of a don't respond field 514.

The respond entries correspond to identifiers of which groups of encoded data slices are to be included in a slice access response directed towards the preferred storage nodes. For example, a first entry of the storage node pool assignment table 506 indicates that DST execution unit 1, in accordance with the data access response plan 508, shall respond as the preferred storage node to slice access requests to produce slice access responses A-1-x for partition slices A-1-1, A-1-2, and A-1-3 and shall respond to slice access requests to produce slice access responses B-1-x for partition slices B-1-1 and B-1-2. Other respond entries of the data access response plan 508 indicates that DST execution units 2-4 are also preferred storage nodes in accordance with the data access response plan 508 with regards to other partition slices (e.g., unit 2 preferred for A-2-x, unit three preferred for A-3-x, and unit 4 preferred for A-4-x).

The don't respond entries correspond to identifiers of which groups of encoded data slices are not to be included in another slice access response. For example, the first entry of the storage node pool assignment table 506 indicates that DST execution unit 1, in accordance with the data access response plan 508, has no encoded data slices to exclude from the other slice access response.

The data access response plan 508 is modified to include an indication that one of the preferred storage nodes has an undesired performance level and to include an alternative data access response for the one of the preferred storage nodes having the undesired performance level. The alternative data access response includes at least one of discarding selected slice access requests; forwarding of the selected slice access requests from a source DST execution unit to destination DST execution unit; sending one or more of the data access response plan 508, the data access response performance data 504, and the modified data access response plan 510 to one or more requesting entities; facilitating storage of a copy of encoded data slices of the at least a portion of the one of the multitude of encoded data files in one or more other DST execution units; and issuing slice access responses corresponding to the selected slice access requests.

As a specific example of including the indication that the one of the preferred storage nodes has the undesired performance level, the processing module 84 of DST execution unit 5 receives the data access response performance data 504 and analyzes the data access response performance data 504 to determine that the DST execution units 1 and 2 have the undesired performance level and that DST execution units 3-5 have a desired performance level. For instance, the processing module 84 indicates that the DST execution unit 1 has the undesired performance level when a data response latency level of the data access response performance data 504 from the DST execution unit 1 compares unfavorably (e.g., is greater than) to a data response latency threshold level.

As a specific example of including the alternative data access response for the one of the preferred storage nodes having the undesired performance level, the processing module 84 of the DST execution unit 5 identifies the encoded data slices of the at least a portion of the one of the multitude of encoded data files. Next, the processing module 84 removes identity of the partition slices A-1-x from the respond field 512 of DST execution unit 1. Next, the processing module 84 selects another DST execution unit based on an availability to perform the alternative data access response. For instance, the processing module 84 selects the DST execution unit 5 that is associated with the desired level of performance. Alternatively, the processing module 84 selects a set of other DST execution units based on the availability to perform the alternative data access response, where the set of other DST execution units includes the other DST execution unit. For instance, the processing module 84 selects DST execution units 5 and 4.

Having selected another DST execution unit, the processing module 84 includes the identity of the partition slices A-1-x in the don't respond field 514 of DST execution unit 1 and includes the identity of the partition slices A-1-x in the respond field 512 of DST execution unit 5 (e.g., desired level of performance) of the modified data access response plan 510 when the DST execution unit 1 of the preferred DST execution units of the data access response plan 508 has the undesired performance level and the alternative data access response includes either of the forwarding of selected slice access requests and the facilitating storage of the copy of encoded data slices of the at least a portion of the one of the multitude of encoded data files in the one or more other DST execution units.

As another specific example of including the alternative data access response for the one of the preferred storage nodes having the undesired performance level, the processing module 84 of the DST execution unit 5 removes identity of the partition slices A-2-x and B-2-x from the respond field 512 of DST execution unit 2 and includes the identity of the partition slices A-2-x and B-2-x in the don't respond field 514 of the modified data access response plan 510 when the DST execution unit 2 of the preferred DST execution units of the data access response plan 508 has the undesired performance level and the alternative data access response includes the discarding selected slice access requests.

FIG. 44D illustrates further steps of the example of modifying the DSN memory data access response plan. As a specific example, with the modified data access response plan 510 produced, the one or more of the processing modules 84 executes operational instructions from the first, or other, storage section of the computer readable storage medium (e.g., corresponding memory 88) that causes the one or more of the processing modules 84 to distribute the modified data access response plan 510 to the DST execution unit pool 490. For instance, the processing modules 84 of DST EX unit 5 sends the modified data access response plan 510 to each of DST EX units 1-4. As another instance, the processing modules 84 of DST EX unit 5 sends the modified data access response plan 510 to DST EX units 4, processing modules 84 of DST EX unit 4 sends the modified data access response plan 510 to DST EX units 3 etc.

Alternatively, or in addition to, the one or more of the processing modules 84 distributes the modified data access response plan 510 to one or more requesting entities. As a specific example, the processing modules 84 of DST EX unit 5 sends, via the network interface 169 of DST EX unit 5, the modified data access response plan 510 to the computing device 492 (e.g., the one or more requesting entities). As another specific example, the processing modules 84 of DST EX unit 5 updates, via the network interface 169 of DST EX unit 5, a system registry (e.g., part of the DSTN managing unit 18 of FIG. 1) to include the modified data access response plan 510. As yet another specific example, the processing modules 84 of DST EX unit 5 issues, via the network interface 169 of DST EX unit 5, a slice access response 502 to the computing device 492 (e.g., one of the one or more requesting entities), where the slice access response 502 includes the modified data access response plan 510, when receiving a slice access request 500 from the computing device 492.

When the one or more of the processing modules 84 distributes the modified data response plan 510 to the computing device 492, a DST client module 34 updates the slice location table 494 to include changes resulting from modification of the data response plan 508 to produce the modified data response plan 510. As a specific example, the DST client module 34 updates the slice location table 494 to indicate that partition slices A-1-x shall be accessed from DST execution unit 5 rather than DST execution unit 1 (e.g., undesired level of performance), partition slices A-2-x shall not be accessed even though they are still stored by DST execution unit 2 1 (e.g., undesired level of performance), partition slices A-3-x shall continue to be accessed from DST execution unit 3, partition slices A-4-x shall continue to be access from DST execution unit 4, partition slices B-1-x shall continue to be accessed from DST execution unit 1, partition slices B-2-x shall not be accessed even though they are still stored by DST execution unit 2, and partition slices B-3-x shall continue to be accessed from DST execution unit 3.

When the alternative data access response includes the facilitating storage of the copy of encoded data slices of the at least a portion of the one of the multitude of encoded data files in one or more other DST execution units, having identified the encoded data slices of the at least a portion of the one of the multitude of encoded data files and having selected the other DST execution unit, the one or more of the processing modules 84 executes operational instructions from the first, or other, storage section of the computer readable storage medium (e.g., corresponding memory 88) that causes the one or more of the processing modules 84 to facilitate the selected other DST execution unit storing a copy of at least some of the encoded data slices of the at least a portion of the one of the multitude of encoded data files. As a specific example, DST execution unit 1 issues a replicate slice request for partition slices A-1-x to DST execution unit 5, where the replicate slice request includes one or more of the partition slices A-1-x, a temporary storage indicator, and slice names corresponding to the partition slices A-1-x. As another specific example, the DST execution unit 5 interprets the modified data access response plan 510 and issues a read slice access request 500 to DST execution unit 1 to retrieve the partition slices A-1-x. As yet another specific example, the DST execution unit 4 interprets the modified data access response plan 510, issues the read slice access request 500 to DST execution unit 1 to retrieve the partition slices A-1-x, and issues a write slice access request 500 to DST execution unit 5.

Alternatively, when the processing module 84 selects the set of other DST execution units based on the availability to perform the alternative data access response, where the set of other DST execution units includes the other DST execution unit, the one or more of the processing modules 84 executes operational instructions from the first, or other, storage section of the computer readable storage medium (e.g., corresponding memory 88) that causes the one or more of the processing modules 84 to facilitate the selected set of other DST execution units storing the copy of the at least some of the encoded data slices of the at least a portion of the one of the multitude of encoded data files. As a specific example, DST execution unit 1 issues the replicate slice request for partition slices A-1-x to DST execution units 4 and 5 when the selected set of other DST execution units includes DST execution units 4 and 5. As another specific example, each of DST execution units 4 and 5 interprets the modified data access response plan 510 and issues corresponding read slice access requests 500 to DST execution unit 1 to retrieve the partition slices A-1-x. As yet another specific example, the DST execution unit 4 interprets the modified data access response plan 510, issues the read slice access request 500 to DST execution unit 1 to retrieve the partition slices A-1-x for storage therein, and issues the write slice access request 500 to DST execution unit 5 for storage therein.

Having facilitated the selected set of other DST execution unit storing the copy of the at least some of the encoded data slices of the at least a portion of the one of the multitude of encoded data files, the one or more of the processing modules 84 selects one of the selected set of other DST execution units to function as the other DST execution unit with regards to responding to access requests directed to the one of the preferred DST execution units. As a specific example, the processing modules 84 of DST execution unit 5 selects DST execution unit 5 as the other DST execution unit when DST execution unit 5 has a best level of resource availability of the DST execution unit pool 490.

FIG. 44E illustrates further steps of the example of modifying the DSN memory data access response plan. As a specific example, the one or more of the processing modules 84 executes operational instructions from a second storage section of the computer readable storage medium (e.g., a corresponding memory 88) that causes the one or more of the processing modules 84 to receive, via the network interfaces 169 of the preferred DST execution units 1-4, corresponding portions of a data access request (e.g., slice access requests 500) for the at least a portion of the one of the multitude of encoded data files (e.g., partitions 1-3). For example, the DST client module 34 identifies the preferred DST execution units 1-4 in accordance with the slice location table 494 when the DST client module 34 has not received the modified data access response plan 510 and the at least a portion of the one of the multitude of encoded data files includes the three subchapters (e.g., partitions 1-3) of the first chapter of the electronic book. Having identified the preferred DST execution units 1-4, the DST client module 34 issues slice access requests 500 that includes slice access requests A-1-x (e.g., for slice partitions A-1-1, A-1-2, and A-1-3) issued to DST execution unit 1, slice access requests A-2-x issued to DST execution unit 2, slice access requests A-3-x issued to DST execution unit 3, and slice access requests A-4-x issued to DST execution unit 4.

Having received the slice access request 500, the one or more of the processing modules 84 of the DST execution unit pool 490 accesses the modified data access response plan 510 (e.g., retrieve from memory 88, obtain from another DST execution unit) and processes one of the corresponding portions of the data access request in accordance with the alternative data access response. As a specific example, the processing module 84 of the one of the preferred DST execution units (e.g., unit 1) having the undesired performance level or the processing module 84 of the other DST execution unit (e.g., unit 5) of the pool of DST execution units 1-5, processes the one of the corresponding portions (e.g., slice access requests A-1-x, slice access requests A-2-x, etc.) of the data access request in accordance with the alternative data access response. For instance, the processing module 84 of DST execution unit 1 processes slice access requests A-1-x when the one of the corresponding portions of the data access request is directed towards the one of the preferred DST execution units (e.g., units 1 or 2) having the undesired performance level. As another instance, the processing module 84 of DST execution unit 5 processes slice access requests A-1-x when the one of the corresponding portions of the data access request is directed towards the one of the preferred DST execution units (e.g., unit 1) having the undesired performance level.

As a specific example of the processing module 84 of the one of the preferred DST execution units having the undesired performance level processing the one of the corresponding portions of the data access request, the processing module 84 of DST execution unit 2 discards the one of the corresponding portions of the data access request (e.g., slice access requests A-2-x) when the alternative data access response includes an indication that data access requests for the at least a portion of the one of the multitude of encoded data files are to be discarded.

As another a specific example of the processing module 84 of the one of the preferred DST execution units having the undesired performance level processing the one of the corresponding portions of the data access request, the processing module 84 of DST execution unit 1 forwards, via the network interface 169 of DST execution unit 1, the one of the corresponding portions of the data access request (e.g., slice access requests A-1-x) to the other DST execution unit 5 when the alternative data access response indicates forwarding data access requests for the at least a portion of the one of the multitude of encoded data files to the other DST execution unit. For instance, DST execution unit 1 issues forwarded slice access requests A-1-x to DST execution unit 5 for further processing.

When the processing module 84 of the other DST execution unit 5 receives the forwarded slice access requests A-1-x, identifies the other DST execution unit 5 of the DST execution unit pool 490 when the alternative data access response indicates that the other DST execution unit 5 is to respond to data access requests for the at least a portion of the one of the multitude of encoded data files when the one of the corresponding portions of the data access request (e.g., A-1-x) is directed towards the one of the preferred DST execution units 1-2 having the undesired performance level. Having identified the other DST execution unit 5, the processing module 84 of the DST execution unit 5 obtains the copy of the at least some of the encoded data slices (e.g., partition slices A-1-x) of the at least a portion of the one of the multitude of encoded data files from the memory 88 of the other DST execution unit 5. Alternatively, the processing module 84 of DST execution unit 4 retrieves the copy of the at least some of the encoded data slices from the memory 88 of the other DST execution unit 5. Having obtained the copy of the at least some of the encoded data slices, the processing module 84 of the DST execution unit 5 sends, via the network interface 169 of the DST execution unit 5, the copy the at least some of the encoded data slices of the at least a portion of the one of the multitude of encoded data files to the computing device 492 (e.g., the requesting entity). Alternatively, the processing module 84 of DST execution unit 4 sends, via the network interface 169 of the DST execution unit 4, the copy the at least some of the encoded data slices of the at least a portion of the one of the multitude of encoded data files to the computing device 492.

The processing module 84 of the one of the preferred DST execution units 1-2 having the undesired performance level or another of the preferred DST execution units 3-4 processes the one of or another one of the corresponding portions of the data access request by sending, via the network interface 169 of the one of the preferred DST execution units 1-2 or via the network interface of the other of the preferred DST execution units 3-4, at least some of the encoded data slices or another at least some of the encoded data slices of the at least a portion of the one of the multitude of encoded data files to a requesting entity in accordance with the modified data access response plan. As a specific example, the processing module 84 of DST execution unit 1 issues slice access requests B-1-x to the computing device 492 when the other of the corresponding portions of the data access request pertains to accessing data file B. As another specific example, the processing module 84 of DST execution unit 3 issues slice access requests B-3-x to the computing device 492 when the other of the corresponding portions of the data access request pertains to accessing data file B. As yet another specific example, the processing module 84 of DST execution unit 3 issues slice access requests A-3-x to the computing device 492 when the other of the corresponding portions of the data access request pertains to accessing data file A.

FIG. 44F illustrates final steps of the example of modifying the DSN memory data access response plan. When the computing device 492 receives the modified data access response plan 510, the computing device 492 issues the slice access request 500 directly to the DST execution units that correspond to the modified data access response plan 510. As a specific example, the computing device 492 issues the slice access request 500 utilizing the slice location table 494 when the slice location table 494 has been updated based on the modified data access response plan 510. Having updated the slice location table 494, the DST client module 34 issues slice access requests 500 that includes slice access requests A-3-x issued to DST execution unit 3, slice access requests A-4-x issued to DST execution unit 4, and slice access requests A-1-x issued to DST execution unit 5.

Having received the slice access requests A-1-x, the processing module 84 of the other DST execution unit 5 processes the one of the corresponding portions of the data access request (e.g., for a partition slices A-1-x) by sending, via the network interface 169 of the DST execution unit 5, the copy of at least some of the encoded data slices of the at least a portion of the one of the multitude of encoded data files to the computing device 492 when the alternative data access response indicates that the other DST execution unit 5 is to respond to data access requests for the at least a portion of the one of the multitude of encoded data files.

Having received the slice access requests A-3-x, the processing module 84 of the DST execution unit 3 sends, via the network interface 169 of the DST execution unit 3, slice access responses A-3-x to the computing device 492. Having received the slice access requests A-4-x, the processing module 84 of the DST execution unit 4 sends, via the network interface 169 of the DST execution unit 4, slice access responses A-4-x to the computing device 492. Having received slice access responses A-3-x, A-4-x, and A-1-x, the DST client module 34 dispersed storage error decodes received encoded data slices of the slice access responses to reproduce data file A.

FIG. 44G is a flowchart illustrating an example of modifying a dispersed storage network (DSN) memory data access response plan. The method begins at step 520 where a processing module (e.g., of one or more processing modules executing operational instructions of one or more storage sections from a computer readable storage medium) obtains data access response performance data for each storage node in a pool of storage nodes, where the pool of storage nodes stores a multitude of encoded data files.

The method continues at step 522 where the processing module analyzes the data access response performance data for the pool of storage nodes to modify a data access response plan to produce a modified data access response plan. The data access response plan includes, for at least a portion of one of the multitude of encoded data files a per data segment encoded data slice response level, identity of a set of storage nodes storing encoded data slices of the at least a portion of the one of the multitude of encoded data files, and identity of preferred storage nodes of the set of storage nodes to respond to a data access request for the at least a portion of the one of the multitude of encoded data files. The data access response plan is modified to include an indication that one of the preferred storage nodes has an undesired performance level and to include an alternative data access response for the one of the preferred storage nodes having the undesired performance level.

The method continues at step 524 where the processing module distributes the modified data access response plan to one or more of the pool of storage nodes and one or more requesting entities. Alternatively, or in addition to, the method branches to step 538 where the processing module forwards the encoded data slices to another storage node and returns to step 526. For instance, the method branches to step 538 when the modified data access response plan indicates that at least some encoded data slices associated with the one of the preferred storage nodes that has the undesired performance level are to be forwarded to another storage node.

The method continues at step 526 where the processing module receives corresponding portions of the data access request for the at least a portion of the one of the multitude of encoded data files. In response, the processing module may distribute the modified data access response plan to the one or more requesting entities. As a specific example, the processing module distributes the modified data access response plan to a requesting entity of the data access request when at least one of the corresponding portions of the data access request is directed at a storage node of the storage nodes that is not associated with the corresponding portion (e.g., the requesting entity sent the at least one of the corresponding portions of the data access request without utilizing the modified data access response plan). The method continues at step 528 where the processing module accesses the modified data access response plan.

The method continues at step 530 where the processing module processes one of the corresponding portions of the data access request in accordance with the alternative data access response when the one of the corresponding portions of the data access request is directed towards the one of the preferred storage nodes having the undesired performance level. As a specific example, the processing module analyzes the data access request to select a processing type. The selecting may be based on one or more of a predetermination, a DSN performance level, the data access response performance data, and the alternative data access response. The processing type includes at least one of discarding, responding, forwarding the request, and forwarding slices. The method branches to step 538 when the processing type includes the forwarding the slices. The method branches to step 536 when the processing type includes the forwarding the request. The method branches to step 534 when the processing type includes the responding. The method continues to step 532 when the processing type includes the discarding.

When the processing type includes the discarding, the method continues at step 532 where the processing module further processes the one of the corresponding portions of the data access request by discarding the one of the corresponding portions of the data access request when the alternative data access response includes an indication that data access requests for the at least a portion of the one of the multitude of encoded data files are to be discarded when the one of the corresponding portions of the data access request is directed towards the one of the preferred storage nodes having the undesired performance level.

When the processing type includes the responding, the method continues at step 534 where the processing module further processes the one of the corresponding portions of the data access request by identifying the other storage node of the pool of storage nodes when the alternative data access response indicates that the other storage node is to respond to data access requests for the at least a portion of the one of the multitude of encoded data files when the one of the corresponding portions of the data access request is directed towards the one of the preferred storage nodes having the undesired performance level. Having identified the other storage node, the processing module obtains a copy of at least some of the encoded data slices of the at least a portion of the one of the multitude of encoded data files from the other storage node. Having obtained the copy of the at least some of the encoded data slices, the processing module sends the copy of the at least some of the encoded data slices of the at least a portion of the one of the multitude of encoded data files to a requesting entity.

Alternatively, or in addition to, the processing module further processes the one of the corresponding portions of the data access request by processing the one of the corresponding portions of the data access request by sending the at least some of the encoded data slices of the at least a portion of the one of the multitude of encoded data files to the requesting entity in accordance with the modified data access response plan. Further alternatively, the processing module may process another of the corresponding portions of the data access request by sending other of the encoded data slices of the at least a portion of the one of the multitude of encoded data files to the requesting entity in accordance with the modified data access response plan.

When the processing type includes the forwarding the request, the method continues at step 536 where the processing module further processes the one of the corresponding portions of the data access request by forwarding the one of the corresponding portions of the data access request to the other storage node of the pool of storage nodes when the alternative data access response indicates forwarding data access requests for the at least a portion of the one of the multitude of encoded data files to the other storage node when the one of the corresponding portions of the data access request is directed towards the one of the preferred storage nodes having the undesired performance level.

When the processing type includes the forwarding the slices, the method continues at step 538 where the processing module further processes the one of the corresponding portions of the data access request by, when the one of the preferred storage nodes has the undesired performance level, identifying the encoded data slices of the at least a portion of the one of the multitude of encoded data files. Having identified the encoded data slices, the processing module selects another storage node of the pool of storage nodes based on an availability to perform the alternative data access response. Having selected the other storage node, the processing module facilitates the other storage node storing the copy of at least some of the encoded data slices of the at least a portion of the one of the multitude of encoded data files.

Alternatively, or in addition to, when the processing type includes the forwarding the slices, the method continues at step 538 where the processing module further processes the one of the corresponding portions of the data access request by, when the one of the preferred storage nodes has the undesired performance level, identifying the encoded data slices of the at least a portion of the one of the multitude of encoded data files. Having identified the encoded data slices, the processing module selects a set of other storage nodes from the pool of storage nodes based on an availability to perform the alternative data access response. Having selected the set of other storage nodes, the processing module facilitates the set of other storage nodes storing the copy of at least some of the encoded data slices of the at least a portion of the one of the multitude of encoded data files. The method branches to step 526 when the forwarding of the encoded data slices to the other storage node follows step 524.

FIG. 45A is a schematic block diagram of another embodiment of a dispersed storage system that includes a computing device 550 and dispersed storage (DS) unit pool 552. The DS unit pool 552 includes a plurality of DS units 376 of FIG. 41A. The computing device 550 may be implemented as one or more of a distributed storage and task (DST) unit, the DST processing unit 16 of FIG. 1, the DST execution unit 36 of FIG. 1, the DS unit 376, a storage server, a user device, and a distributed computing server.

The system functions to store data in the DS unit pool 552. The computing device 550 selects a set of DS units 376 of the DS unit pool 552. The selecting may be based on one or more of DS unit availability, DS unit storage level availability, and DS unit performance. The computing device 550 segments the data based on a segmentation scheme to produce a plurality of data segments. For each data segment of the plurality of data segments, the computing device 550 issues a set of write slice requests 554 to the set of DS units. The issuing includes generating the set of write slice requests 554 (e.g., write slice requests include a slice and a slice name) and outputting the set of write slice requests 554 to the set of DS units. Each DS unit 376 of the set of DS units receives a corresponding write slice request 554 and processes the request to issue a write slice response 556 to the computing device 550. The write slice response 556 includes a write status indicator (e.g., succeed/failed).

When an unfavorable number of write errors occur, the computing device 550 issues at least one incremental write slice request 554 to a remaining DS unit 376 of the DS unit pool 552. The computing device 550 detects the unfavorable number of write errors when less than a write threshold number of write slice responses 556 include a favorable response (e.g., succeeded status). The issuing includes selecting the remaining DS unit 376, generating the at least one incremental write slice request 554, and outputting the at least one incremental write slice request 554 to the selected remaining DS unit 376. Alternatively, when a favorable number of write errors occur (e.g., at least the write threshold number of read slice responses are associated with favorable responses such as the succeeded status), the computing device 550 generates a DSN address based on identities of actual DS units utilized. For example, the computing device 550 generates the DSN address by a concatenating internet protocol addresses of each of the actual DS units. The DSN addresses may be different for each segment. The computing device 550 updates at least one of a DSN index and a DSN directory to associate the DSN address (s) with a data identifier of the data. As such, a corresponding set of encoded data slices of each data segment of the plurality of data segments may be stored in different sets of DS units of the plurality of DS units.

FIG. 45B is a flowchart illustrating an example of storing data. The method begins at step 558 where a processing module (e.g., of a computing device) selects a pillar width number of dispersed storage (DS) units of a DS unit pool for storing data. The selecting may be based on one or more of storage availability, storage performance history, proximity, and affiliation with a requesting entity. The method continues at step 560 where the processing module segments the data based on a segmentation scheme to produce a plurality of segments. The segmenting includes obtaining the segmentation scheme from a system registry based on a requesting entity identifier.

For each segment of the plurality of segments, the method continues at step 562 where the processing module issues a pillar width number of write slice requests to the pillar width number of DS units. The issuing includes encoding the segment using a dispersed storage error coding function to produce a pillar width number of slices and generating the write slice requests to include a pillar width number of temporary slice names and the pillar width number of slices. A temporary slice name of the pillar width number of temporary slice names may include a unique data identifier of data being stored, a segment identifier, and a pillar identifier.

The method continues at step 564 where the processing module determines whether an unfavorable number of write errors have occurred. The processing module determines that the unfavorable number of write errors has occurred when the processing module has not received at least a write threshold number of favorable (e.g., succeeded status) write slice responses. The method branches to step 568 when the unfavorable number of write errors has not occurred. The method continues to step 566 when the unfavorable number of write errors has occurred. The method continues at step 566 where, for each error, the processing module re-issues a corresponding write slice request to another DS unit of remaining DS units of the DS unit pool. The re-issuing includes generating a new slice name for the slice, generating a new slice request to include the new slice name and the slice, and outputting the corresponding write slice request to the other DS unit. The method loops back to step 564 where the processing module determines whether the unfavorable number of write errors has occurred.

The method continues at step 568 where the processing module generates a DSN address for the data based on identities of actual DS units favorable utilized when the unfavorable number of write errors has not occurred. The generating includes producing a portion of the DSN address based on a deterministic function applied to each identifier of the actual DS units favorable utilized (e.g., concatenating internet protocol addresses of the actual DS units favorably utilized). The method continues at step 570 where the processing module updates at least one of a DSN index and a DSN directory to associate the DSN address (s) with a data identifier of the data. The updating includes storing the DSN address in an index entry associated with the data identifier. Alternatively, or in addition to, the processing module may update the DS units favorably utilized with the DSN addresses to associate the DSN addresses with the temporary slice names.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. Dispersed storage network (DSN) memory comprises:
a pool of storage nodes, wherein each storage node of the pool of storage nodes includes a processing module, a network interface, and memory, and wherein the pool of storage nodes stores a multitude of encoded data files;
the processing module of one or more storage nodes of the pool of storage nodes is operable to:
obtain data access response performance data for each of the storage nodes in the pool of storage nodes;
analyze the data access response performance data for the pool of storage nodes to modify a data access response plan to produce a modified data access response plan, wherein the data access response plan includes, for at least a portion of one of the multitude of encoded data files:
a per data segment encoded data slice response level,
identity of a set of storage nodes storing encoded data slices of the at least a portion of the one of the multitude of encoded data files, and
identity of preferred storage nodes of the set of storage nodes to respond to a data access request for the at least a portion of the one of the multitude of encoded data files,
wherein the data access response plan is modified to include an indication that one of the preferred storage nodes has an undesired performance level and to include an alternative data access response for the one of the preferred storage nodes having the undesired performance level; and
distribute the modified data access response plan to the pool of storage nodes; and
the processing modules of the preferred storage nodes operable to receive, via the network interfaces of the preferred storage nodes, corresponding portions of the data access request for the at least a portion of the one of the multitude of encoded data files; and
the processing module of the one of the preferred storage nodes having the undesired performance level or the processing module of another storage node of the pool of storage nodes operable to process one of the corresponding portions of the data access request in accordance with the alternative data access response.

2. The DSN memory of claim 1, wherein the processing module of the one of the preferred storage nodes having the undesired performance level functions to process the one of the corresponding portions of the data access request by:
discarding the one of the corresponding portions of the data access request when the alternative data access response includes an indication that data access requests for the at least a portion of the one of the multitude of encoded data files are to be discarded.

3. The DSN of claim 1, wherein the processing module of the other storage node functions to process the one of the corresponding portions of the data access request by:
sending, via the network interface of the other storage node, a copy of at least some of the encoded data slices of the at least a portion of the one of the multitude of encoded data files to a requesting entity when the alternative data access response indicates that the other storage node is to respond to data access requests for the at least a portion of the one of the multitude of encoded data files.

4. The DSN memory of claim 1, wherein the processing module of the one of the preferred storage nodes having the undesired performance level functions to process the one of the corresponding portions of the data access request by:
forwarding, via the network interface of the one of the preferred storage nodes, the one of the corresponding portions of the data access request to the other storage node when the alternative data access response indicates forwarding data access requests for the at least a portion of the one of the multitude of encoded data files to the other storage node.

5. The DSN memory of claim 1, wherein the processing module of the one or more storage nodes of the pool of storage nodes is further operable to:
when the one of the preferred storage nodes has the undesired performance level:
identify the encoded data slices of the at least a portion of the one of the multitude of encoded data files;
select the other storage node based on an availability to perform the alternative data access response; and
facilitate the other storage node storing a copy of at least some of the encoded data slices of the at least a portion of the one of the multitude of encoded data files.

6. The DSN memory of claim 1, wherein the processing module of the one or more storage nodes of the pool of storage nodes is further operable to:
when the one of the preferred storage nodes has the undesired performance level:
identify the encoded data slices of the at least a portion of the one of the multitude of encoded data files;
select a set of other storage nodes from the pool of storage nodes based on an availability to perform the alternative data access response, wherein the set of other storage nodes includes the other storage node;
facilitate the set of other storage nodes storing a copy of at least some of the encoded data slices of the at least a portion of the one of the multitude of encoded data files; and
select one of the set of other storage nodes to function as the other storage node.

7. The DSN memory of claim 1, wherein the one of the multitude of encoded data files further comprises:
a plurality of data partitions, wherein a data partition of the plurality of data partitions includes one portion of the at least a portion of the one of the multitude of encoded data files, wherein the data partition includes a plurality of data segments, and wherein a data segment of the plurality of data segments is dispersed storage error encoded to produce a set of encoded data slices.

8. The DSN memory of claim 1, wherein the processing module of the one or more storage nodes of the pool of storage nodes is further operable to:
- distribute the modified data access response plan to one or more requesting entities by at least one of:
  - sending, via the network interface of the one or more storage nodes, the modified data access response plan to the one or more requesting entities;
  - updating a system registry to include the modified data access response plan; and
  - issuing a slice access response to one of the one or more requesting entities, wherein the slice access response includes the modified data access response plan, when receiving a slice access request from the one of the one or more requesting entities.

9. The DSN memory of claim 1, wherein the multitude of encoded data files comprises:
- a first data file encoded in accordance with a first set of dispersed storage error encoding parameters; and
- a second data file encoded in accordance with a second set of dispersed storage error encoding parameters.

10. The DSN memory of claim 1 further comprises:
- the processing module of the one of the preferred storage nodes having the undesired performance level or another of the preferred storage nodes is operable to process another of the corresponding portions of the data access request by sending, via the network interface of the one of the preferred storage nodes or via the network interface of the other of the preferred storage nodes, at least some of the encoded data slices of the at least a portion of the one of the multitude of encoded data files to a requesting entity in accordance with the modified data access response plan.

11. A computer readable storage medium comprises:
- a first storage section that stores operational instructions that, when executed by one or more processing modules, causes the one or more processing modules to:
  - obtain data access response performance data for each storage node in a pool of storage nodes, wherein the pool of storage nodes stores a multitude of encoded data files;
  - analyze the data access response performance data for the pool of storage nodes to modify a data access response plan to produce a modified data access response plan, wherein the data access response plan includes, for at least a portion of one of the multitude of encoded data files:
    - a per data segment encoded data slice response level,
    - identity of a set of storage nodes storing encoded data slices of the at least a portion of the one of the multitude of encoded data files, and
    - identity of preferred storage nodes of the set of storage nodes to respond to a data access request for the at least a portion of the one of the multitude of encoded data files,
  - wherein the data access response plan is modified to include an indication that one of the preferred storage nodes has an undesired performance level and to include an alternative data access response for the one of the preferred storage nodes having the undesired performance level; and
  - distribute the modified data access response plan to the pool of storage nodes; and
- a second storage section that stores operational instructions that, when executed by the one or more processing modules, causes the one or more processing modules to:
  - receive, via one or more network interfaces, corresponding portions of the data access request for the at least a portion of the one of the multitude of encoded data files;
  - access the modified data access response plan; and
  - process one of the corresponding portions of the data access request in accordance with the alternative data access response when the one of the corresponding portions of the data access request is directed towards the one of the preferred storage nodes having the undesired performance level.

12. The computer readable storage medium of claim 11, wherein the one or more processing modules functions to process the one of the corresponding portions of the data access request by:
- discarding the one of the corresponding portions of the data access request when the alternative data access response includes an indication that data access requests for the at least a portion of the one of the multitude of encoded data files are to be discarded when the one of the corresponding portions of the data access request is directed towards the one of the preferred storage nodes having the undesired performance level.

13. The computer readable storage medium of claim 11, wherein the one or more processing modules functions to process the one of the corresponding portions of the data access request by:
- identifying another storage node of the pool of storage nodes when the alternative data access response indicates that the other storage node is to respond to data access requests for the at least a portion of the one of the multitude of encoded data files when the one of the corresponding portions of the data access request is directed towards the one of the preferred storage nodes having the undesired performance level;
- obtaining a copy of at least some of the encoded data slices of the at least a portion of the one of the multitude of encoded data files from the other storage node; and
- sending, via a network interface of the one or more network interfaces, the copy the at least some of the encoded data slices of the at least a portion of the one of the multitude of encoded data files to a requesting entity.

14. The computer readable storage medium of claim 11, wherein the one or more processing modules functions to process the one of the corresponding portions of the data access request by:
- forwarding the one of the corresponding portions of the data access request to another storage node of the pool of storage nodes when the alternative data access response indicates forwarding data access requests for the at least a portion of the one of the multitude of encoded data files to the other storage node when the one of the corresponding portions of the data access request is directed towards the one of the preferred storage nodes having the undesired performance level.

15. The computer readable storage medium of claim 11 further comprises:
- the first storage section stores further operational instructions that, when executed by the one or more processing modules, causes the one or more processing modules to:
  - when the one of the preferred storage nodes has the undesired performance level:
    - identify the encoded data slices of the at least a portion of the one of the multitude of encoded data files;
    - selecting another storage node of the pool of storage nodes based on an availability to perform the alternative data access response; and facilitate the other storage node storing a copy of at least some of the encoded data slices of the at least a portion of the one of the multitude of encoded data files.

16. The computer readable storage medium of claim 11 further comprises:
the first storage section stores further operational instructions that, when executed by the one or more processing modules, causes the one or more processing modules to:
when the one of the preferred storage nodes has the undesired performance level:
identify the encoded data slices of the at least a portion of the one of the multitude of encoded data files;
select a set of other storage nodes from the pool of storage nodes based on an availability to perform the alternative data access response; and
facilitate the set of other storage nodes storing a copy of at least some of the encoded data slices of the at least a portion of the one of the multitude of encoded data files.

17. The computer readable storage medium of claim 11, wherein the one of the multitude of encoded data files further comprises:
a plurality of data partitions, wherein a data partition of the plurality of data partitions includes one portion of the at least a portion of the one of the multitude of encoded data files, wherein the data partition includes a plurality of data segments, and wherein a data segment of the plurality of data segments is dispersed storage error encoded to produce a set of encoded data slices.

18. The computer readable storage medium of claim 11 further comprises:
the first storage section stores further operational instructions that, when executed by the one or more processing modules, causes the one or more processing modules to:
distribute the modified data access response plan to one or more requesting entities by at least one of:
sending, via the one or more network interfaces, the modified data access response plan to the one or more requesting entities;
updating a system registry to include the modified data access response plan; and
issuing a slice access response to one of the one or more requesting entities, wherein the slice access response includes the modified data access response plan, when receiving a slice access request from the one of the one or more requesting entities.

19. The computer readable storage medium of claim 11, wherein the multitude of encoded data files comprises:
a first data file encoded in accordance with a first set of dispersed storage error encoding parameters; and
a second data file encoded in accordance with a second set of dispersed storage error encoding parameters.

20. The computer readable storage medium of claim 11 further comprises:
the second storage section stores further operational instructions that, when executed by the one or more processing modules, causes the one or more processing modules to:
process the one of the corresponding portions of the data access request by sending, via the one or more network interfaces, at least some of the encoded data slices of the at least a portion of the one of the multitude of encoded data files to a requesting entity in accordance with the modified data access response plan; and
process another one of the corresponding portions of the data access request by sending, via the one or more network interfaces, another at least some of the encoded data slices of the at least a portion of the one of the multitude of encoded data files to the requesting entity in accordance with the modified data access response plan.

* * * * *